(12) United States Patent
Lim et al.

(10) Patent No.: US 7,760,317 B2
(45) Date of Patent: Jul. 20, 2010

(54) THIN FILM TRANSISTOR ARRAY SUBSTRATE AND FABRICATING METHOD THEREOF, LIQUID CRYSTAL DISPLAY USING THE SAME AND FABRICATING METHOD THEREOF, AND METHOD OF INSPECTING LIQUID CRYSTAL DISPLAY

(75) Inventors: Byoung Ho Lim, Kumi-si (KR); Soon Sung Yoo, Gunpo-si (KR); Chang Deok Lee, Cheongju-si (KR); Seung Hee Nam, Suwon-si (KR); Jae Young Oh, Uiwang-si (KR); Hong Sik Kim, Seoul (KR); Hee Young Kwack, Seoul (KR)

(73) Assignee: LG Display Co., Ltd., Seoul (KR)

( * ) Notice: Subject to any disclaimer, the term of this patent is extended or adjusted under 35 U.S.C. 154(b) by 462 days.

(21) Appl. No.: 10/962,452

(22) Filed: Oct. 13, 2004

(65) Prior Publication Data
US 2005/0078233 A1  Apr. 14, 2005

(30) Foreign Application Priority Data

| Oct. 14, 2003 | (KR) | ................... 10-2003-0071400 |
| Dec. 17, 2003 | (KR) | ................... 10-2003-0092698 |
| Dec. 29, 2003 | (KR) | ................... 10-2003-0098823 |
| Dec. 30, 2003 | (KR) | ................... 10-2003-0100989 |

(51) Int. Cl.
*G02F 1/1345* (2006.01)
*G09G 3/36* (2006.01)

(52) U.S. Cl. .................. 349/152; 349/149; 349/151; 345/104

(58) Field of Classification Search ......... 349/149–152, 349/143; 345/104
See application file for complete search history.

(56) References Cited

U.S. PATENT DOCUMENTS 6,198,522 B1 * 3/2001 Yanagi ...................... 349/152

(Continued)

FOREIGN PATENT DOCUMENTS

JP   57-195834   9/1981

(Continued)

OTHER PUBLICATIONS

Japanese Office Action dated Aug. 14, 2006.

*Primary Examiner*—Hoan C Nguyen
(74) *Attorney, Agent, or Firm*—McKenna Long & Aldridge

(57) ABSTRACT

A TFT array substrate is fabricated in a reduced number of processes. The TFT array substrate includes gate and data pads with enlarged contact areas to facilitate contact with an inspecting pin of an inspection device. An LCD incorporating the TFT array substrate is inspected by contacting the inspecting pin to the gate and data pads. The TFT array substrate includes first, second, and third conductive pattern groups. The first conductive pattern group includes a gate electrode, a gate line, and a lower gate pad electrode. The second conductive pattern group includes source and drain electrodes, a data line, and a lower data pad electrode. The third conductive pattern group includes a pixel electrode, and upper gate and data pad electrodes. A semiconductor pattern is along and beneath the second conductive pattern group. Gate insulating and protective film patterns are at areas not occupied by the third conductive pattern group.

6 Claims, 61 Drawing Sheets

U.S. PATENT DOCUMENTS

| | | | |
|---|---|---|---|
| 6,590,226 B2 * | 7/2003 | Kong et al. | 257/59 |
| 6,744,486 B2 * | 6/2004 | Kim et al. | 349/187 |
| 6,750,475 B1 * | 6/2004 | Izumi et al. | 257/59 |
| 6,972,820 B2 * | 12/2005 | Lee et al. | 349/152 |
| 7,068,337 B2 * | 6/2006 | Kim | 349/149 |
| 7,199,846 B2 * | 4/2007 | Lim | 349/43 |
| 2002/0063253 A1 * | 5/2002 | Hong et al. | 257/59 |
| 2003/0206331 A1 * | 11/2003 | Chung et al. | 359/296 |

FOREIGN PATENT DOCUMENTS

| | | |
|---|---|---|
| JP | 64-084224 | 3/1989 |
| JP | 3064737 | 3/1991 |
| JP | 09-318974 | 12/1997 |
| JP | 10-253992 | 9/1998 |
| JP | 2001-021916 | 1/2001 |
| JP | 2001-142096 | 5/2001 |
| JP | 2001-264802 | 9/2001 |
| JP | 2001-320059 | 11/2001 |
| JP | 2002-124680 | 4/2002 |
| JP | 2002-246607 | 8/2002 |
| JP | 2003-13253 | 5/2003 |
| KR | 2003-42081 | 11/2001 |
| KR | 200207894 | * 10/2002 |

* cited by examiner

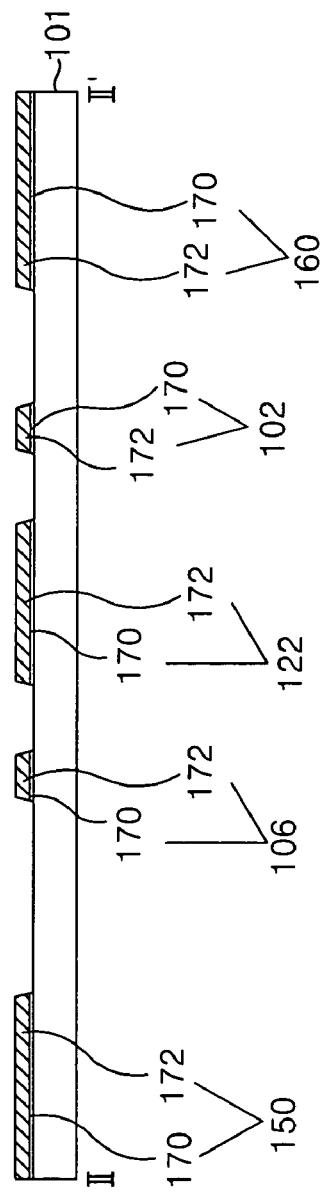

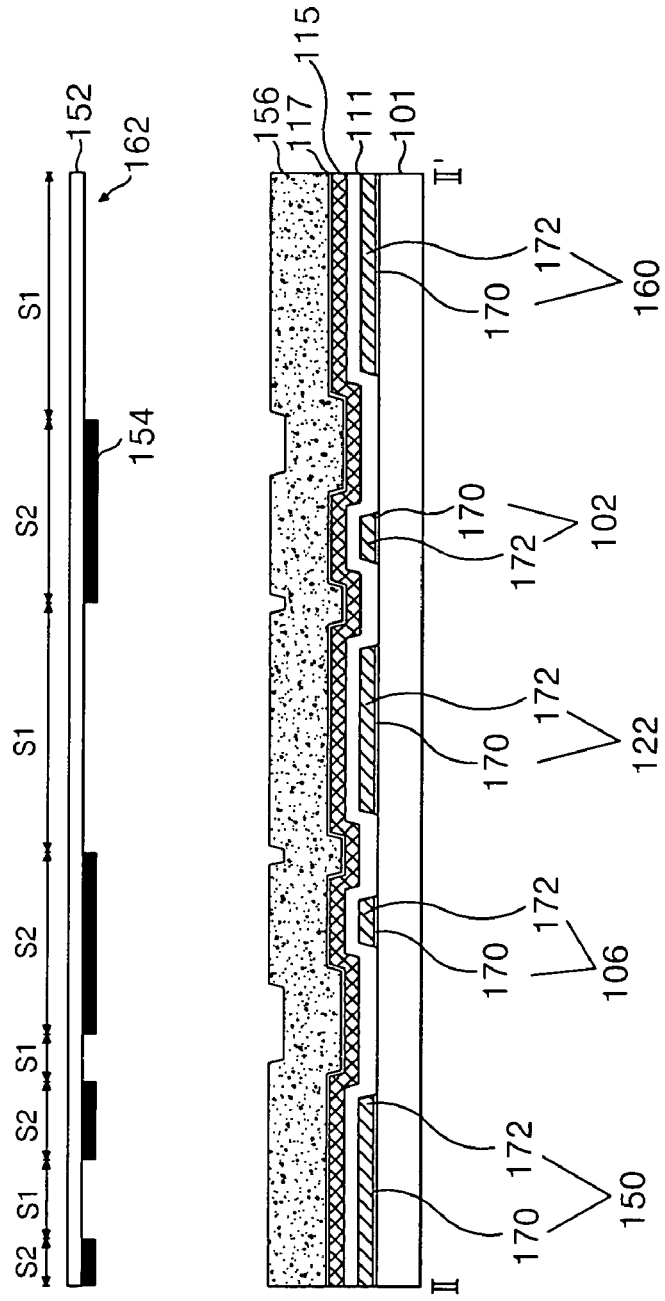

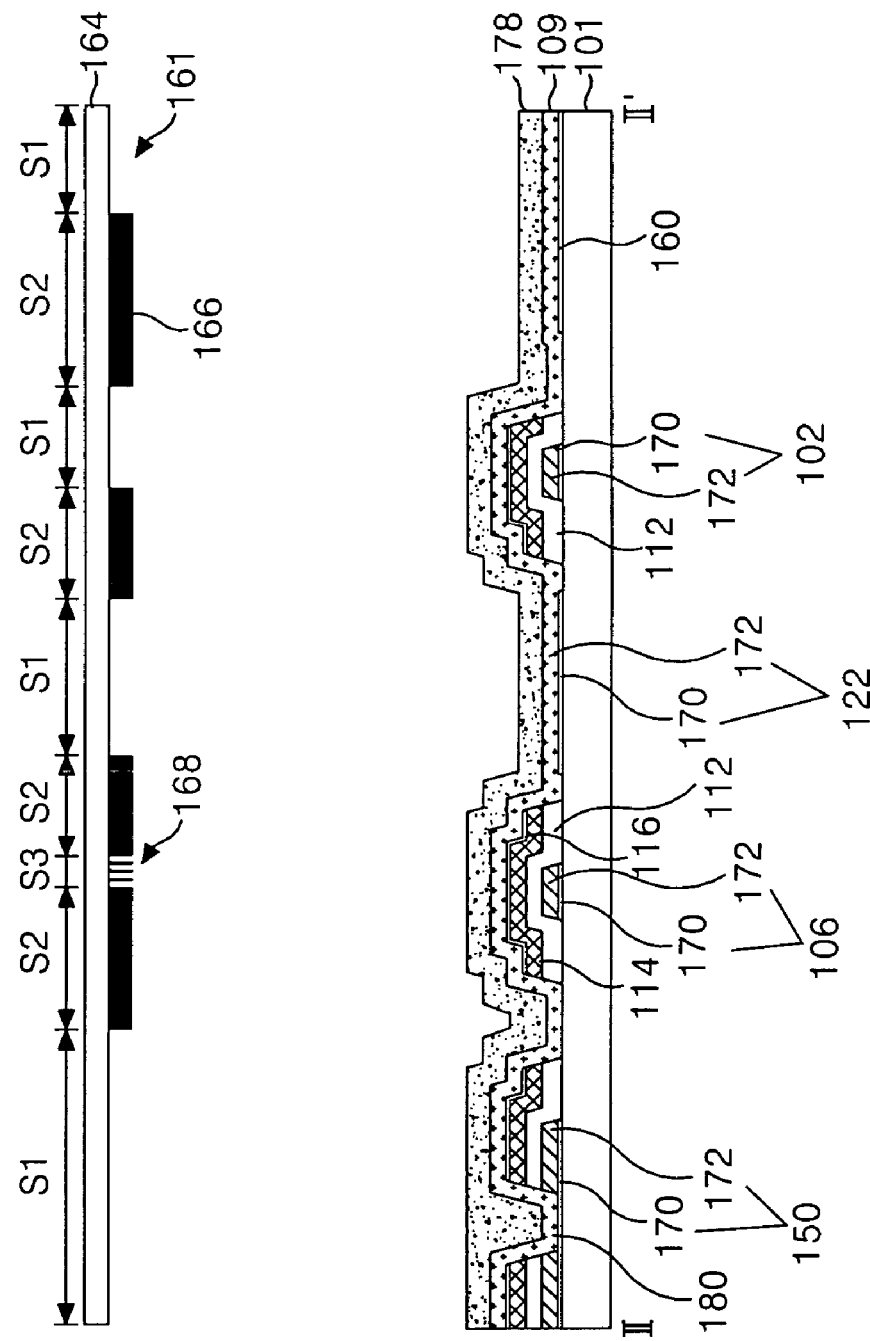

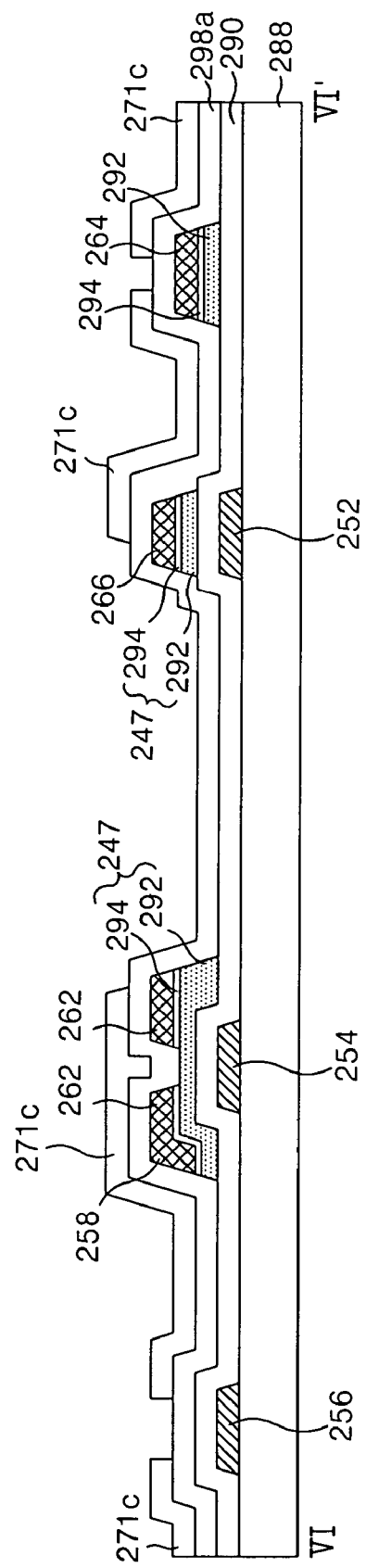

THIN FILM TRANSISTOR ARRAY SUBSTRATE AND FABRICATING METHOD THEREOF, LIQUID CRYSTAL DISPLAY USING THE SAME AND FABRICATING METHOD THEREOF, AND METHOD OF INSPECTING LIQUID CRYSTAL DISPLAY

This application claims the benefit of Korean Patent Application Nos. P2003-71400, P2003-92698, P2003-98823, and P2003-100989, filed on Oct. 14, 2003, Dec. 17, 2003, Dec. 29, 2003, and Dec. 30, 2003, respectively, which are hereby incorporated by reference for all purposes as if fully set forth herein.

BACKGROUND OF THE INVENTION

1. Field of the Invention

The present invention relates to a liquid crystal display (LCD) device and methods of fabricating the same. More particularly, the present invention relates to a thin film transistor (TFT) array substrate for an LCD device and a method of fabricating the same in a reduced number of mask processes. Further, the present invention relates to a method of inspecting LCD device. More particularly, the present invention relates to a method of fabricating a TFT array substrate that facilitates an inspection process.

2. Discussion of the Related Art

Liquid crystal display (LCD) devices express pictures by selectively altering light transmittance characteristics of liquid crystal material within an LCD panel. Light transmittance characteristics of the liquid crystal material can be selectively altered by generating an electric field between a pixel electrode, supported on a lower substrate, and a common electrode, supported on an upper substrate.

LCD panels generally include a TFT array substrate joined to, and separated from, a color filter array substrate to form a cell gap. Spacers are distributed within the cell gap to uniformly maintain the distance between the TFT array and color filter array substrates and liquid crystal material is arranged within the cell gap containing the spacers.

The TFT array substrate typically includes a plurality of signal wirings, a plurality of TFTs, and an alignment film coated thereon to impart an alignment to molecules of the liquid crystal material. The color filter array substrate includes a color filter for selectively transmitting light having predetermined ranges of wavelengths, a black matrix for preventing light from being transmitted in regions outside the pixel areas, and an alignment film coated thereon to impart an alignment to molecules of the liquid crystal material.

The process used to fabricate the TFT array substrate described above is complicated and relatively expensive because it involves a number of semiconductor processing techniques that require a plurality of mask processes. It is generally known that a single mask process requires many sub-processes such as thin film deposition, cleaning, photolithography, etching, photo-resist stripping, inspection, etc. To reduce the complexity and cost associated with fabricating TFT array substrates, procedures have been developed to minimize the number masking process required. Accordingly, a four-mask process has been developed that removes the necessity of a mask process from the standard five-mask process.

FIG. 1 illustrates a plan view of a TFT array substrate, fabricated using a related art four-mask process. FIG. 2 illustrates a sectional view of the TFT array substrate taken along the I-I' line shown in FIG. 1.

Referring to FIGS. 1 and 2, the TFT array substrate includes gate lines 2 and data lines 4 formed so as to cross each other on a lower substrate 1 to define a plurality of pixel areas 5, a gate insulating film 12 between the gate and data lines 2 and 4, a TFT 30 provided at each crossing of the gate and data lines 2 and 4, a pixel electrode 22 provided at each pixel area, a storage capacitor 40 provided at a region where the pixel electrode 22 and the gate line 2 overlap, a storage electrode 28, a gate pad 50 connected to each gate line 2, and a data pad 60 connected to each data line 4.

Each gate line 2 applies a gate signal to a gate electrode 6 of a corresponding TFT 30. Each data line 4 applies a pixel signal to a corresponding pixel electrode 22 via a drain electrode 10 of a corresponding TFT 30.

In response to a gate signal applied from a gate line 2, a TFT 30 charges and maintains a pixel signal, applied to a corresponding data line 4, in the pixel electrode 22. Accordingly, each TFT 30 includes a gate electrode 6 connected to a corresponding gate line 2, a source electrode 8 connected to a corresponding data line 4, and a drain electrode 10 connected to a corresponding pixel electrode 22. Further, each TFT 30 includes an active layer 14 overlapping the gate electrode 6 and is insulated therefrom by a gate insulating pattern 12. Accordingly, a channel is formed in a portion of the active layer 14 between the source and drain electrodes 8 and 10. An ohmic contact layer 16 is formed on the active layer 14 and ohmically contacts the overlapping data line 4, the source electrode 8, and the drain electrode 10 in addition to an overlaying lower data pad electrode 62 and storage electrode 28.

Each pixel electrode 22 is connected to the drain electrode 10 of a corresponding TFT 30 via a first contact hole 20 formed through a protective film 18.

Each storage capacitor 40 consists of the gate line 2 and a portion of the storage electrode 28 overlapping the gate line 2, wherein the two conductors are separated by the gate insulating film 12, the active layer 14, and the ohmic contact layer 16. The pixel electrode 22 is connected to the storage electrode 28 via a second contact hole 28 formed through the protective film 18. Constructed as described above, the storage capacitor 40 allows pixel signals charged at the pixel electrode 22 to be uniformly maintained until a next pixel signal is charged at the pixel electrode 22.

Each gate line 2 is connected to a gate driver (not shown) via a corresponding gate pad 50. Accordingly, the gate pad 50 consists of a lower gate pad electrode 52 and an upper gate pad electrode 54. The lower gate pad electrode 52 is an extension of gate line 2 and is connected to the upper gate pad electrode 54 via a third contact hole 56 formed through the gate insulating film 12 and the protective film 18.

Each data line 4 is connected to a data driver (not shown) via a corresponding data pad 60. Accordingly, the data pad 60 consists of a lower data pad electrode 62 and an upper data pad electrode 64. The lower data pad electrode 62 is an extension of the data line 4 and is connected to the upper data pad electrode 64 via a fourth contact hole 66 formed through the protective film 18.

Generally, an electric field is generated between the pixel electrode 22 and a common electrode formed on a color filter array substrate (not shown) when a pixel signal is applied from a TFT 30 to the pixel electrode 22 and when a reference voltage is applied to the common electrode. The liquid crystal molecules have a particular dielectric anisotropy. Therefore, in the presence of the electric field, liquid crystal molecules rotate to align themselves vertically between the TFT and color filter array substrates. The magnitude of the applied electric field determines the extent of rotation of the liquid crystal molecules. Accordingly, gray scale levels may be displayed by a pixel area by varying the magnitude of the applied electric field.

Having described the TFT array substrate above, a method of fabricating the TFT array substrate according to the related art four-mask process will now be described in greater detail with reference to FIGS. 3A to 3D.

Referring to FIG. 3A, a first conductive pattern group, including the gate line 2, the gate electrode 6, and the lower gate pad electrode 52, is formed on the lower substrate 1 in a first mask process.

Specifically, a gate metal layer is formed over the entire surface of the lower substrate 1 in a deposition technique such as sputtering. The gate metal layer typically includes an aluminum-group metal. The gate metal layer is then patterned using photolithography and etching techniques in conjunction with an overlaying first mask pattern to provide the aforementioned first conductive pattern group.

Referring next to FIG. 3B, the gate insulating film 12 is coated over the entire surface of the lower substrate 1 and on the first conductive pattern group. In a second mask process, semiconductor patterns, including the active layer 14 and the ohmic contact layer 16, and a second conductive pattern group, including the data line 4, the source electrode 8, the drain electrode 10, the lower data pad electrode 62, and the storage electrode 28, are provided on the gate insulating film 12.

Specifically, the gate insulating film 12, first and second semiconductor layers, and a data metal layer are sequentially formed over the surface of the lower substrate 1 and on the first conductive pattern group by deposition techniques such as plasma enhanced chemical vapor deposition (PECVD) and sputtering. The gate insulating film 12 typically includes an inorganic insulating material such as silicon nitride (SiNx) or silicon oxide (SiOx). The active layer 14 is formed from the first semiconductor layer and typically includes undoped amorphous silicon. The ohmic contact layer is formed from the second semiconductor layer and typically includes an n$^+$ doped amorphous silicon. The data metal layer typically includes molybdenum (Mo), titanium (Ti), tantalum (Ta).

A photo-resist film is then formed over the data metal layer and is photolithographically patterned using a second mask pattern. Specifically, the second mask pattern is provided as a diffractive exposure mask having a diffractive exposure region corresponding to a channel portion of a subsequently formed TFT. Upon exposure through the second mask pattern and development, a photo-resist pattern is created wherein a portion of the photo-resist film remaining in a region corresponding to the channel portion has a lower height than portions of the photo-resist film remaining in regions outside the channel portion.

Subsequently, the photo-resist pattern is used as a mask to pattern the data metal layer in a wet etching process and form the aforementioned second conductive pattern group (i.e., the data line 4, the source electrode 8, the drain electrode 10, and the storage electrode 28), wherein the source and drain electrodes 8 and 10 are connected to each other in a region corresponding to the channel portion. Next, the photo-resist pattern is used as a mask to sequentially pattern the first and second semiconductor layers in a dry etching process and form the active layer 14 and the ohmic contact layer 16.

After the active and ohmic contact layers 14 and 16 are formed, the portion of the photo-resist having the relatively lower height is removed from the region corresponding to the channel portion in an ashing process. Upon performing the ashing process, the relatively thicker portions of the photo-resist in regions outside the channel portion are thinned but, nevertheless, remain. Using the photo-resist pattern as a mask, the portion of the second conductive pattern group and the ohmic contact layer 16 arranged in the region corresponding to the channel portion are then etched in a dry etching process. As a result, the active layer 14 within the channel portion is exposed, the source electrode 8 is disconnected from the drain electrode 10, and the remaining photo-resist pattern is removed in a stripping process.

Referring next to FIG. 3C, the protective film 18 is coated over the entire surface of the lower substrate, on the gate insulting film 12, the second conductive pattern group, and the active layer 14. In a third mask process, the first to fourth contact holes 20, 42, 56, and 66, respectively, are formed through the protective film 18.

Specifically, the protective film 18 is formed over the surface of the lower substrate, and on the gate insulting film 12, the second conductive pattern group, and the active layer 14 by a deposition technique such as plasma enhanced chemical vapor deposition (PECVD). The protective film 18 typically includes an inorganic insulating material such as silicon nitride (SiNx) or silicon oxide (SiOx), or an organic material having a small dielectric constant such as an acrylic organic compound, BCB (benzocyclobutene) or PFCB (perfluorocyclobutane). A third mask pattern is then arranged over the protective film 18 and the protective film 18 is then patterned by using photolithography and etching processes to thereby define the first to fourth contact holes 20, 42, 56, and 66. The first contact hole 20 is formed through the protective film 18 to expose the drain electrode 10, the second contact hole 42 is formed through the protective film 18 to expose the storage electrode 28, the third contact hole 56 is formed through the protective film 18 and the gate insulating film 12 to expose the lower gate pad electrode 52, and the fourth contact hole 66 is formed through the protective film 18 to expose the lower data pad electrode 62.

Referring next to FIG. 3D, a third conductive pattern group including the pixel electrode 22, the upper gate pad electrode 54, and the upper data pad electrode 64 are formed on the protective film 18 in a fourth mask process.

Specifically, a transparent conductive material is coated over the entire surface of the protective film 18 and in first to fourth contact holes 20, 42, 56, and 66 by a deposition technique such as sputtering. The transparent conductive material typically includes indium-tin-oxide (ITO), tin-oxide (TO), indium-zinc-oxide (IZO) or indium-tin-zinc-oxide (ITZO). In a fourth mask process, the transparent conductive material is patterned using photolithographic and etching techniques to thereby form the aforementioned third conductive pattern group (i.e., the pixel electrode 22, the upper gate pad electrode 54, the upper data pad electrode 64).

Accordingly, the pixel electrode 22 is electrically connected to the drain electrode 10 via the first contact hole 20 while also being electrically connected to the storage electrode 28, via the second contact hole 42. The upper gate pad electrode 54 is electrically connected to the lower gate pad electrode 52 via the third contact hole 56, and the upper data pad electrode 64 is electrically connected to the lower data pad electrode 62 via the fourth contact hole 66.

While the TFT array substrate described above may be formed using a four-mask process that is advantageous over previously known five-mask processes, the four-mask process can still be undesirably complicated and, therefore, costly. Accordingly, it would be beneficial to fabricate a TFT array substrate according to a less complex, and therefore less costly, process.

SUMMARY OF THE INVENTION

Accordingly, the present invention is directed to a thin film transistor array substrate and method of fabricating the same, a liquid crystal display using the thin film transistor substrate and a method of fabricating the same, and a method of inspecting liquid crystal displays that substantially obviates one or more of the problems due to limitations and disadvantages of the related art.

An advantage of the present invention provides a thin film transistor array substrate and method of fabricating the same in a reduced number of mask processes, a liquid crystal display using the same and a fabricating method thereof, and a method of inspecting the liquid crystal display.

Another advantage of the present invention provides a thin film transistor array substrate and method of fabricating the same in a reduced number of mask processes, a liquid crystal display using the same and a fabricating method thereof, and a method of inspecting the liquid crystal display that facilitates contact of an automatic inspecting pin during an automated inspection process.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a thin film transistor array substrate according may, for example, include a first conductive pattern group on a first substrate, wherein the first conductive pattern group includes a gate electrode, a gate line connected to the gate electrode, and a lower gate pad electrode connected to the gate line; a second conductive pattern group on the substrate, wherein the second conductive pattern group includes a source electrode, a drain electrode, a data line connected to the source electrode, and a lower data pad electrode connected to the data line; a semiconductor pattern provided along and below the second conductive pattern group; a third conductive pattern group on the substrate, wherein the third conductive pattern group includes a pixel electrode connected to the drain electrode, an upper gate pad electrode connected to the lower gate pad electrode, and an upper data pad electrode connected to a side surface of the lower data pad electrode, wherein the upper data pad electrode contacts the substrate; a gate insulating pattern between the first and second conductive pattern groups; and a protective film pattern between the pixel electrode, the upper gate pad electrode, and the upper data pad electrode of the third conductive pattern group.

In one aspect of the present invention, a line width of at least one of the upper gate pad electrode and the upper data pad electrode may be greater than a width of an inspecting pin.

In another aspect of the present invention, the line width of at least one of the upper gate pad electrode and the upper data pad electrode may be greater than about 26 µm.

In still another aspect of the present invention, the line width of at least one of the upper gate pad electrode and the upper data pad electrode may be about 34 µm to about 38 µm.

In yet another aspect of the present invention, the thin film transistor array substrate may further include at least one data contact hole exposing the substrate and at least one side surface of the lower data pad electrode.

In still another aspect of the present invention, the at least one data contact hole may, for example, include a first data contact hole exposing a first side surface of the lower data pad electrode and a second data contact hole spaced apart from the first data contact hole by a predetermined distance, wherein the second data contact hole may expose a second side surface of the lower data pad electrode.

In another aspect of the present invention, the thin film transistor array substrate may further include at least one of dummy pattern within at least one data contact hole between the upper data pad electrode and the first substrate.

In one aspect of the present invention, the dummy pattern and the gate insulating pattern may include the same material.

In another aspect of the present invention, the pixel electrode may contact the substrate and a side surface of the drain electrode.

In still another aspect of the present invention, the thin film transistor array substrate may further include a storage capacitor, wherein the storage capacitor may, for example, include the gate line, a storage electrode overlapping the gate line, and the gate insulating pattern and the semiconductor pattern between the gate line and the storage electrode, wherein the storage electrode may contact a side surface of the pixel electrode.

According to principles of the present invention, a thin film transistor array substrate may, for example, include a gate line provided on a substrate; a data line crossing the gate line to define a pixel area; a gate insulating film between the gate and data lines; a pixel electrode at the pixel area and connected to the thin film transistor; a gate pad connected to the gate line; and a data pad connected to the data line, wherein at least one of the gate pad and the data pad contacts the substrate and includes an exposed transparent conductive material.

In one aspect of the present invention, a line width of the exposed transparent conductive material of at least one of the gate pad and the data pad may be larger than a width of an inspecting pin.

In another aspect of the present invention, the line width of the exposed transparent conductive material of at least one of the gate pad and the data pad may be greater than about 26 µm.

In still another aspect of the present invention, the line width of the exposed transparent conductive material of at least one of the gate pad and the data pad may be about 34 µm to 38 about µm.

In yet another aspect of the present invention, the gate pad may, for example, include the transparent conductive material and the thin film transistor array substrate may further include a gate metal material on the transparent conductive material of the gate pad, wherein at least a portion of the transparent conductive material of the gate pad may be exposed by the gate metal material.

In another aspect of the present invention, the gate line and a gate electrode may, for example, include the transparent conductive material and the thin film transistor array substrate may further include a gate metal material that overlaps a portion of the transparent conductive material of the gate line and the gate electrode.

In one aspect of the present invention, the transparent conductive material may include at least one of TO, ITO, IZO and ITZO and the gate metal material may include at least one of an aluminum group metal, Mo, Cu, Cr, Ta and Ti.

According to principles of the present invention, a liquid crystal display device may, for example, include a thin film transistor array substrate joined to a color filter array substrate. The thin film transistor may, for example, include a gate line on a first substrate; a data line crossing the gate line; a thin film transistor at the crossing of the gate and data lines; a protective film covering the thin film transistor; a pixel electrode connected to the thin film transistor; and a pad connected to at least one of the gate and data lines, wherein the pad includes a transparent conductive material contacting the first substrate. When joined, the color filter array substrate overlaps the protective film and wherein the transparent conductive material of the pad is exposed by the protective film and color filter array substrate.

In one aspect of the present invention, the pad may, for example, include a gate pad connected to the gate line and a data pad connected to the data line.

In another aspect of the present invention, a line width of the exposed transparent conductive material of at least one of the gate pad and the data pad may be larger than a width of an inspecting pin.

In still another aspect of the present invention, the line width of the exposed transparent conductive material of at least one of the gate pad and the data pad may be greater than about 26 μm.

In yet another aspect of the present invention, the line width of the exposed transparent conductive material of at least one of the gate pad and the data pad may be about 34 μm to about 38 μm.

In still another aspect of the present invention, the gate pad may, for example, include the transparent conductive material and the thin film transistor array substrate may further include a gate metal material on the transparent conductive material of the gate pad and exposing at least a portion of the transparent conductive material of the gate pad.

In another aspect of the present invention, the gate line and a gate electrode may, for example, include the transparent conductive material and the thin film transistor array substrate may further include a gate metal material that overlaps a portion of the transparent conductive material of the gate line and the gate electrode.

In one aspect of the present invention, the transparent conductive material may include at least one of TO, ITO, IZO and ITZO and the gate metal material may include at least one of an aluminum group metal, Mo, Cu, Cr, Ta and Ti.

In another aspect of the present invention, the liquid crystal display device may further include a contact hole through the gate insulating film and the gate metal material of the gate pad, wherein the contact hole exposes a portion of the transparent conductive material of the gate pad; and a conductive film connected to the portion of the transparent conductive material of the gate pad exposed by the contact hole.

According to principles of the present invention, a method of fabricating a thin film transistor array substrate may, for example, include forming a first conductive pattern group on a substrate, wherein the first conductive pattern group may, for example, include a gate electrode, a gate line connected to the gate electrode, and a lower gate pad electrode connected to the gate line; forming a gate insulating film on the substrate and on the first conductive pattern group; forming a second conductive pattern group on the gate insulating film, wherein the second conductive pattern group may, for example, include a source electrode, a drain electrode, a data line connected to the source electrode, and a lower data pad electrode connected to the data line; forming a semiconductor pattern along and below the second conductive pattern group; forming a third conductive pattern group on the substrate, wherein the third conductive pattern group may, for example, include a pixel electrode connected to the drain electrode, an upper gate pad electrode connected to the lower gate pad electrode, and an upper data pad electrode connected to a side surface of the lower data pad electrode; forming a gate insulating pattern between the first and second conductive pattern groups; and forming a protective film pattern between the pixel electrode, the upper gate pad electrode, and the upper data pad electrode of the third conductive pattern group.

In one aspect of the present invention, forming the third conductive pattern group may, for example, include forming at least one of the upper gate pad electrode and the upper data pad electrode to have a line width larger than a width of an inspecting pin.

In another aspect of the present invention, the line width of at least one of the upper gate pad electrode and the upper data pad electrode may be greater than about 26 μm.

In still another aspect of the present invention, the line width of at least one of the upper gate pad electrode and the upper data pad electrode may be about 34 μm to about 38 μm.

In yet another aspect of the present invention, forming the gate insulating pattern and the protective film pattern may, for example, include forming at least one data contact hole through the gate insulating pattern, the protective film pattern, and at least one side portion of the lower data pad electrode, wherein the at least one data contact hole may expose the substrate and at least one side surface of the lower data pad electrode.

In still another aspect of the present invention, forming the gate insulating pattern and the protective film pattern may, for example, includes forming a first data contact hole exposing a first side surface of the lower data pad electrode and forming a second data contact hole spaced apart from the first data contact hole by a predetermined distance, wherein the second data contact hole may expose a second side surface of the lower data pad electrode.

In another aspect of the present invention, the method may further include forming at least one dummy pattern within at least one data contact hole between the upper data pad electrode and the first substrate.

In one aspect of the present invention, the dummy pattern may be formed by forming a protective film on the substrate and on the lower data pad electrode; forming a photo-resist pattern on the protective film; using the photo-resist pattern as a mask, etching the protective film in a first etching gas composition to form the protective film pattern, wherein the first etching gas composition includes $O_2$ and $SF_6$, wherein the first etching gas composition includes more $O_2$ than $SF_6$; using the photo-resist pattern as a mask, etching the lower data pad electrode in second etching gas composition including $O_2$ and $SF_6$, wherein the second etching gas composition includes more $SF_6$ than $O_2$; using the photo-resist as a mask, partially etching the semiconductor pattern in a third etching gas composition including $Cl_2$ and HCl such that a portion of the semiconductor pattern remains; and, using the remaining portion of the semiconductor pattern as a mask, partially etching the gate insulating film such that a portion of the gate insulating film remains.

In another aspect of the present invention, the first etching gas composition may have a ratio of $SF_6$ to $O_2$ of about 1:3.

In still another aspect of the present invention, the second etching gas composition may have a ratio of $SF_6$ to $O_2$ of about 3~10:1.

In yet another aspect of the present invention, the third conductive pattern group, the gate insulating pattern, and the protective film pattern may be formed by forming a protective film on the gate insulating film and on the second conductive pattern group; forming a photo-resist pattern on the protective film; using the photo-resist pattern as a mask, etching the protective film, the gate insulating film, the drain electrode, and the semiconductor pattern in an etching gas to form the gate insulating pattern and the protective film pattern, wherein the drain electrode and semiconductor pattern are etched in an etching gas including $SF_6$ and $O_2$ such that a side surface of the drain electrode is substantially coplanar with side surfaces of the protective and gate insulating patterns; depositing a transparent conductive material on the substrate, the side surfaces of the protective and gate insulating patterns, and the photo-resist pattern; and forming the third conductive pattern group by removing the photo-resist pattern and portions of the transparent conductive material on the photo-resist pattern.

In still another aspect of the present invention, the method may further include forming a storage electrode over the gate line and separated from the gate line by the gate insulating pattern and the semiconductor pattern, wherein the storage electrode may form a storage capacitor, and wherein the storage electrode may contact a side surface of the pixel electrode.

According to principles of the present invention, a method of fabricating a thin film transistor array substrate may, for example, include forming a gate line on a substrate; forming a data line crossing the gate line to define a pixel area; forming a gate insulating film between the gate and data lines; forming a thin film transistor at the crossing of the gate and data lines; forming a pixel electrode on the substrate at the pixel area and connected to the thin film transistor; forming a gate pad connected to the gate line and a data pad connected to the data line, wherein at least one of the gate pad and the data pad contacts the substrate and includes a transparent conductive material; and exposing at least a portion of the transparent conductive material of at least one of the gate and data pads.

In one aspect of the present invention, the exposing may, for example, include defining an exposed area having a line width that is larger than a width of an inspecting pin.

In another aspect of the present invention, the line width of the exposed transparent conductive material of at least one of the gate pad and the data pad may be greater than about 26 µm.

In still another aspect of the present invention, the line width of the exposed transparent conductive material of at least one of the gate pad and the data pad may be about 34 µm to about 38 µm.

In yet another aspect of the present invention, the gate pad may include the transparent conductive material and the method may further include forming a gate metal material on the transparent conductive material of the gate pad; and removing a portion of the gate metal material to expose at least a portion of the transparent conductive material of the gate pad.

In still another aspect of the present invention, the gate line includes the transparent conductive material and the method may further include forming a gate metal material on the transparent conductive material of the gate line and a gate electrode of the thin film transistor.

In another aspect of the present invention, the transparent conductive material may include at least one of TO, ITO, IZO and ITZO; and the gate metal material may include at least one of an aluminum group metal, Mo, Cu, Cr, Ta and Ti.

According to principles of the present invention, a method of fabricating a liquid crystal display device may, for example, include forming a thin film transistor; forming a color filter array substrate; and joining the thin film transistor array substrate to the color filter array substrate. The thin film transistor array substrate may be formed by forming a gate line on a first substrate; forming a data line crossing the gate line; forming a thin film transistor at the crossing of the gate and data lines; forming a protective film over the thin film transistor; a forming a pixel electrode connected to the thin film transistor; and forming a pad connected to at least one of the gate line and the data line, wherein the pad includes a transparent conductive material contacting the first substrate. Upon being joined, the color filter array substrate may overlap the protective film. Further, the method may include exposing at least a portion of the transparent conductive material of the pad within the protective film.

In one aspect of the present invention, the pad may be formed by forming a gate pad connected to the gate line and forming a data pad connected to the data line.

In another aspect of the present invention, the exposing may, for example, include exposing at least a portion of the transparent conductive material of at least one of the gate and data pads to define an exposed area having a line width that is larger than a width of an inspecting pin.

In still another aspect of the present invention, the line width of the exposed transparent conductive material of at least one of the gate pad and the data pad may be greater than about 26 µm.

In yet another aspect of the present invention, the line width of the exposed transparent conductive material of at least one of the gate pad and the data pad may be about 34 µm to about 38 µm.

In still another aspect of the present invention, the gate pad may include the transparent conductive material and the method may further include forming a gate metal material on the transparent conductive material of the gate pad; and removing a portion of the gate metal material to expose at least a portion of the transparent conductive material of the gate pad.

In still another aspect of the present invention, the gate line includes the transparent conductive material and the method may further include forming a gate metal material on the transparent conductive material of the gate line and a gate electrode of the thin film transistor.

In one aspect of the present invention, the transparent conductive material may include at least one of TO, ITO, IZO and ITZO; and the gate metal material may include at least one of an aluminum group metal, Mo, Cu, Cr, Ta and Ti.

In another aspect of the present invention, the method may further include forming a contact hole through the gate insulating film and the gate metal material of the gate pad, wherein the contact hole may expose a portion of the transparent conductive material of the gate pad; and attaching a conductive film to the portion of the transparent conductive film exposed by the contact hole.

According to principles of the present invention, a method of inspecting a liquid crystal display device may, for example, include directly contacting an inspecting pin to a transparent conductive material exposed by a patterned protective film formed over at least one of a gate pad and a data pad of liquid crystal display device, wherein the inspecting pin has a first width, wherein at least one of the gate and data pads have a second width greater than the first width, wherein the gate pad is connected to a gate line of the liquid crystal display device, and wherein the data pad is connected to a data line of the liquid crystal display device; applying a signal from the inspecting pin to the contacted one of the gate and data pads; and determining whether at least one of the gate and data lines are defective based upon the applying.

In one aspect of the present invention, a width of the inspecting pin may be less than about 26 µm and a line width of the exposed transparent conductive material may be greater than about 26 µm.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 6A and 6B illustrate plan and sectional views, respectively, describing a first mask process in the method of fabricating the TFT array substrate according to the first embodiment of the present invention;

FIGS. 8A to 8C illustrate sectional views specifically describing the second mask process in the method of fabricating the TFT array substrate according to the first embodiment of the present invention;

FIGS. 10A to 10E illustrate sectional views specifically describing the third mask process in the method of fabricating the TFT array substrate according to the first embodiment of the present invention;

FIGS. 22A to 22D illustrate plan and sectional views describing a third mask process in the method of fabricating the TFT array substrate according to the third embodiment of the present invention;

DETAILED DESCRIPTION OF THE ILLUSTRATED EMBODIMENTS

Reference will now be made in detail to embodiments of the present invention, examples of which are illustrated in the accompanying drawings.

Figure 1:
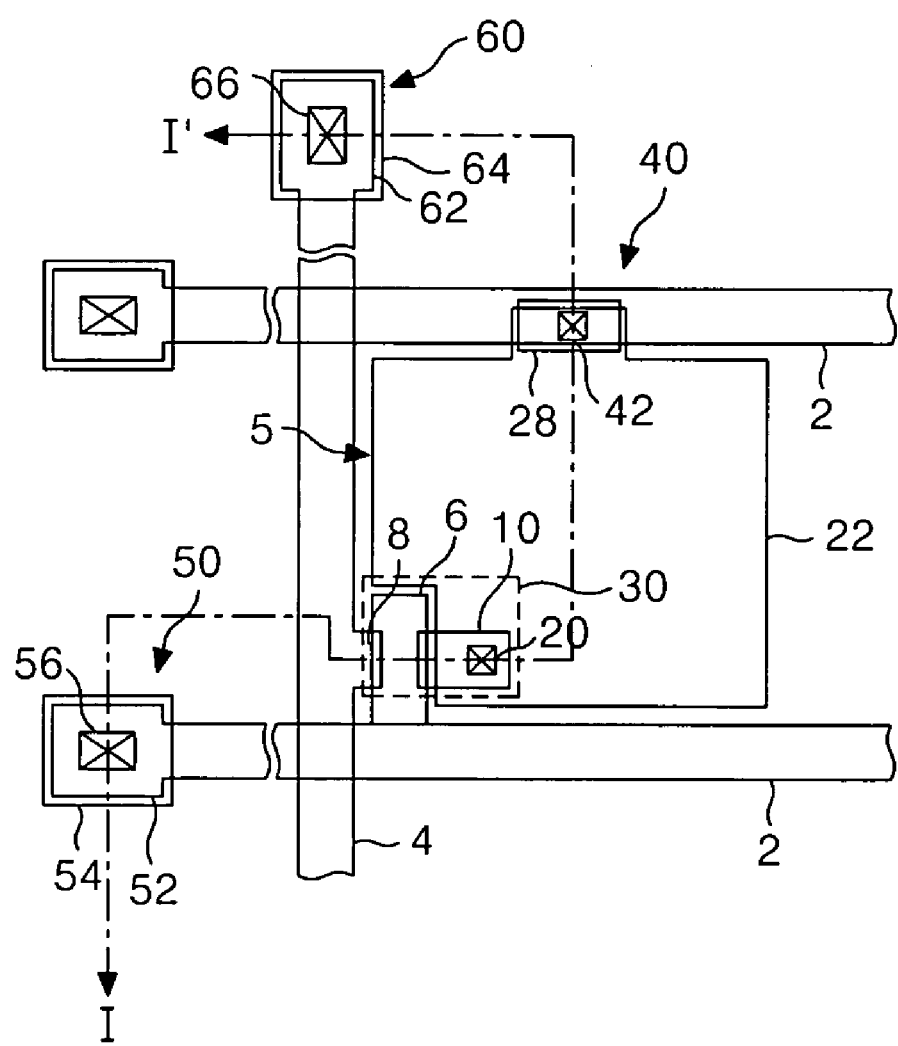
FIG. 1 illustrates a plan view of a thin film transistor (TFT) array substrate, fabricated using a related art four-mask process.
Figure 2:
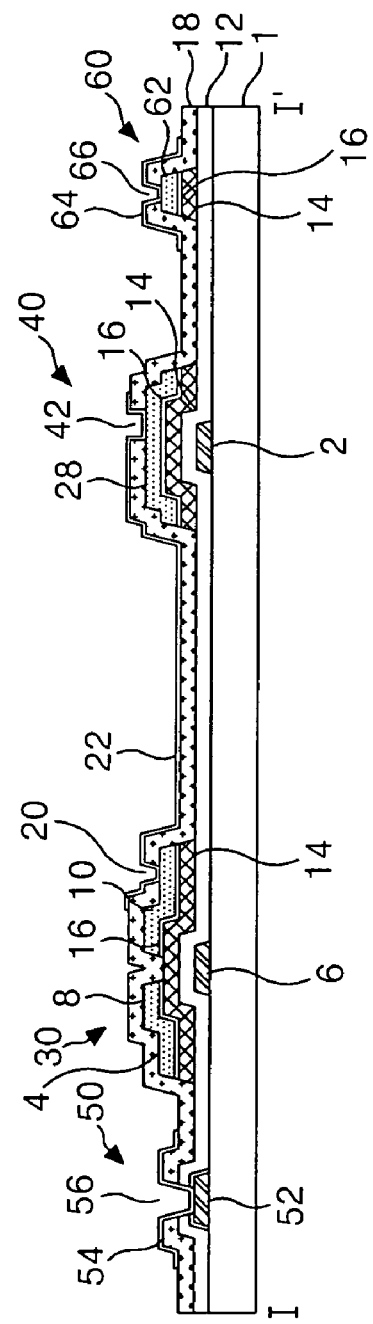
FIG. 2 illustrates a sectional view of the TFT array substrate taken along line I-I' shown in FIG. 1.
Figure 3A:
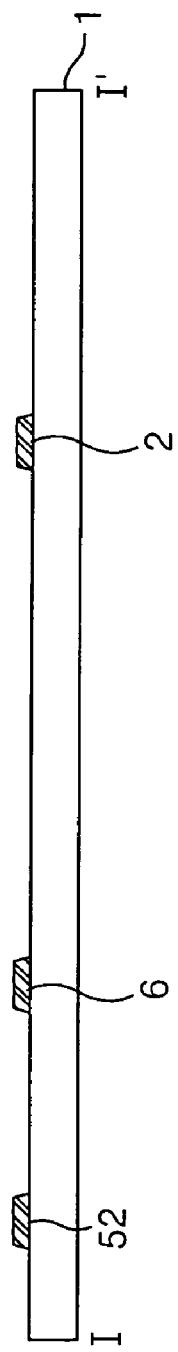
FIGS. 3A to 3D illustrate a method of fabricating the TFT array substrate shown in FIGS. 1 and 2.
Figure 3B:
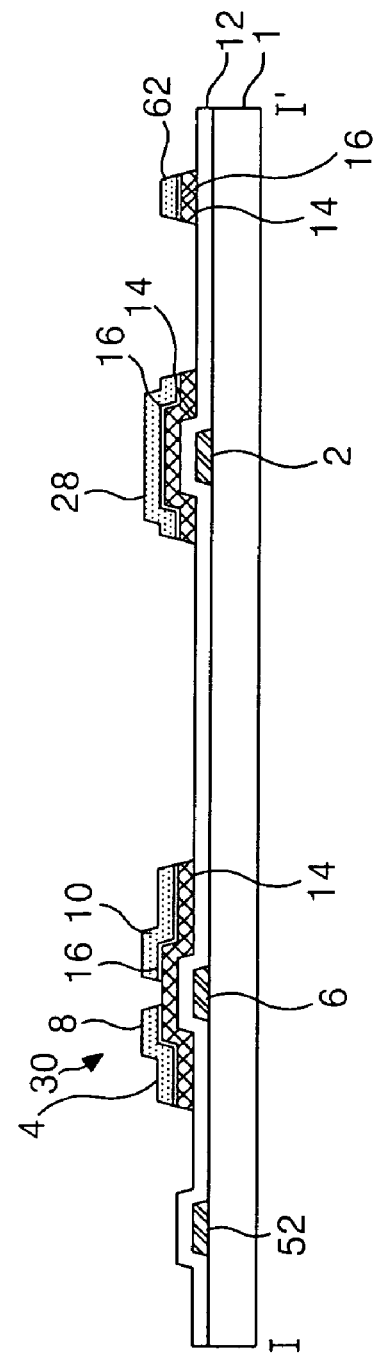
Figure 3C:
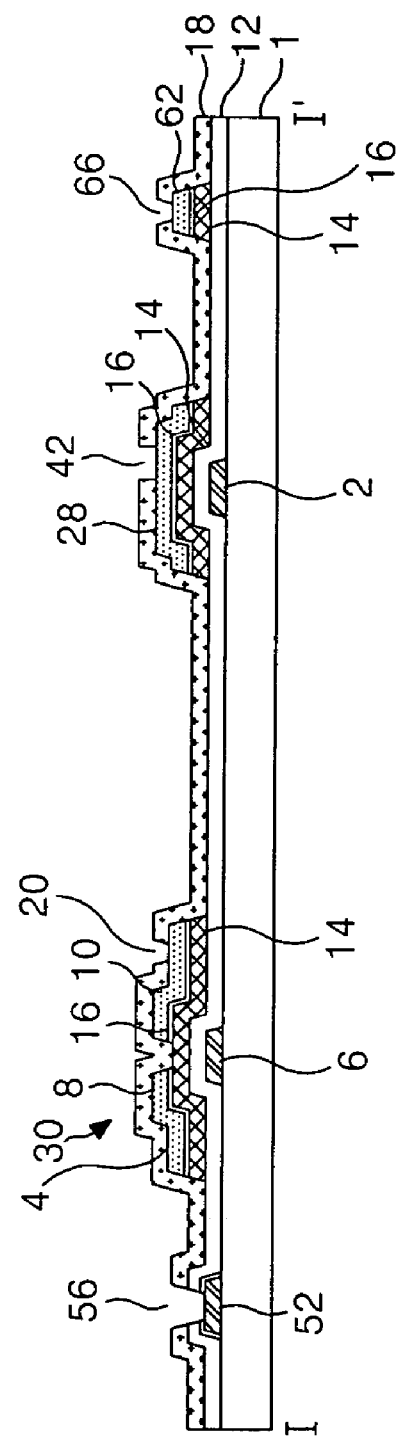
Figure 3D:
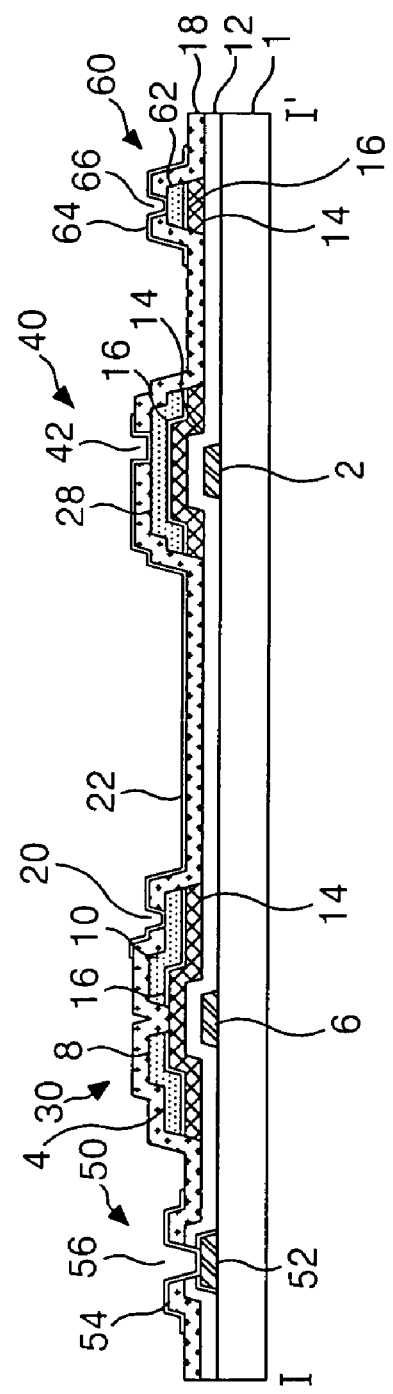
Figure 4:
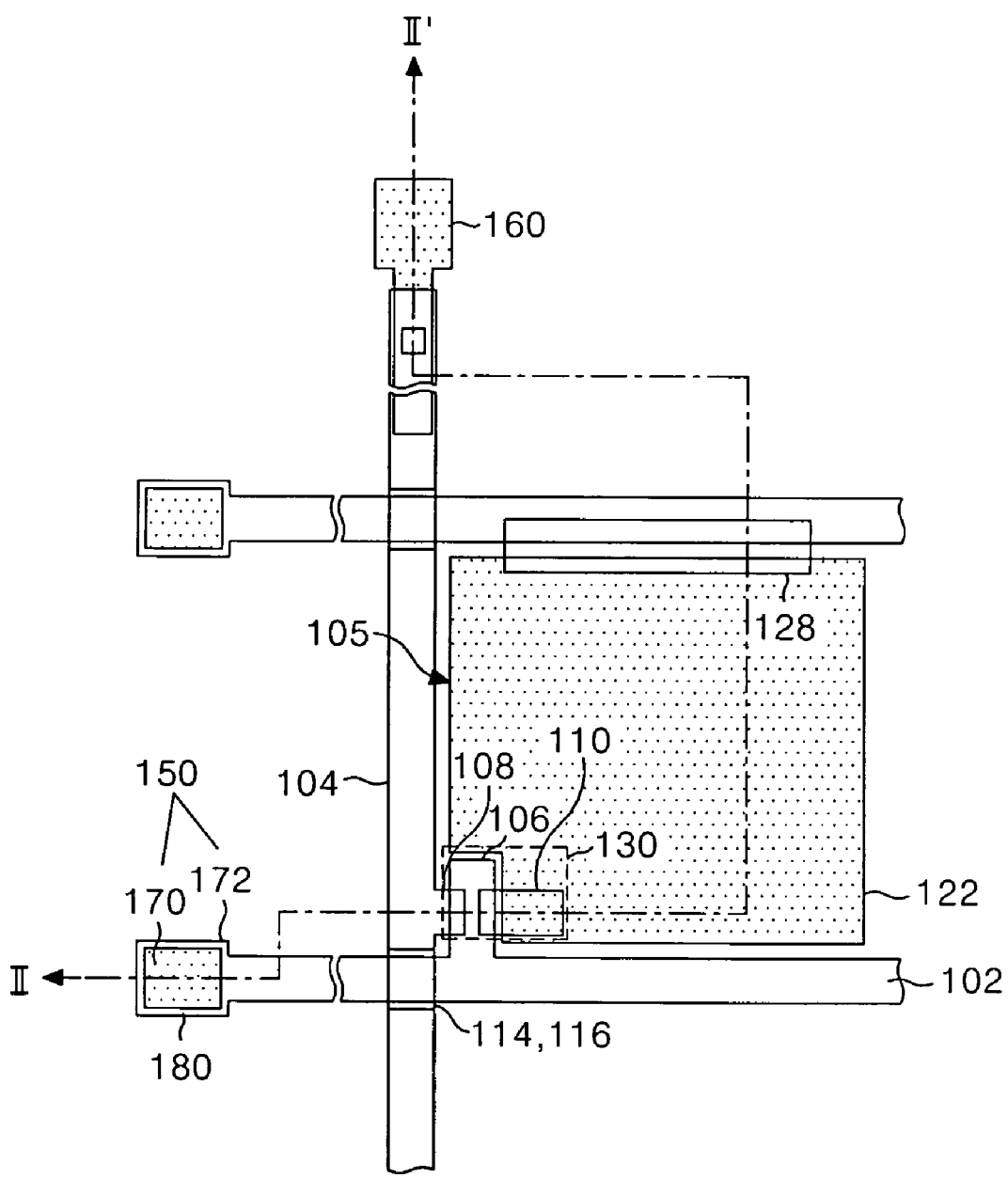
FIG. 4 illustrates a plan view of a TFT array substrate according to a first embodiment of the present invention.
Figure 5:
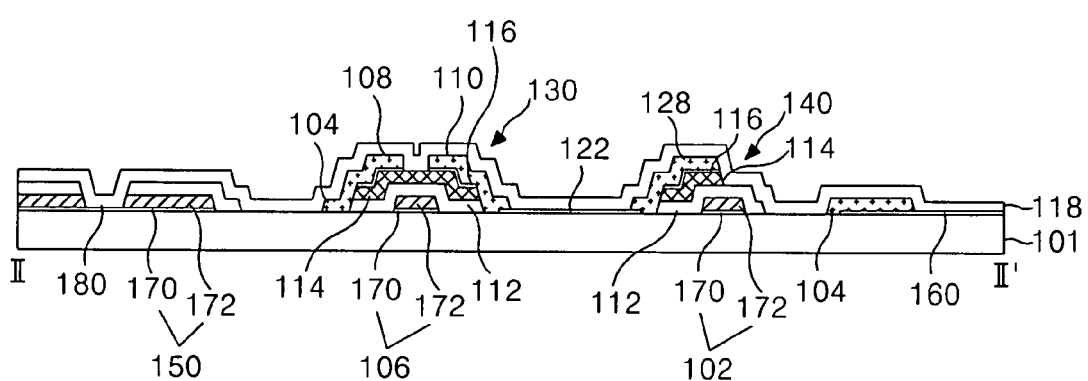
FIG. 5 illustrates a sectional view of the TFT array substrate taken along line II-II' shown in FIG. 4.

FIG. 4 illustrates a plan view of a TFT array substrate according to a first embodiment of the present invention. FIG. 5 illustrates a sectional view of the TFT array substrate taken along line II-II' shown in FIG. 4.

Referring to FIGS. 4 and 5, the TFT array substrate of the first embodiment may, for example, include gate lines 102 and data lines 104 formed so as to cross each other on a lower substrate 101 and to define a plurality of pixel areas 105; a gate insulating pattern 112 formed between the gate and data lines 102 and 104; a thin film transistor 130 at each crossing of the gate and data lines 102 and 104; a pixel electrode 122 at each pixel area, a storage capacitor 140 provided at a region where a storage electrode 128 and gate line 102 overlap, a gate pad 150 extending from the gate line 102, and a data pad 160 extending from the data line 104.

Each gate line 102 may be supplied with a gate signal, each data line 104 may be supplied with a data signal. In response to a gate signal supplied to the gate line 102, a TFT 130 charges and maintains a pixel signal, supplied to a corresponding data line 104, in the pixel electrode 122. Accordingly, each TFT 130 may, for example, include a gate electrode 106 connected to a corresponding gate line 102, a source electrode 108 connected to a corresponding data line 104, and a drain electrode 110 connected to a corresponding pixel electrode 122.

Further, each thin film transistor 130 may include an active layer 114 overlapping the gate electrode 106 and insulated therefrom by the gate insulating pattern 112. Accordingly, a channel is formed in a portion of the active layer 114 between the source electrode 108 and the drain electrode 110. An ohmic contact layer 116 may be formed on the active layer 114 and ohmically contact the overlapping data line 104, the source electrode 108, and the drain electrode 110 in addition to an overlaying storage electrode 128. In one aspect of the present invention, portions of the active and ohmic contact layers 114 and 116 may be removed between adjacent cells to prevent signal interference therebetween.

As will be discussed in greater detail below, the gate electrode 106, the gate line 102, the gate pad 150, the data pad 160, and the pixel electrode 122 may comprise a first conductive pattern group. In one aspect of the present invention, the gate electrode 106, the gate line 102, and the gate pad 150 may, for example, include a transparent conductive material 170 and a gate metal material 172 disposed over the transparent conductive material 170. In another aspect of the present invention, the data pad 160 and the pixel electrode 122, however, may include only the transparent conductive material 170. In still another aspect of the present invention, the portions of the data pad 160 beneath the data line 104 may include the transparent conductive material 170 and the overlaying gate metal material 172.

Each pixel electrode 122 may include the transparent conductive material 170 and directly contact the drain electrode 110 of a corresponding TFT 130.

Each storage capacitor 140 may, for example, include the gate line 102 and the storage electrode 128 overlapping with the gate line 102, wherein the two conductors are separated by the gate insulating pattern 112, the active layer 114, and the ohmic contact layer 116. The storage electrode 128 may directly contact the pixel electrode 122. Constructed as described above, the storage capacitor 140 may allow pixel signals charged at the pixel electrode 122 to be uniformly maintained until a next pixel signal is charge at the pixel electrode 122.

Gate signals may be supplied to each gate line 102 via a corresponding gate pad 150. Accordingly, each gate pad 150 may be connected to a gate driver (not shown) that supplies the gate signals. In one aspect of the present invention, each gate pad 150 may comprise the transparent conductive material 170 and the overlaying gate metal material 172. In another aspect of the present invention, the gate line 102 and the gate electrode 106 may also comprise the transparent conductive material 170 and the overlaying gate metal material 172. In yet another aspect of the present invention, at least a portion of the transparent conductive material 170 of the gate pad 150 may be exposed by a contact hole 180 formed through the gate insulating pattern 112 and the portion of the gate metal material 172 included within the gate pad 150.

Data signals may be supplied to each data line 104 via a corresponding data pad 160. Accordingly, each data pad 160 may be connected to a data driver (not shown) that supplies the data signals. In one aspect of the present invention, each data pad 160 may comprise the transparent conductive material 170 and directly contact the data line 104, wherein a portion of the transparent conductive material 170 within the data pad 160 is exposed by the data line 104. Alternatively, the data pad 160 may consist of the transparent conductive material 170, and the gate metal material 172 formed on the transparent conductive material 170 at an area overlapped by the data line 104.

During operation, an electric field may be generated between the pixel electrode 122 and a common electrode formed on a color filter array substrate (not shown) when a pixel signal is applied from a TFT 130 to the pixel electrode 122 and when a reference voltage is applied to the common electrode. The liquid crystal molecules have a particular dielectric anisotropy. Therefore, in the presence of the electric field, liquid crystal molecules rotate to align themselves between the TFT and color filter array substrates. The magnitude of the applied electric field determines the extent of rotation of the liquid crystal molecules. Accordingly, various gray scale levels of light emitted by a light source (not shown) may be transmitted by a pixel area by varying the magnitude of the applied electric field.

According to principles of the present invention, the transparent conductive material 170 has a strong corrosion resistance. Thus, as described above, portions of the transparent conductive material 170 comprised within the gate pad 150 and the data pad 160 may be exposed to ensure high reliability against corrosion. Further, the gate pad 150 and the data pad 160 having the exposed transparent conductive material 170 can be prevented from breaking if a tape carrier package (TCP) is repetitively attached and detached.

Figure 6A:
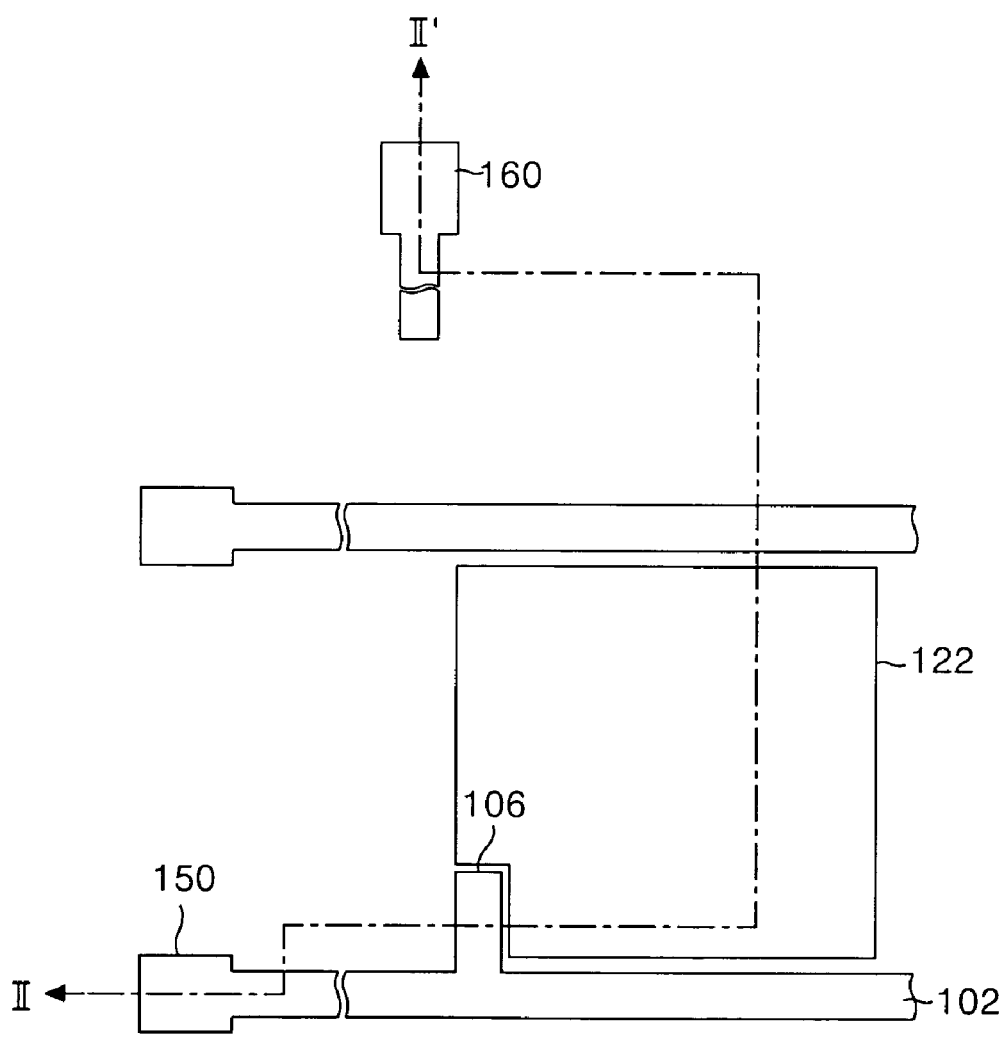

FIGS. 6A and 6B illustrate plan and sectional views, respectively, describing a first mask process in the method of fabricating the TFT array substrate according to the first embodiment of the present invention.

Referring to FIGS. 6A and 6B, a first conductive pattern group may be formed on the lower substrate 101 in a first mask process. In one aspect of the present invention, the first conductive pattern group may, for example, include the pixel electrode 122, the gate line 102, the gate electrode 106, the gate pad 150, and the data pad 160.

According to principles of the present invention, the first conductive pattern group may comprise a transparent conductive material 170 and a gate metal material 172 sequentially deposited on the lower substrate 101 by a technique such as sputtering, or the like. In one aspect of the present invention, the transparent conductive material 170 may include a material such as indium-tin-oxide (ITO), tin-oxide (TO), indium-zinc-oxide (IZO) or indium-tin-zinc-oxide (ITZO), or the like, or combinations thereof. In another aspect of the present invention, the gate metal material 172 may include a material such as an aluminum group metal (e.g., aluminum/neodymium (AlNd), etc.) molybdenum (Mo), copper (Cu), chrome (Cr), tantalum (Ta), titanium (Ti), or the like, or combinations thereof. The transparent conductive material 170 and gate metal material 172 may be patterned using photolithographic and etching techniques using a first mask pattern to provide the aforementioned first conductive pattern group. Accordingly, the gate line 102, the gate electrode 106, the gate pad 150, the data pad 160, and the pixel electrode 122 may have a double-layer structure including the transparent conductive material 170 and gate metal material 172.

Figure 7A:
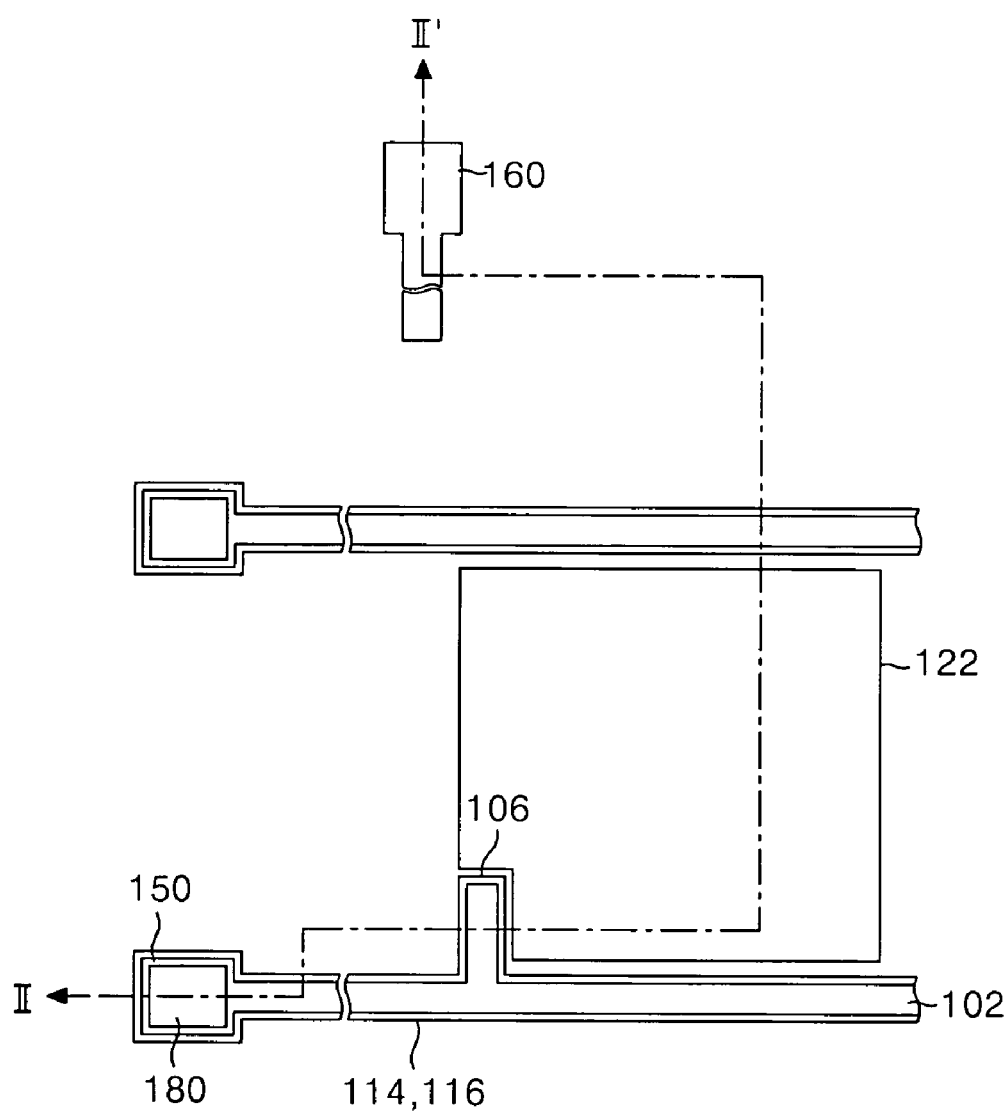
FIGS. 7A and 7B illustrate plan and sectional views, respectively, generally describing a second mask process in the method of fabricating the TFT array substrate according to the first embodiment of the present invention.
Figure 7B:
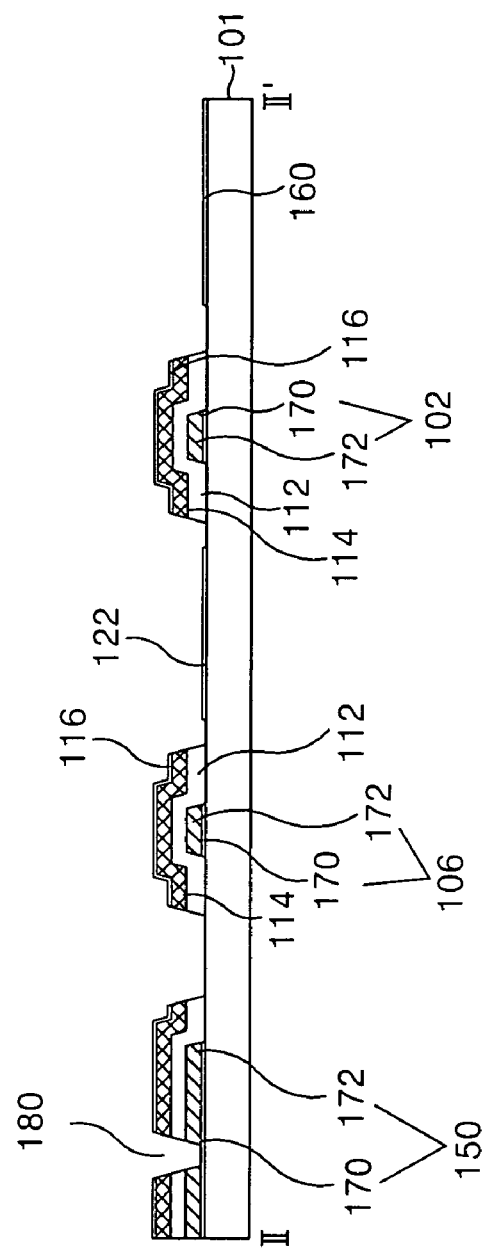

FIGS. 7A and 7B illustrate plan and sectional views, respectively, generally describing a second mask process in the method of fabricating the TFT array substrate according to the first embodiment of the present invention.

Referring to FIGS. 7A and 7B, the gate insulating pattern 112 and semiconductor pattern, comprised of an active layer 114 and an ohmic contact layer 116, are formed on the lower substrate 101 and on the first conductive pattern group in a second mask process. According to principles of the present invention, the gate insulating pattern 112 and the active and ohmic contact layers 114 and 116 are formed to expose the gate pad 150, the data pad 160, and the pixel electrode 122. In one aspect of the present invention, portions of the gate metal material 172 exposed by the gate insulating pattern 112 and the active and ohmic contact layers 114 and 116 may be removed to completely expose the transparent conductive material 170 included within the data pad 160 and the pixel electrode 122. In another aspect of the present invention, a first contact hole 180 may be formed through the semiconductor pattern, the gate insulating pattern 112, and a portion of the gate metal material 172 within the gate pad 150 to partially expose the transparent conductive material 170 included within the gate pad 150.

The second mask process of the first embodiment described above with respect to FIGS. 7A and 7B will now be described in greater detail with respect to FIGS. 8A to 8C.

Referring to FIG. 8A, a gate insulating film 111, a first semiconductor layer 115, and a second semiconductor layer 117 are sequentially formed on the lower substrate 101 and on the first conductive pattern group. In one aspect of the present invention, the gate insulating film 111 and first and second semiconductor layers 115 and 117 are formed according to a deposition technique such as PEVCD, sputtering, or the like. In another aspect of the present invention, the gate insulating film 111 may, for example, include an inorganic insulating material such as silicon nitride (SiNx) or silicon oxide (SiOx). In another aspect of the present invention, the first semiconductor layer 115 may, for example, include undoped amorphous silicon. In still another aspect of the present invention, the second semiconductor layer 117 may, for example, include N- or P-doped amorphous silicon.

A first photo-resist film 156 is then formed over the entire surface of the second semiconductor layer 117 and is photolithographically patterned using a second mask pattern 162. According to principles of the present invention, the second mask pattern 162 may, for example, include a mask substrate 152 formed of a suitably transparent material and a plurality of shielding parts 154 within shielding areas S2 on the mask substrate 152, wherein the shielding areas S2 are separated by exposure areas S1.

Figure 8B:
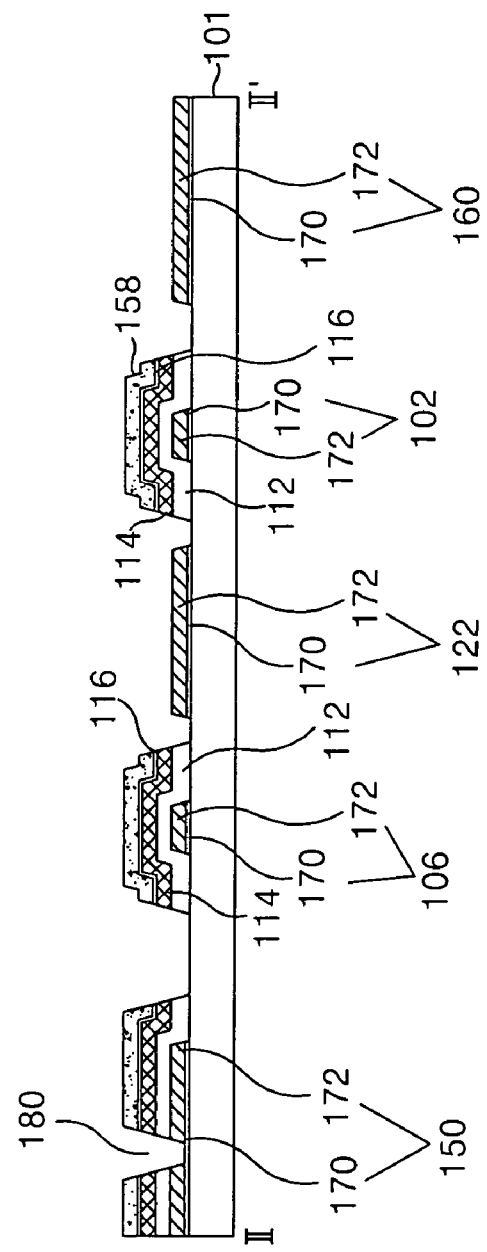

Referring to FIG. 8B, the first photo-resist film 156 may, via the second mask pattern 162, be selectively exposed to light through the exposure areas S1 and developed, thereby creating a first photo-resist pattern 158. The gate insulating film 111 and the first and second semiconductor layers 115 and 117 may then be patterned, via the first photo-resist pattern 158, using photolithographic and etching techniques to form the gate insulating pattern 112 in addition to the semiconductor patterns including the active and ohmic contact layers 114 and 116, respectively. In one aspect of the present invention, the gate insulating pattern 112, in addition to the active and ohmic contact layers 114 and 116, may be patterned to expose the pixel electrode 122 and the data pad 160. Further, a first contact hole 180 may be formed through the gate insulating pattern 112 and the active and ohmic contact layers 114 and 116 to expose a portion of the gate pad 150. In another aspect of the present invention, a width of the gate insulating pattern 112 and the active and ohmic contact layers 114 and 116 may be greater than a width of the structures within the first conductive pattern group to prevent a deterioration of the channel characteristics of the TFT 130. Thus, upon forming the gate insulating pattern 112 and the active and ohmic contact layers 114 and 116, gate metal material 172 within the gate pad 150, the pixel electrode 122, and the data pad 160 may be exposed. After forming the gate insulating pattern 112 and active and ohmic contact layers 114 and 116, the first photo-resist pattern 158 is stripped.

Figure 8C:
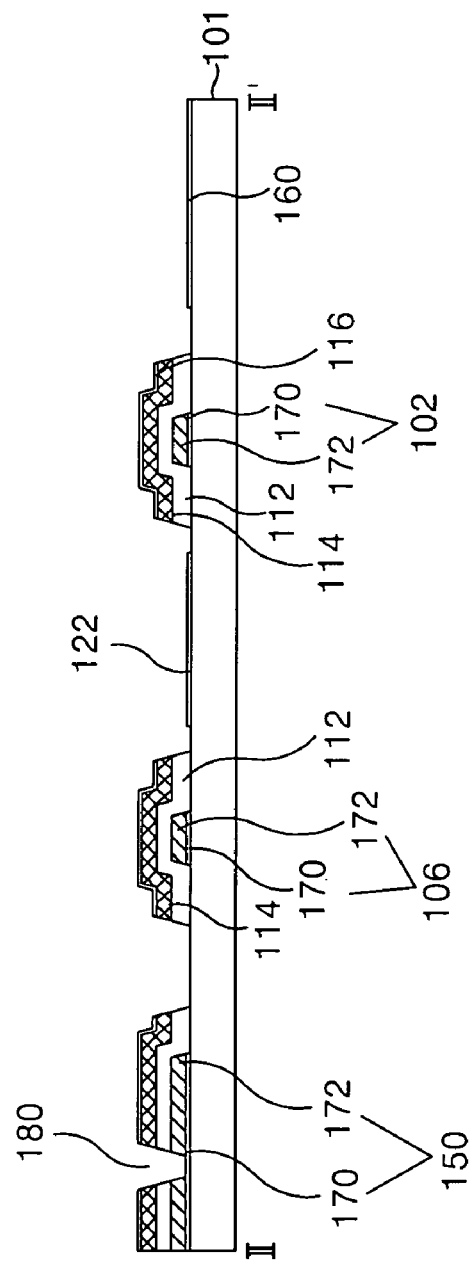

Next, and referring to FIG. 8C, the portions of the exposed gate metal material 172 may be removed in a wet etching process using the gate insulating pattern 112 and the active and ohmic contact layers 114 and 116 as a mask. Accordingly, an entirety of the gate metal material 172 within the data pad 160 and the pixel electrode 122 is removed to expose the entire transparent conductive material 170 included therein while a portion of the gate metal material 172 within the gate pad 150 is removed to expose the transparent conductive material 170 therein, arranged within the first contact hole 180.

Figure 9A:
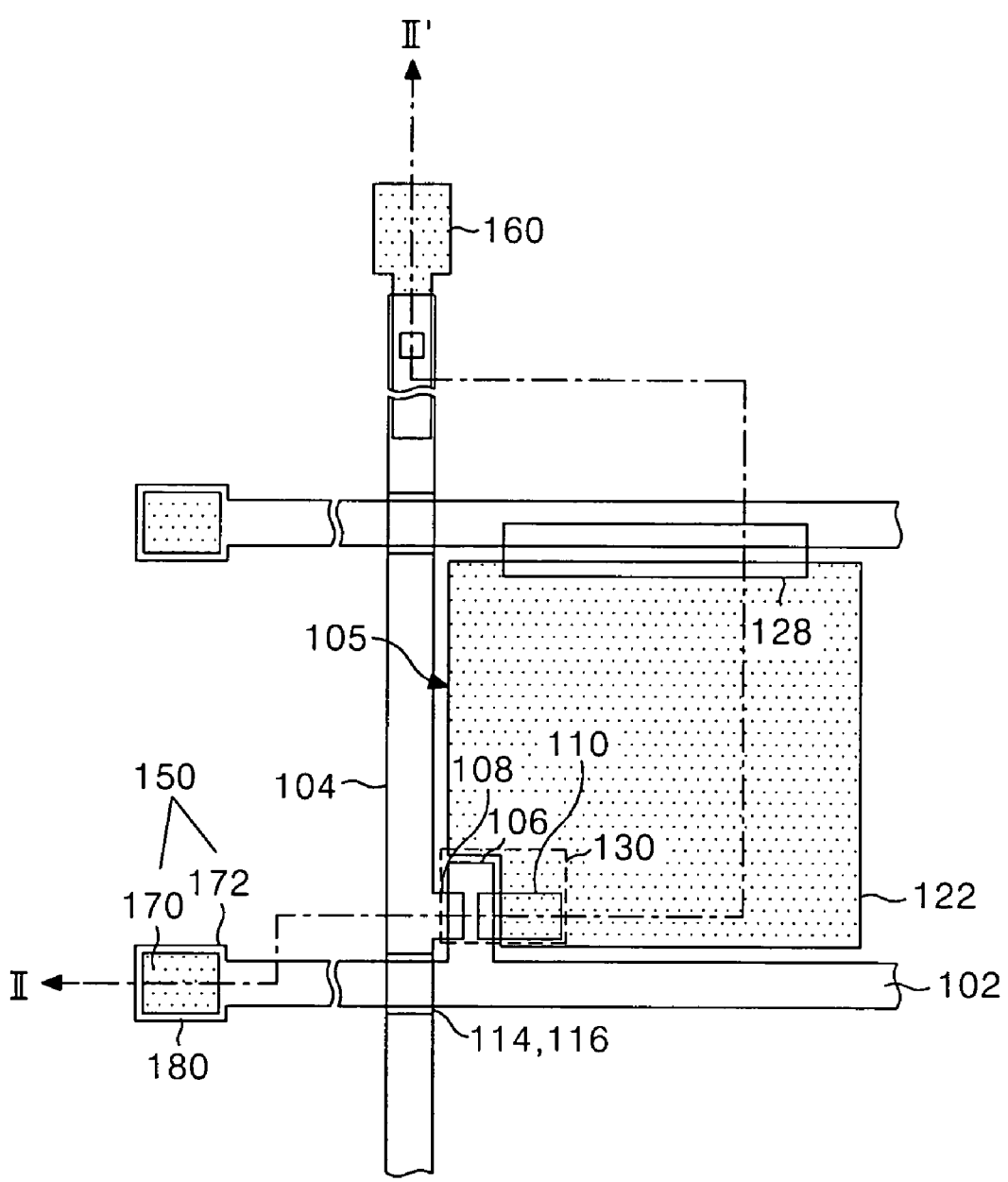
FIGS. 9A and 9B illustrate plan and sectional views, respectively, generally describing a third mask process in the method of fabricating the TFT array substrate according to the first embodiment of the present invention.
Figure 9B:
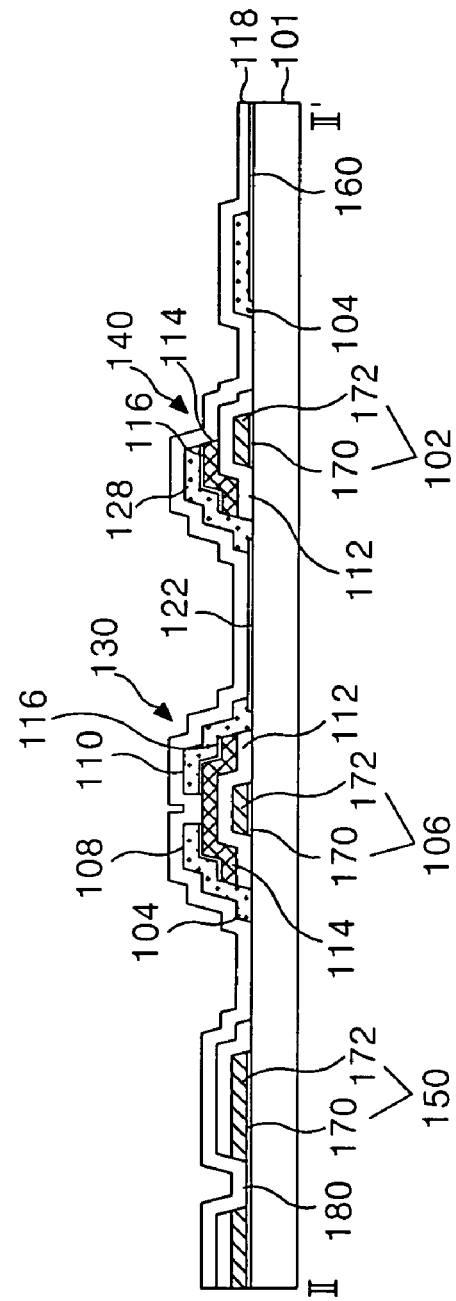

FIGS. 9A and 9B illustrate plan and sectional views, respectively, generally describing a third mask process in the method of fabricating the TFT array substrate according to the first embodiment of the present invention.

Referring to FIGS. 9A and 9B, a second conductive pattern group may be formed on the lower substrate 101 and on the gate insulating pattern 112, in addition to the active and ohmic contact layers 114 and 116, in a third mask process. In one aspect of the present invention, the second conductive pattern group may, for example, include the data line 104, the source electrode 108, the drain electrode 110, and the storage electrode 128.

The third mask process of the first embodiment described above with respect to FIGS. 9A and 9B will now be described in greater detail with reference to FIGS. 10A to 10E.

Referring to FIG. 10A, a data metal layer 109 may be formed on the lower substrate 101, the gate insulating pattern 112, and on the active and ohmic contact layers 114 and 116. In one aspect of the present invention, the data metal layer 109 may be formed using a deposition technique such as sputtering, or the like. In another aspect of the present invention, the data metal layer 109 may, for example, include a metal such as molybdenum (Mo), copper (Cu), or the like, or combinations thereof.

A second photo-resist film 178 is then formed over the entire surface of the data metal layer 109 and is photolithographically patterned using a third mask pattern 161. According to principles of the present invention, the third mask pattern 161 is provided as a partial-exposure mask. For example, the third mask pattern 161 may include a mask substrate 164 formed of a suitably transparent material, a plurality of shielding parts 166 within shielding areas S2 on the mask substrate 164, and a partial-exposure part (e.g., a diffractive part or transflective part) 168 within a partial-exposure area S3 on the mask substrate 164. It should be noted that areas of the mask 161 that do not support a shielding or partial-exposure parts are referred to as exposure areas S1.

Figure 10B:
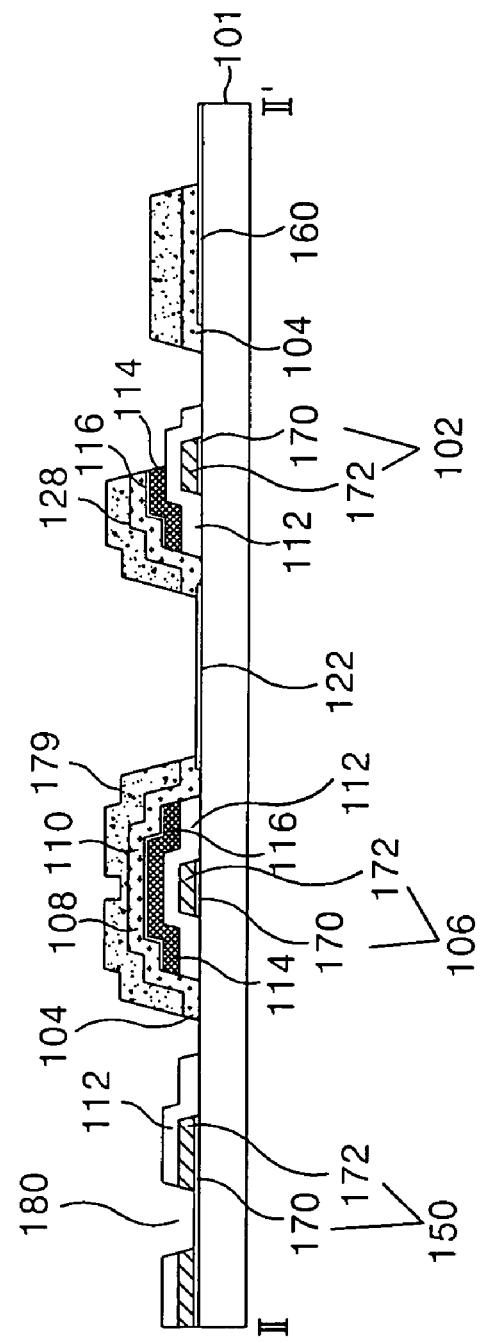

Referring to FIG. 10B, the second photo-resist film 178 may, via the third mask pattern 161, be selectively exposed to light through the exposure and partial-exposure areas S1 and S3 and be developed, thereby creating a second photo-resist pattern 179 having a step difference between the shielding and partial-exposure areas S2 and S3. Accordingly, the height of the second photo-resist pattern 179 aligned with the partial-exposure area S3 may be lower than the height of the second photo-resist pattern 179 aligned with the shielding areas S2.

Subsequently, the second photo-resist pattern 179 is used as a mask to pattern the data metal layer 109 in a wet etching technique and form the aforementioned second conductive pattern group (i.e., the storage electrode 128, the data line 104, the source electrode 108, and the drain electrode 110), wherein the source and drain electrodes 108 and 110 are connected to each other in a region corresponding to partial-exposure area S3 (i.e., the channel region of a subsequently formed TFT 130), wherein the source electrode 108 is connected to one side of the data line 104, and wherein the drain electrode 110 is connected to the pixel electrode 122. In one aspect of the present invention, the data metal layer 109 may be patterned to expose portions of the transparent conductive material 170 of the gate pad 150 within the first contact hole 180, the data pad 160, and the pixel electrode 122. In another aspect of the present invention, the data metal layer 109 may be patterned such that the drain and storage electrodes 110 and 128 directly contact the pixel electrode 122.

Next, the second photo-resist pattern 179 is used as a mask to pattern the active and ohmic contact layers 114 and 116 in a dry etching process. In one aspect of the present invention, the patterning may, for example, include removing portions of the active and ohmic contact layers 114 and 116 that are not overlapped by the second conductive pattern group. In another aspect of the present invention, the patterning may, for example, include dry etching portions of the active and ohmic contact layers 114 and 116 positioned between adjacent cells to prevent electrical shorting therebetween.

Figure 10C:
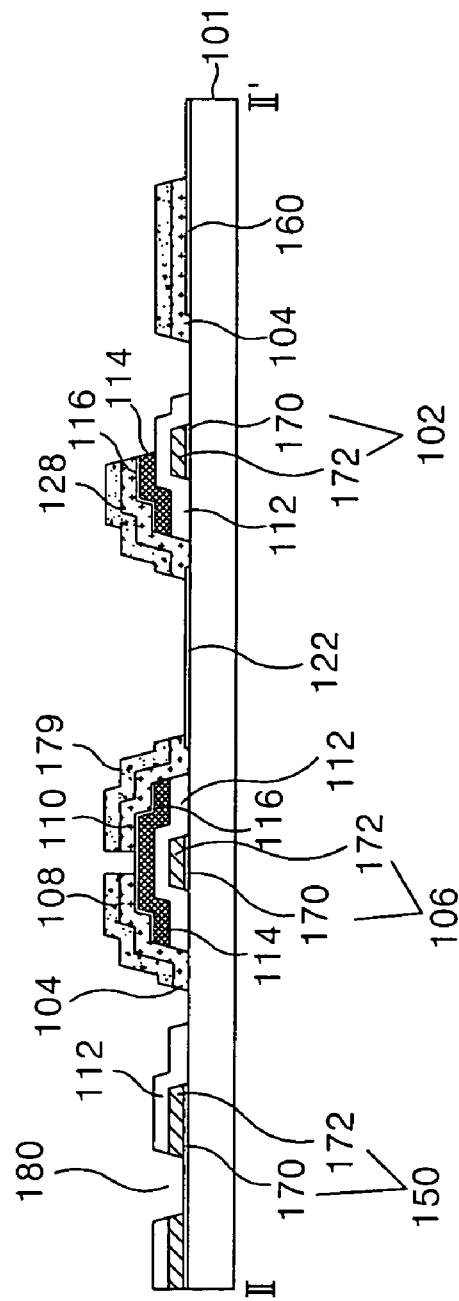
Figure 10D:
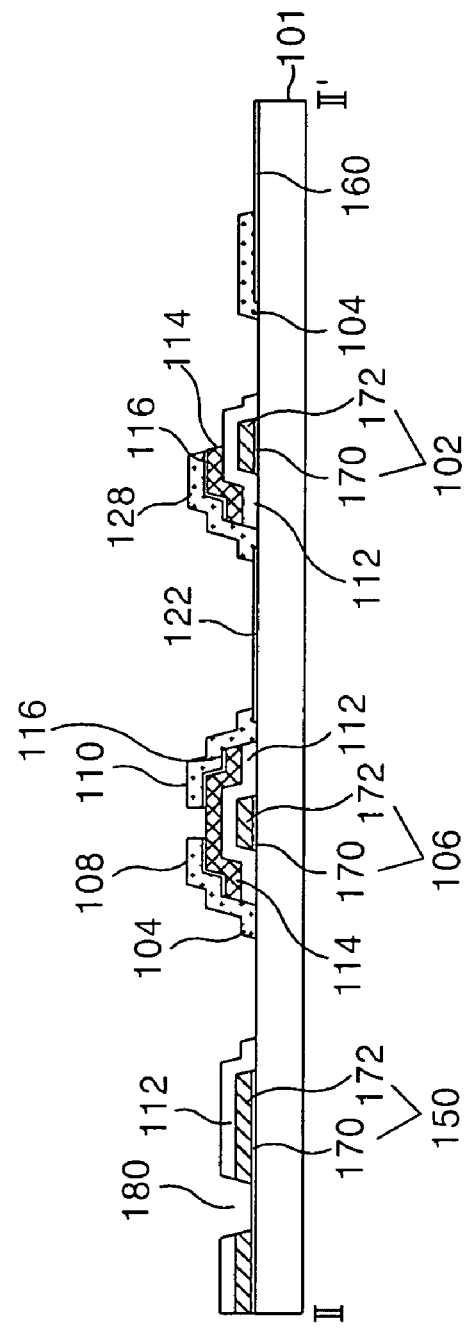

Referring to FIG. 10C, after the active and ohmic contact layers 114 and 116 are formed and patterned, the portion of the second photo-resist pattern 179 having the relatively lower height (i.e., the portion of the second photo-resist pattern 179 arranged within the channel region of the subsequently formed TFT 130, formed via the partial-exposure area S3 of the third mask pattern 161) is removed in an ashing process using oxygen (O2) plasma. Upon performing the ashing process, the relatively thicker portions of the second photo-resist pattern 179 (i.e., portions of the second photo-resist pattern 179 arranged outside the channel region of the subsequently formed TFT 130, formed via the shielding areas S2) are thinned but, nevertheless, remain. Using the thinned second photo-resist pattern 179 as a mask, portions of the data metal layer 109 and the ohmic contact layer 116 in the channel portion of the subsequently formed TFT 130 are removed in an etching process. As a result, the active layer 114 within the channel portion is exposed and the source electrode 108 is disconnected from the drain electrode 110. With reference to FIG. 10D, the remaining second photo-resist pattern 179 is then removed in a stripping process.

Figure 10E:
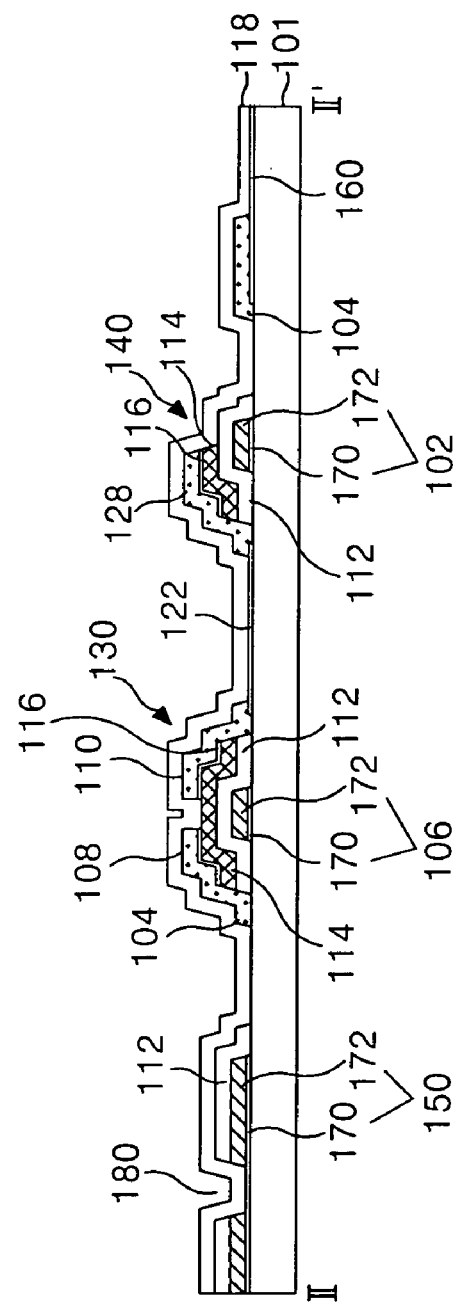

Referring next to FIG. 10E, the protective film 118 is formed over the entire surface of the substrate 101 and on the second conductive pattern group. In one aspect of the present invention, the protective film 118 may, for example, include an inorganic insulating material such as silicon nitride (SiNx), silicon oxide (SiOx), or the like, or combinations thereof, an organic insulating material such as acrylic organic compound having a small dielectric constant, BCB (benzocyclobutene), or PFCB (perfluorocyclobutane), or the like, or combinations thereof.

Figure 11:
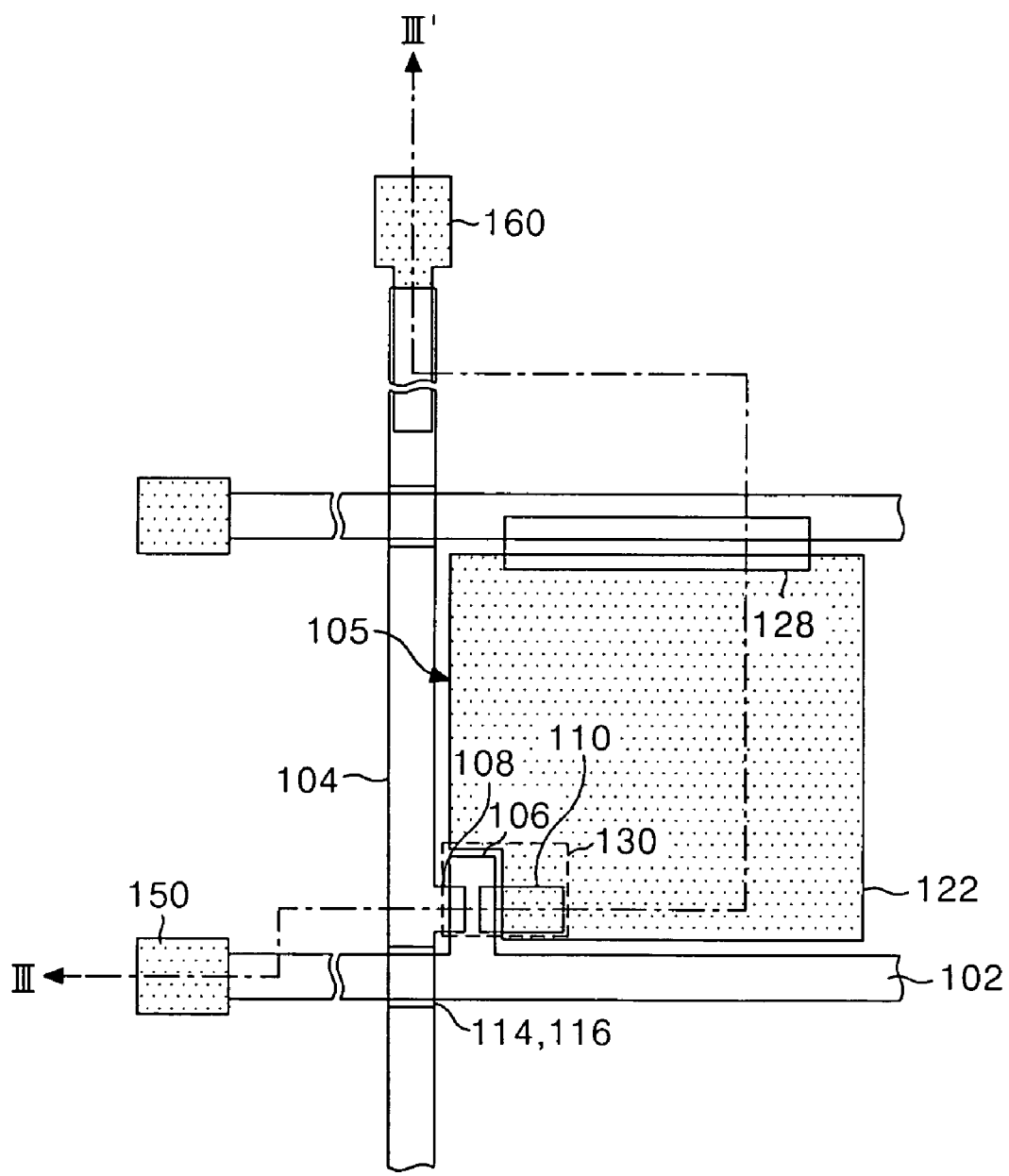
FIG. 11 illustrates a plan view of a TFT array substrate according to a second embodiment of the present invention.
Figure 12:
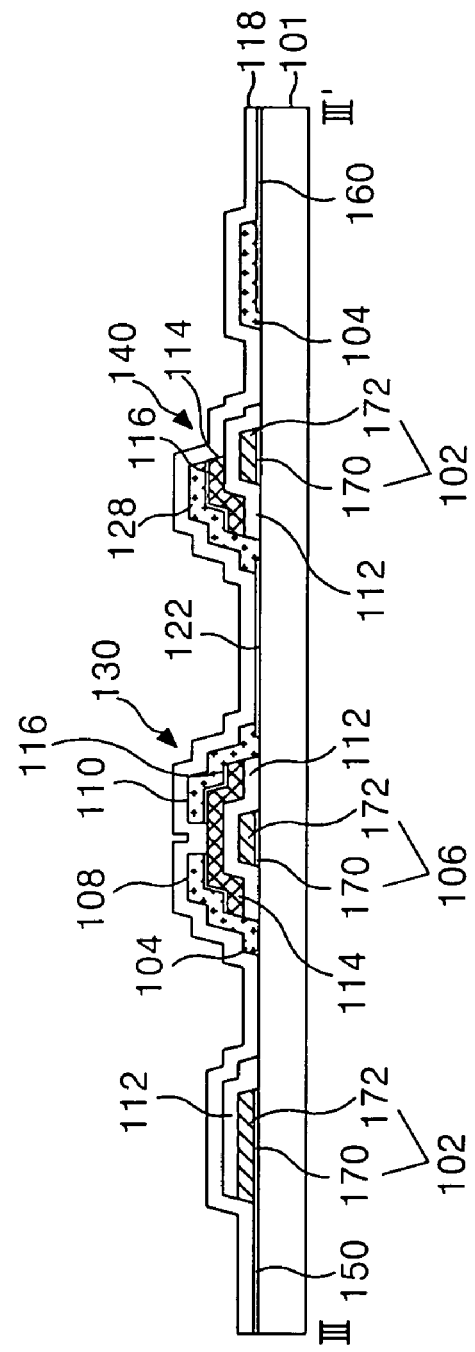
FIG. 12 illustrates a sectional view of the TFT array substrate taken along line III-III' shown in FIG. 11.

FIG. 11 illustrates a plan view of a TFT array substrate according to a second embodiment of the present invention. FIG. 12 illustrates a sectional view of the TFT array substrate taken along line 111-111' shown in FIG. 11.

The TFT array substrate shown in FIGS. 11 and 12, and its method of fabrication, is, in many respects, similar to the TFT array substrate shown in FIGS. 4 and 5 but is different with respect to the gate pad. Thus, for the sake of brevity, a detailed explanation of elements similar to both the second and first embodiments will be omitted.

Referring to FIGS. 11 and 12, gate signals may be supplied to each gate line 102 via a corresponding gate pad 150. Accordingly, the gate pad 150 may be connected to a gate driver (not shown) that supplies gate signals. In one aspect of the present invention, the gate line 102 may comprise the transparent conductive material 170 and the overlaying gate metal material 172. In another aspect of the present invention, the gate pad 150 may extend from the gate line 102 and comprise the transparent conductive material 170. In still another aspect of the present invention, the transparent conductive material 170 of the gate pad 150 may be completely exposed by the gate metal material 172 of the gate line 102.

According to principles of the present invention, the transparent conductive material 170 has a strong corrosion resistance. Thus, as described above, portions of the transparent conductive material 170 comprised within the gate pad 150 and the data pad 160 may be exposed to ensure high reliability against corrosion. Further, the gate pad 150 and the data pad 160 having the exposed transparent conductive material 170 can be prevented from breaking if a tape carrier package (TCP) is repetitively attached and detached.

Figure 13A:
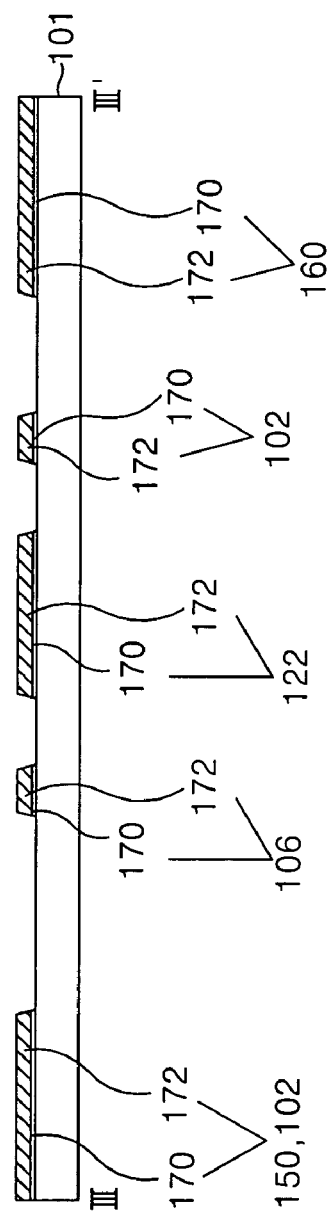
FIGS. 13A to 13C illustrate sectional views generally describing a method of fabricating the TFT array substrate according to the second embodiment of the present invention.
Figure 13B:
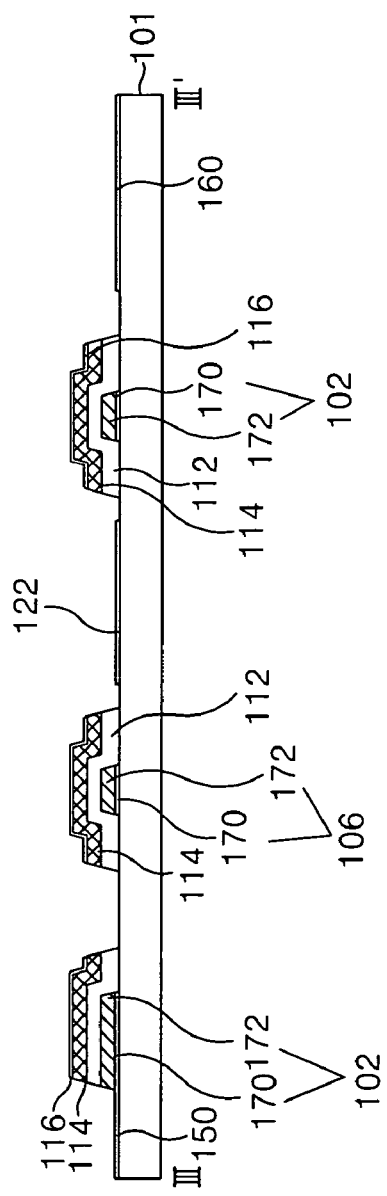
Figure 13C:
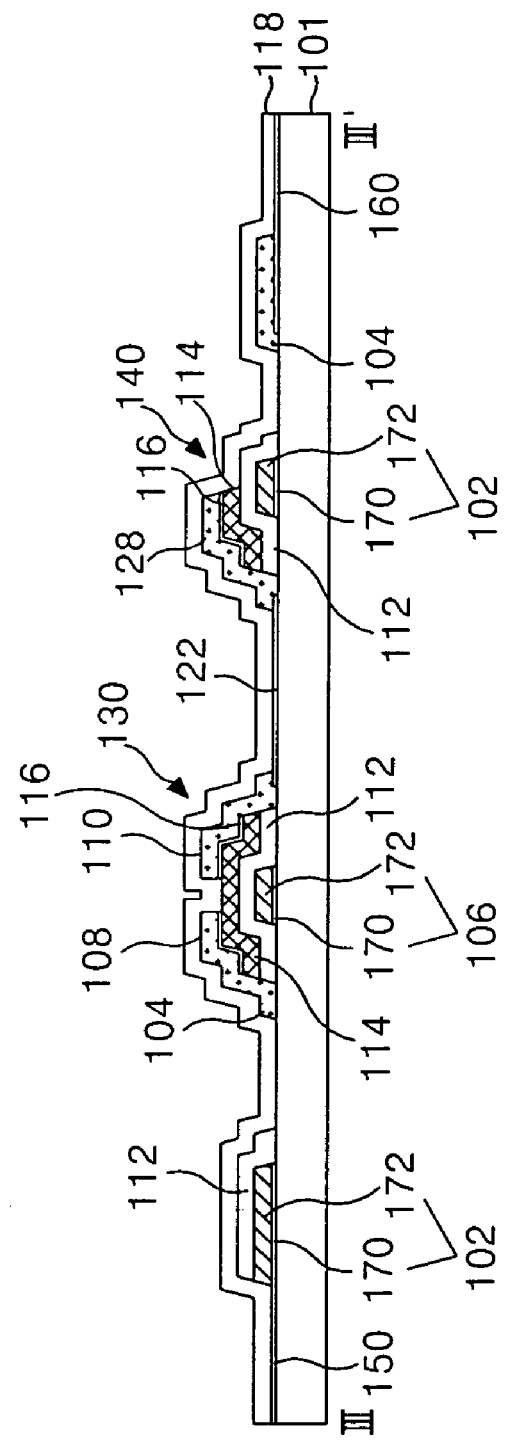

FIGS. 13A to 13C illustrate sectional views generally describing a method of fabricating the TFT array substrate according to the second embodiment of the present invention.

Referring to FIG. 13A, a first conductive pattern group may be formed on the lower substrate 101 in a first mask process. In one aspect of the present invention, the first conductive pattern group may, for example, include the pixel electrode 122, the gate line 102, the gate electrode 106, the gate pad 150, and the data pad 160.

According to principles of the present invention, the first conductive pattern group may comprise a transparent conductive material 170 and a gate metal material 172 sequentially deposited on the lower substrate 101 by a technique such as sputtering, or the like. In one aspect of the present invention, the transparent conductive material 170 may include a material such as indium-tin-oxide (ITO), tin-oxide (TO), indium-zinc-oxide (IZO) or indium-tin-zinc-oxide (ITZO), or the like, or combinations thereof. In another aspect of the present invention, the gate metal material 172 may include a material such as an aluminum group metal (e.g., aluminum/neodymium (AlNd), etc.) molybdenum (Mo), copper (Cu), chrome (Cr), tantalum (Ta), titanium (Ti), or the like, or combinations thereof. The transparent conductive material 170 and gate metal material 172 may be patterned using photolithographic and etching techniques using a first mask pattern to provide the aforementioned first conductive pattern group. Accordingly, the gate line 102, the gate electrode 106, the gate pad 150, the data pad 160, and the pixel electrode 122 may have a double-layer structure including the transparent conductive material 170 and gate metal material 172.

Referring to FIG. 13B, a gate insulating pattern 112 and semiconductor patterns, comprised of the active and ohmic contact layers 114 and 116, are formed on the lower substrate 101 and on the first conductive pattern group in a second mask process. Accordingly, the gate insulating pattern 112 and the active and ohmic contact layers 114 and 116 may be formed to expose the gate pad 150, the data pad 160, and the pixel electrode 122. In one aspect of the present invention, portions of the gate metal material 172 exposed by the gate insulating pattern 112 and the active and ohmic contact layers 114 and 116 may be removed to expose the transparent conductive material 170 included within the data pad 160, the pixel electrode 122, and the gate pad 150.

For example, a gate insulating film and first and second semiconductor layers may be sequentially formed on the lower substrate 101 and on the first conductive pattern group. In one aspect of the present invention, In one aspect of the present invention, the gate insulating film, and first and second semiconductor layers may be formed according to a deposition technique such as PEVCD, sputtering, or the like. In an etching technique using a second mask pattern, the gate insulating film and the first and second semiconductor layers are then patterned to form the gate insulating pattern 112 and the active and ohmic contact layers 114 and 116, respectively. In one aspect of the present invention, the gate insulating pattern 112, in addition to the active and ohmic contact layers 114 and 116, may be patterned to expose the pixel electrode 122, the data pad 160, and the gate pad 150. Thus, upon forming the gate insulating pattern 112 and the active and ohmic contact layers 114 and 116, gate metal material 172 within the gate pad 150, the pixel electrode 122, and the data pad 160 may be exposed.

Subsequently, the portions of the exposed gate metal material 172 may be removed in a wet etching process using the gate insulating pattern 112 and the active and ohmic contact layers 114 and 116 as a mask. Accordingly, the gate metal material 172 within the data pad 160, the pixel electrode 122, and the gate pad 150 may be removed to expose the transparent conductive material 170 included therein.

Referring to FIG. 13C, a second conductive pattern group may be formed on the lower substrate 101 and on the gate insulating pattern 112, in addition to the active and ohmic contact layers 114 and 116, in a third mask process. In one aspect of the present invention, the second conductive pattern group may, for example, include the data line 104, the source electrode 108, the drain electrode 110, and the storage electrode 128.

For example, a data metal layer may be formed on the lower substrate 101, the gate insulating pattern 112, and on the active and ohmic contact layers 114 and 116. Similar to the first embodiment discussed above, a third mask pattern (i.e., a partial-exposure mask pattern) may be used to form a photo-resist mask having relatively thicker regions, corresponding to shielding areas of the third mask pattern, and relatively thinner regions, corresponding to partial-exposure areas of the third mask pattern. In an wet etching technique using the aforementioned photo-resist mask, the data metal layer may be patterned to form the aforementioned second conductive pattern group (i.e., the storage electrode 128, the data line 104, and the source electrode 108, and the drain electrode 110) wherein the source and drain electrodes 108 and 110 are connected to each other in a region corresponding to a partial-exposure area of the third mask pattern and wherein the source electrode 108 is connected to one side of the data line 104. In one aspect of the present invention, the data metal layer may be patterned to expose portions of the transparent conductive material 170 of the gate pad 150, the data pad 160, and the pixel electrode 122. In another aspect of the present invention, the data metal layer may be patterned such that the drain and storage electrodes 110 and 128 directly contact the pixel electrode 122.

Next, the photo-resist pattern may be used as a mask to pattern the active and ohmic contact layers 114 and 116 in a dry etching process. After the active and ohmic contact layers 114 and 116 are patterned, the relatively thinner portion of the photo-resist pattern may be removed while the relatively thicker portions of the photo-resist pattern may be thinned in an ashing process using oxygen (O2) plasma. Using the thinned photo-resist pattern as a mask, portions of the data metal layer and the ohmic contact layer 116 in the channel portion of the subsequently formed TFT 130 are removed in an etching process. As a result, the active layer 114 within the channel portion is exposed and the source electrode 108 is disconnected from the drain electrode 110. Subsequently, a protective film 118 is formed over the entire surface of the substrate 101 and on the second conductive pattern group.

Figure 14:
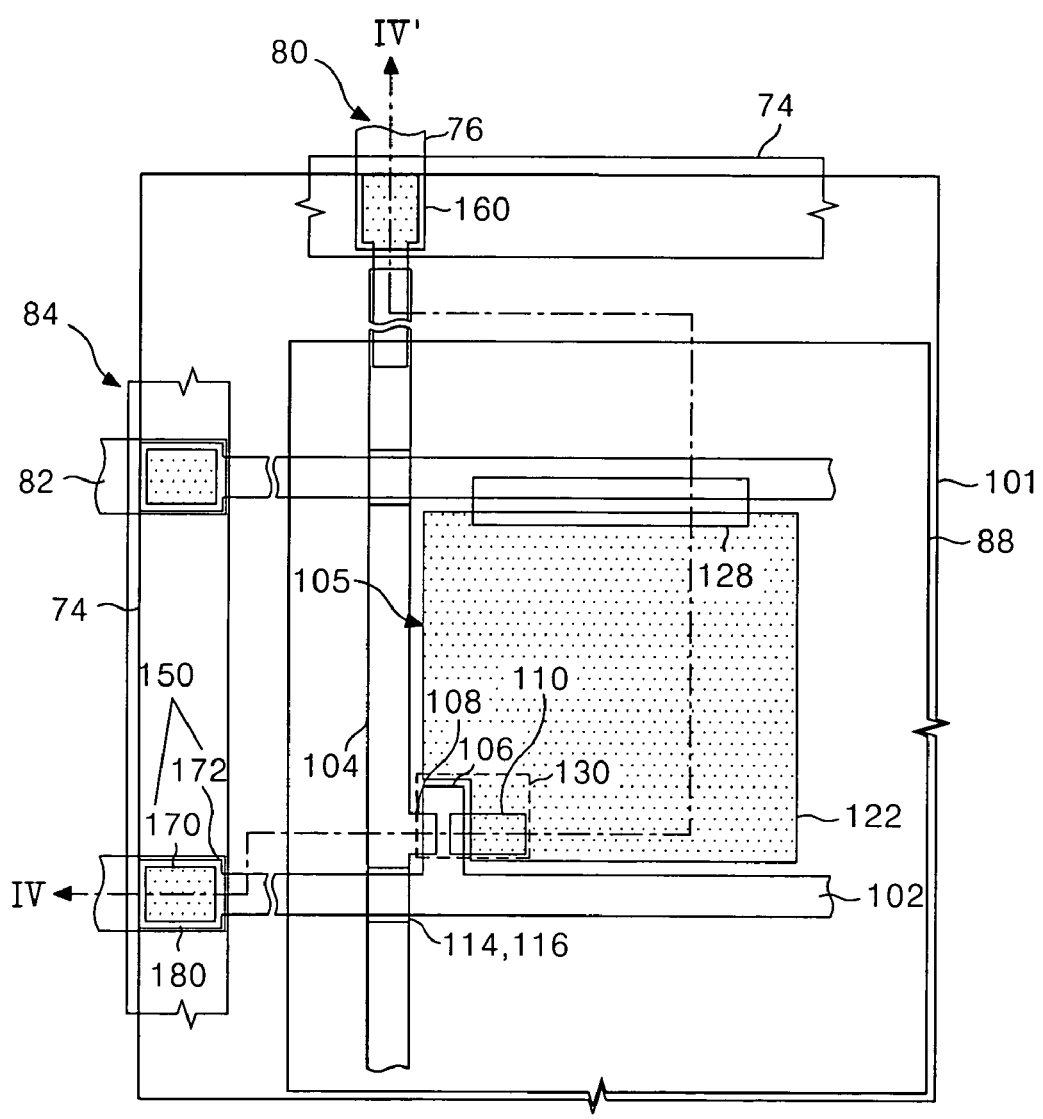
FIG. 14 illustrates a plan view of a liquid crystal display device incorporating the TFT array substrate shown in FIG. 4.
Figure 15:
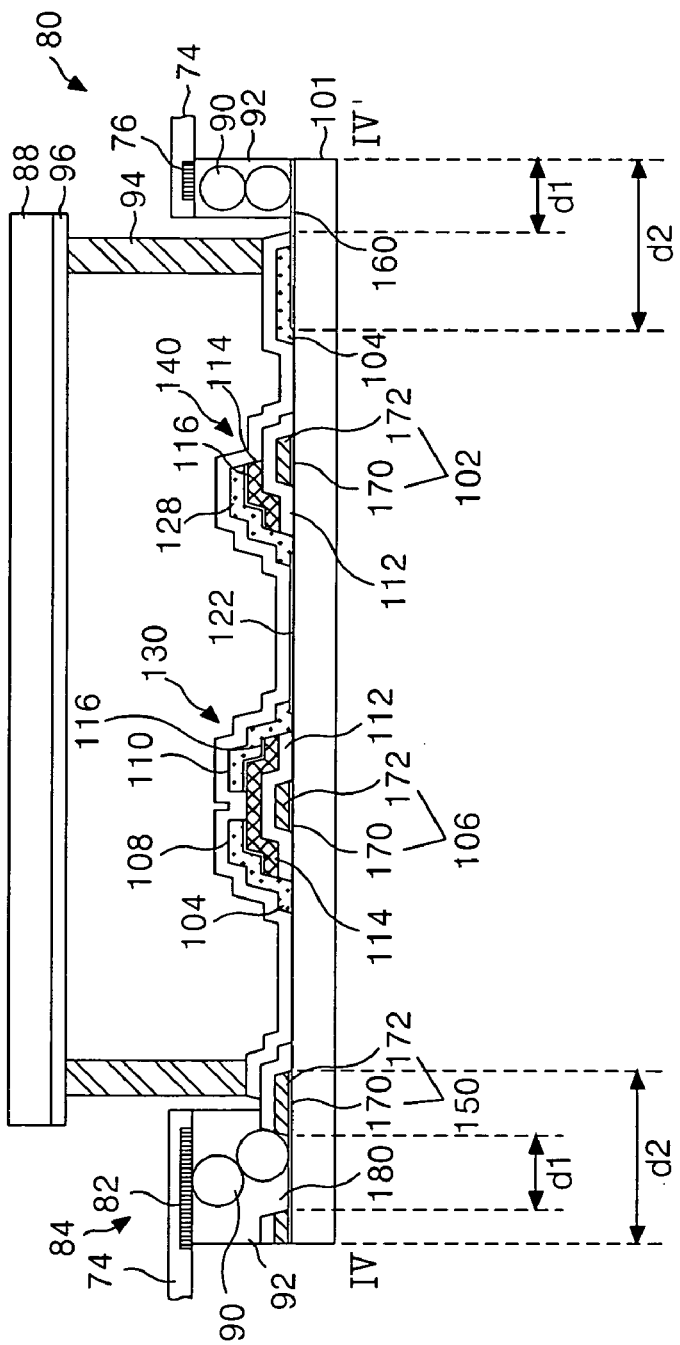
FIG. 15 illustrates a sectional view of the liquid crystal display device along line IV-IV' shown in FIG. 14.
Figure 16:
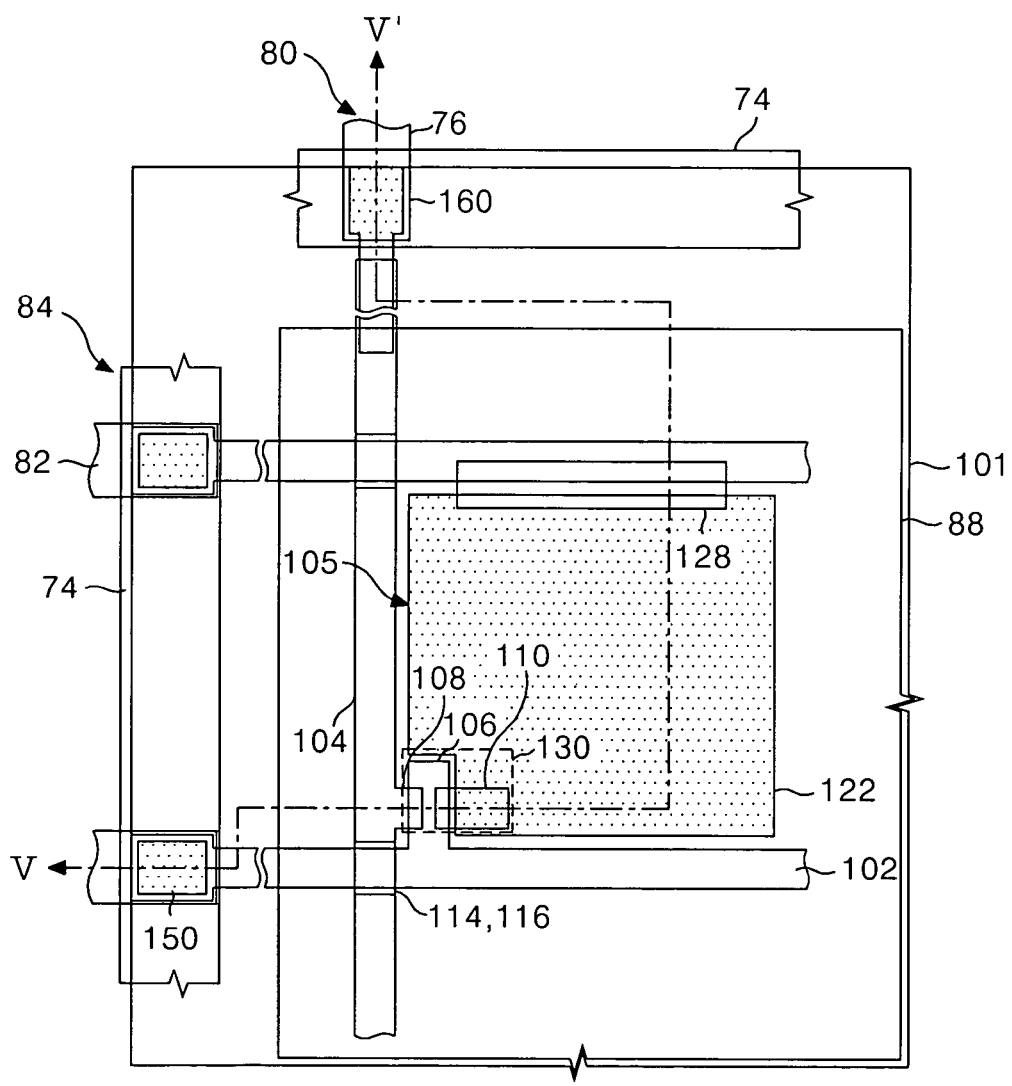
FIG. 16 illustrates a plan view of a liquid crystal display device incorporating the TFT array substrate shown in FIG. 11.
Figure 17:
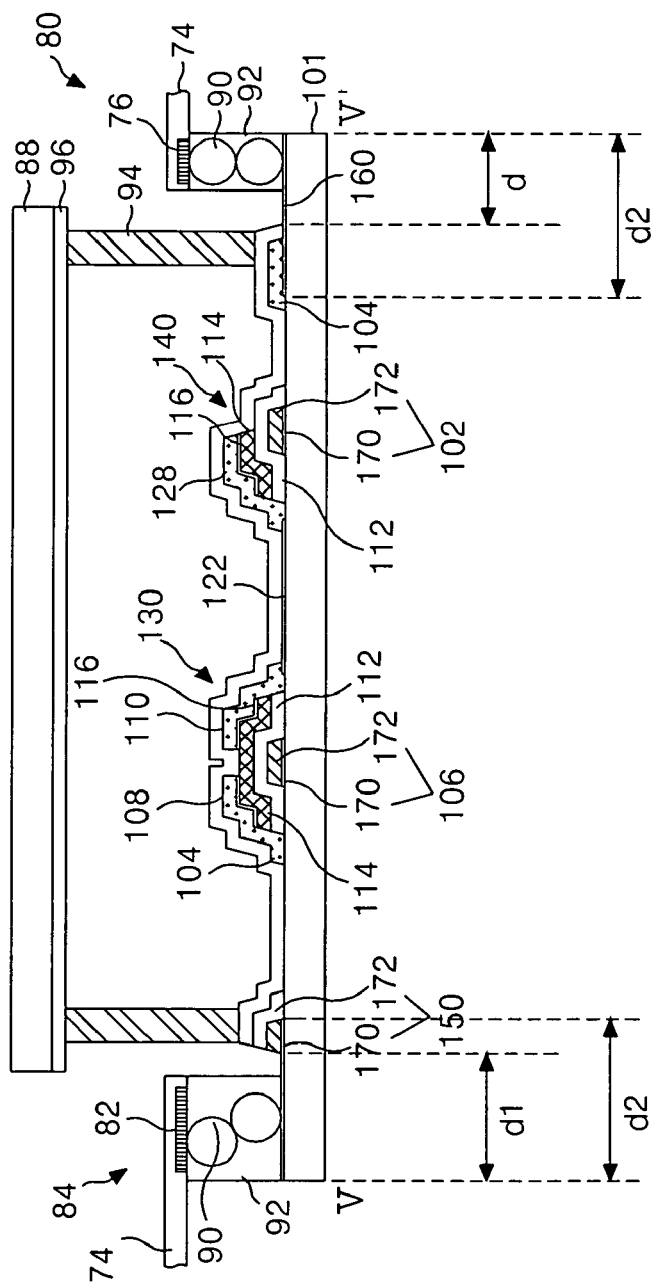
FIG. 17 illustrates a sectional view of the liquid crystal display device along line V-V' shown in FIG. 16.

FIG. 14 illustrates a plan view of a liquid crystal display device incorporating the TFT array substrate shown in FIG. 4. FIG. 15 illustrates a sectional view of the liquid crystal display device along line IV-IV' shown in FIG. 14. FIG. 16 illustrates a plan view of a liquid crystal display device incorporating the TFT array substrate shown in FIG. 11. FIG. 17 illustrates a sectional view of the liquid crystal display device along line V-V' shown in FIG. 16.

Referring to FIGS. 14 to 17, a liquid crystal display (LCD) device may be formed by joining any of the aforementioned TFT array substrates discussed above with respect to the first and second embodiments with a color filter array substrate. In one aspect of the present invention, the color filter array substrate may, for example, include a color filter array 96 formed on an upper substrate 88. In another aspect of the present invention, the TFT array substrate and the color filter array substrate may be joined to each other with a sealant 94.

According to principles of the present invention, the TFT array substrate may, when joined to the color filter array substrate, extend laterally beyond the color filter array substrate such that the gate and data pads 150 and 160 (collectively referred to as "pads") may be outside a cell gap defined by the joined TFT and color filter array substrates.

After joining the TFT and color filter array substrates, portions of the protective film 118 over the pads may be removed in a pad opening process to expose transparent conductive material 170 included within the gate and data pads 150 and 160. Referring specifically to FIGS. 14 and 15 the gate pad 150 is provided such that the transparent conductive material 170 is partially exposed through the first contact hole 180. Referring specifically to FIGS. 16 and 17, the gate pad 150 is provided such that the transparent conductive material 170 is completely exposed.

Subsequently, an inspection process may be performed wherein an inspecting pin of, for example, an inspection device (e.g., an automated inspection device) is caused to contact the exposed transparent conductive material 170 within the gate and data pads 150 and 160. Via the inspection device, the inspecting pin determines whether the gate and data lines 102 and 104 are acceptable or defective (e.g., by applying an electrical signal from the inspecting pin to the gate and data pads 150 and 160). To facilitate contact between the inspecting pin and the transparent conductive material 170 of the various pads, a line width, d1, of the transparent conductive material 170 exposed by the protective film 118 may be greater than about 26 µm. For example, when a line width d2 of any of the gate and data pads 150 and 160 is about 40 µm to about 44 µm, the line width of the exposed transparent conductive material 170 may be about 34 µm to about 38 µm.

After the inspection process is complete, data and gate TCPs 80 and 84, respectively, having driver integrated circuits (ICs), may be directly connected to the data and gate pads 160 and 150, respectively, using an anisotropic conductive film (ACF) 92. In one aspect of the present invention, the ACF may include a plurality of conductive balls 90. In another aspect of the present invention, output pads 76 and 82 of the data and gate TCPs 80 and 84, respectively, may be electrically connected to the data and gate pads 160 and 150, respectively, via the conductive balls 90 within the ACF 92. For example, the gate TCP output pad 82 formed on a base film 74 of the gate TCP 84 may be electrically connected to the transparent conductive material 170 within the gate pad 150 via ACF 92. In another aspect of the present invention, the data TCP output pad 76 formed on the base film 74 of the data TCP 80 may be electrically connected to the transparent conductive material 1782 within the data pad 160 via ACF 92. As mentioned above, the transparent conductive material 170 within the gate and data pads 150 and 160 is highly corrosion resistant and has a relatively high strength. Accordingly, the principles of the present invention may be applied to substantially prevent breakage in the gate and data pads 150 and 160 upon repeated attaching and detaching the gate and data TCPs 80 and 84, respectively.

According to principles of the present invention, the pad opening process may be performed by sequentially scanning each individual one of the gate and data pads 150 and 160 to expose the transparent conductive material 170 contained therein. Alternatively, the pad opening process may be performed by scanning an entirety of one of either the gate or data pads 150 or 160 followed by scanning an entirety of the other of either the gate or data pads 150 or 160 to expose the transparent conductive material 170 contained therein.

In one aspect of the present invention, the pad opening process may be performed by generating a plasma with, for example, an atmosphere plasma generator. In another aspect of the present invention, the pad opening process may be performed by providing a plurality of LCD panels into an etching chamber and generating a plasma with, for example, a normal-atmosphere plasma generator. In still another aspect of the present invention, the pad opening process may be performed by fully immersing an LCD panel into an etching liquid capable of selectively removing portions of the exposed protective film 118 to expose the transparent conductive material 170. In yet another aspect of the present invention, the pad opening process may be performed by immersing only the pad areas of the LCD panel into an etching liquid capable of selectively removing portions of the exposed protective film 118 to expose the transparent conductive material 170. In still another aspect of the present invention, the pad opening process may be performed by, prior to joining the TFT and color filter array substrates, forming an alignment pattern over the protective film 118 and removing portions of the protective film 118 using the alignment pattern as a mask.

Figure 18:
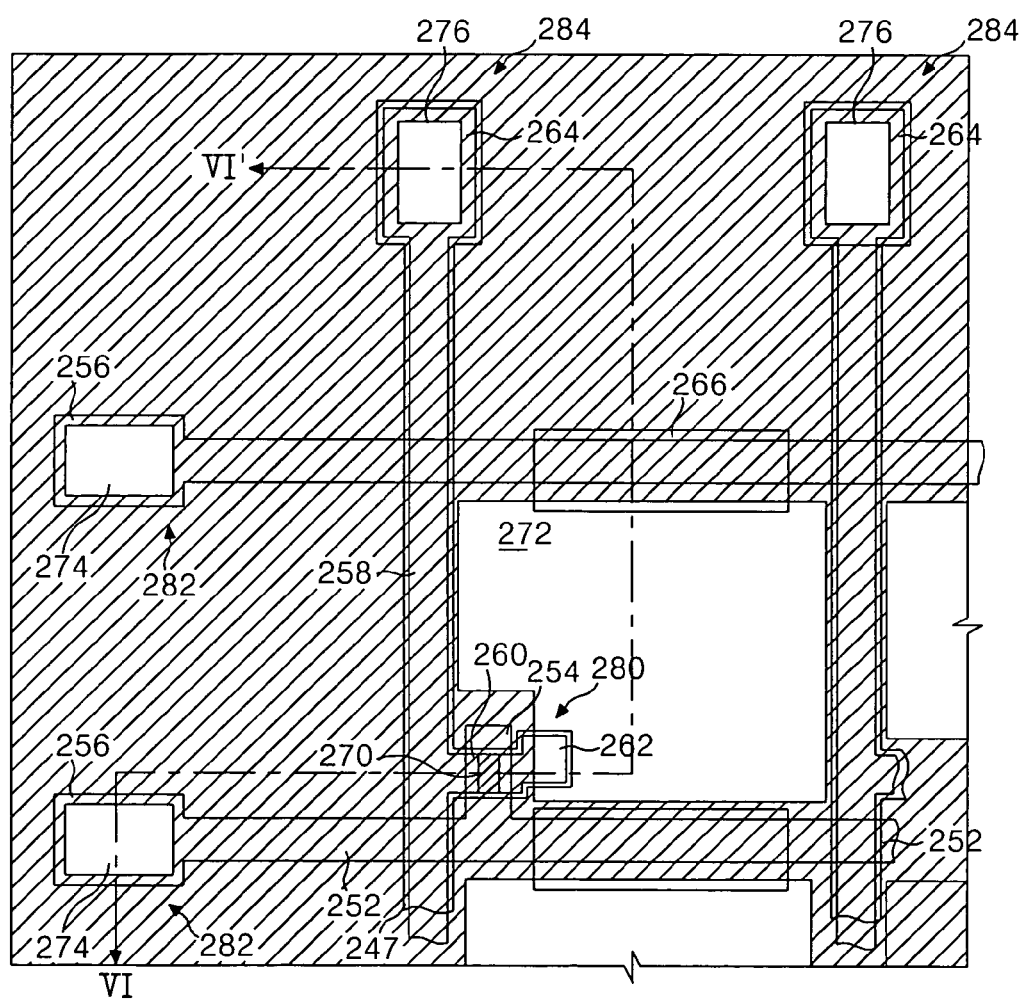
FIG. 18 illustrates a plan view of a TFT array substrate according to a third embodiment of the present invention.
Figure 19:
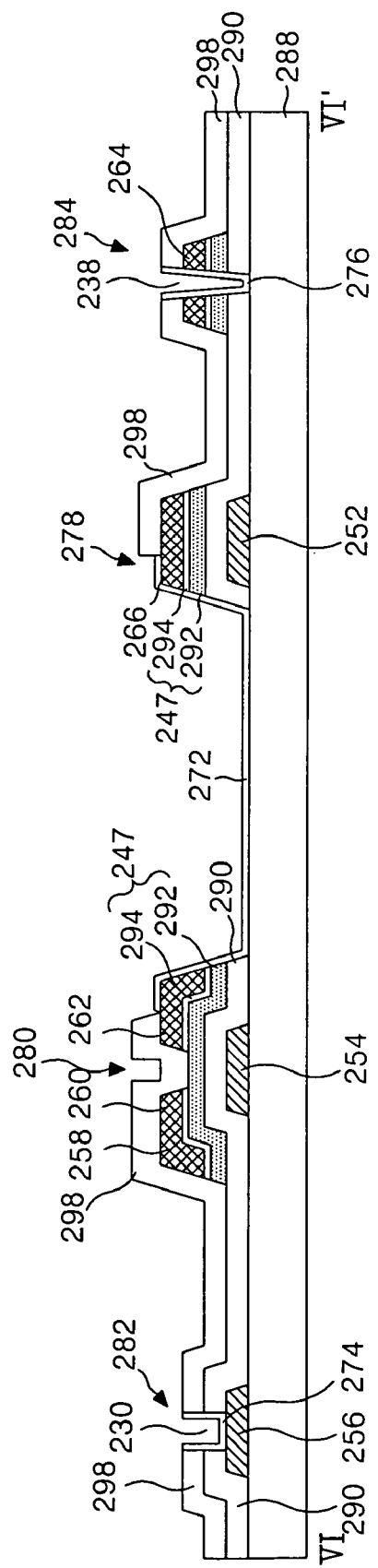
FIG. 19 illustrates a sectional view of the TFT array substrate taken along line VI-VI' shown in FIG. 18.

FIG. 18 illustrates a plan view of a TFT array substrate according to a third embodiment of the present invention. FIG. 19 illustrates a sectional view of the TFT array substrate taken along line VI-VI' shown in FIG. 18.

The TFT array substrate shown in FIGS. 18 and 19, and its method of fabrication, is, in many respects, similar to the TFT array substrate shown in FIGS. 4 and 5 but is different with respect to the pixel electrode, the gate pad, an upper gate pad electrode, the data pad, a lower data pad electrode, an upper data pad electrode. Thus, for the sake of brevity, a detailed explanation of elements similar to both the third and first embodiments will be omitted.

Referring to FIGS. 18 and 19, the pixel electrode 272 may be provided directly on a lower substrate 288. In one aspect of the present invention, the pixel electrode 272 may, for example, directly contact a portion of a drain electrode 262 of a thin film transistor 280 exposed by a protective film pattern 298. During operation, an electric field may be generated between the pixel electrode 272 and a common electrode formed on a color filter array substrate (not shown) when a pixel signal is applied from a TFT 280 to the pixel electrode 272 and when a reference voltage is applied to the common electrode. The liquid crystal molecules have a particular dielectric anisotropy. Therefore, in the presence of the electric field, liquid crystal molecules rotate to align themselves between the TFT and color filter array substrates. The magnitude of the applied electric field determines the extent of rotation of the liquid crystal molecules. Accordingly, various gray scale levels of light emitted by a light source (not shown) may be transmitted by a pixel area by varying the magnitude of the applied electric field.

The storage capacitor 278 may, for example, include a pre-stage gate line 252 and a storage electrode 266 overlapping the pre-stage gate line 252, wherein the two conductors are separated by a gate insulating pattern 290, an active layer 292, and an ohmic contact layer 294. The storage electrode 266 may directly contact the pixel electrode 272. In one aspect of the present invention, the pixel electrode 272 may, for example, directly contact a portion of a storage electrode 266 exposed by the protective film pattern 298. Constructed as described above, the storage capacitor 278 may allow pixel signals charged at the pixel electrode 272 to be uniformly maintained until a next pixel signal is charge at the pixel electrode 272.

Gate signals may be supplied to each gate line 252 via a corresponding gate pad 282. Accordingly, each gate pad 282 may be connected to a gate driver (not shown) that supplies the gate signals. In one aspect of the present invention, each gate pad 282 may comprise a lower gate pad electrode 256 extending from the gate line 252, a gate contact hole 230 formed through the gate insulating pattern 290 and the protective film pattern 298, and an upper gate pad electrode 274 connected to the lower gate pad electrode 256 via the gate contact hole 230.

Data signals may be supplied to each data line 258 via a corresponding data pad 284. Accordingly, each data pad 284 may be connected to a data driver (not shown) that supplies the data signals. In one aspect of the present invention, each data pad 284 may comprise a lower data pad electrode 264, a data contact hole 238 formed through the gate insulating pattern 290, the semiconductor pattern 247, the lower data pad electrode 264 and the protective film pattern 298 to expose the lower substrate 288, and an upper data pad electrode 276 connected to a side surface of the lower data pad electrode 264 via the data contact hole 238. In one aspect of the present invention, the lower data pad electrode 264 may extend from the data line 258 and be provided in the same pattern as a semiconductor pattern 247 formed on the gate insulating pattern 290.

As shown in FIGS. 18 and 19, the gate insulating and protective film patterns 290 and 298 may be provided at an area where the pixel electrode 272, the upper gate pad electrode 274, and the upper data pad electrode 276 are not present.

According to principles of the present invention, the TFT array substrate described above with respect to FIGS. 18 and 19 may be formed in a three-mask process. Thus, and with reference to FIGS. 20A to 22D, the three-mask process of the third embodiment may include a first mask process for providing a first conductive pattern group, a second mask process for providing a semiconductor pattern and a second conductive pattern group, and a third mask process for providing the gate insulating pattern, the protective film pattern, and a third conductive pattern group.

Figure 20A:
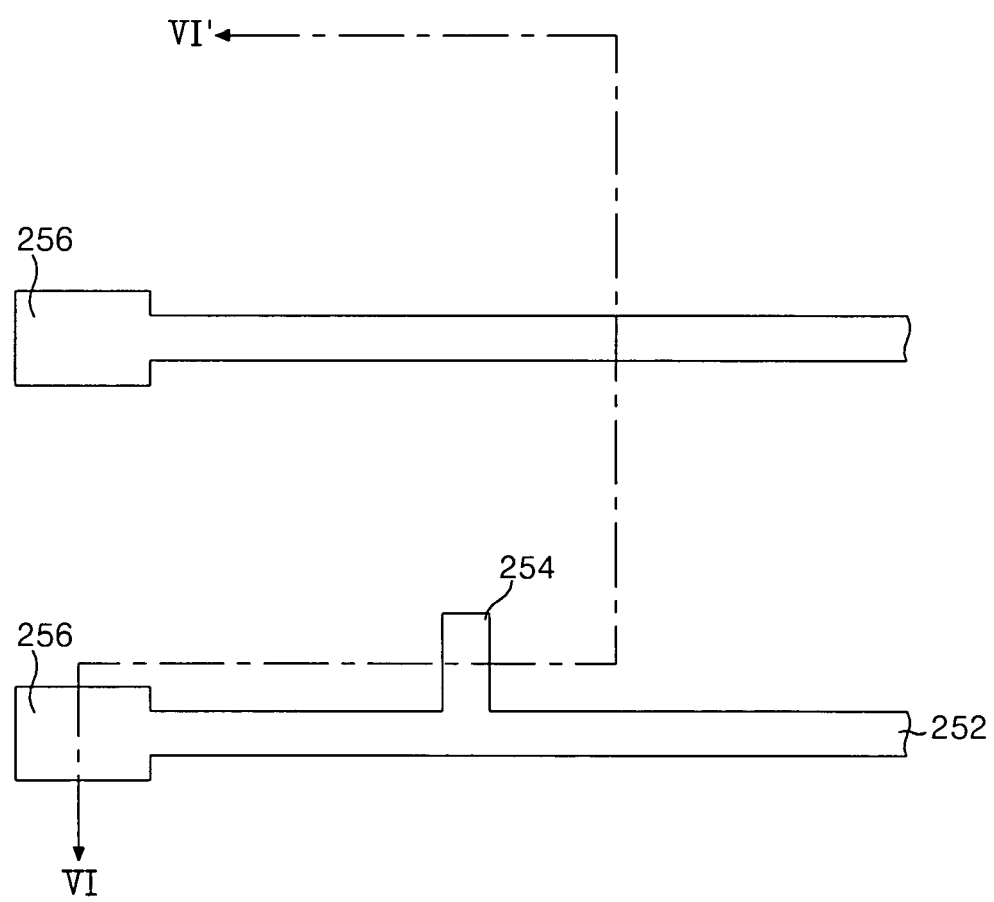
FIGS. 20A and 20B illustrate plan and sectional views, respectively, describing a first mask process in the method of fabricating the TFT array substrate according to the third embodiment of the present invention.
Figure 20B:
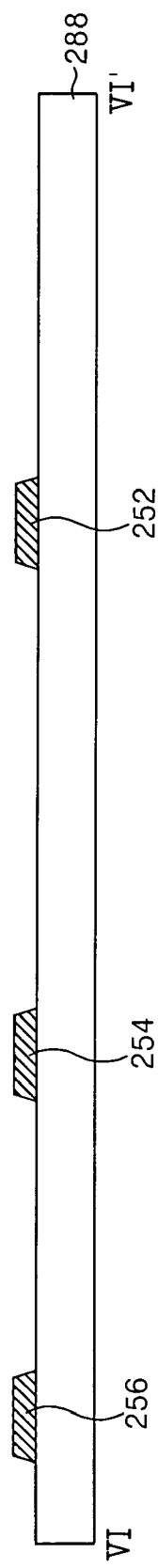

FIGS. 20A and 20B illustrate plan and sectional views, respectively, describing a first mask process in the method of fabricating the TFT array substrate according to the third embodiment of the present invention.

Referring to FIGS. 20A and 20B, a first conductive pattern group may be formed on the lower substrate 288 in a first mask process. In one aspect of the present invention, the first conductive pattern group may, for example, include the gate line 252, the gate electrode 254, and the lower gate pad electrode 256.

According to principles of the present invention, the first conductive pattern group may comprise a gate metal material deposited on the lower substrate 288 by a technique such as the sputtering, or the like. In one aspect of the present invention, the gate metal material may include a single or double layered structure formed from a material such as Cr, MoW, Cr/Al, Cu, Al(Nd), Mo/Al, Mo/Al(Nd) or Cr/Al(Nd), or the like, or combinations thereof. The gate metal material may be patterned using the photolithographic and etching techniques using a first mask pattern to provide the first conductive pattern group aforementioned first conductive pattern group.

Figure 21A:
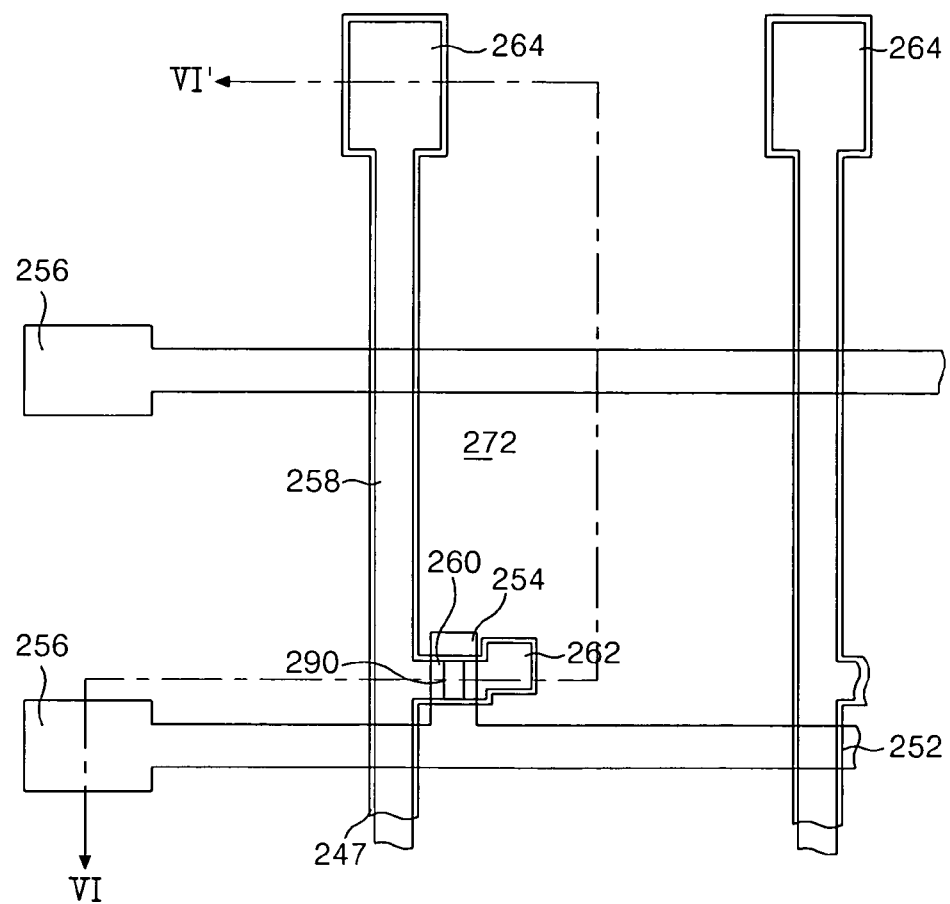
FIGS. 21A to 21C illustrate plan and sectional views describing a second mask process in the method of fabricating the TFT array substrate according to the third embodiment of the present invention.
Figure 21B:
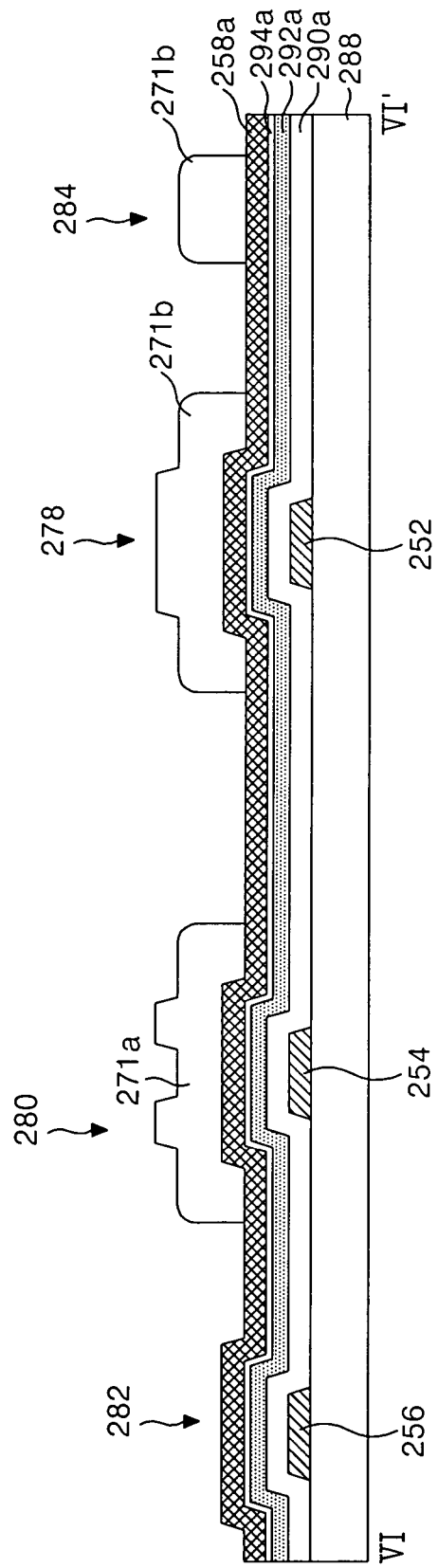
Figure 21C:
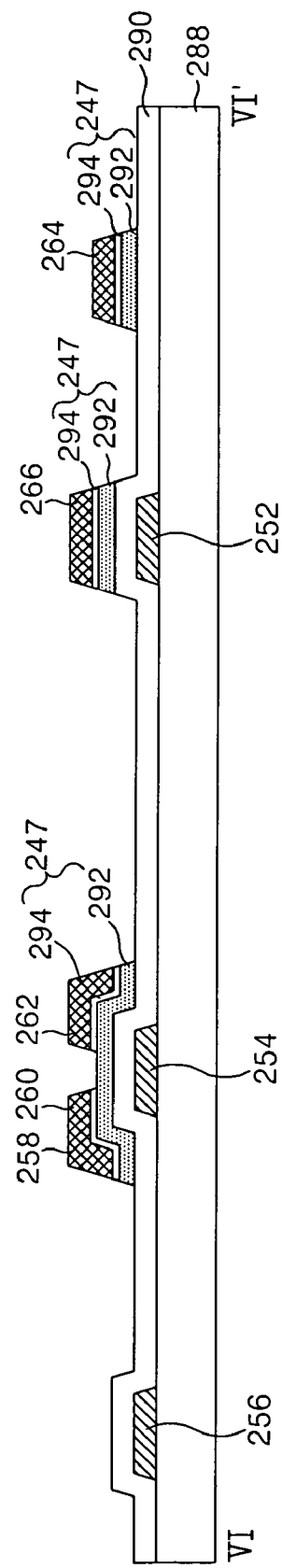

FIGS. 21A to 21C illustrate plan and sectional views describing a second mask process in the method of fabricating the TFT array substrate according to the third embodiment of the present invention.

Referring to FIG. 21A, a gate insulating film 290a, semiconductor patterns, comprised of an active layer 292 and an ohmic contact layer 294, and a second conductive pattern group are formed on the lower substrate 288 in a second mask process. In one aspect of the present invention, the second conductive pattern group may, for example, include the data line 258, the source electrode 260, the drain electrode 262, the storage electrode 266, and the lower data pad electrode 264. As a result of the second mask process, the drain electrode 262 may be connected to the source electrode 260. The second mask process of the third embodiment described above with respect to FIG. 21A will now be described in greater detail with respect to FIGS. 21B and 21C.

Referring to FIG. 21B, the gate insulating film 290a, a first semiconductor layer 292a, a second semiconductor layer 294a, and a data metal layer 258a are sequentially formed on the lower substrate 288 and on the first conductive pattern group. In one aspect of the present invention, the gate insulating film 290a, and first and second semiconductor layers 292a and 294a are formed according to a deposition technique such as PEVCD, sputtering, or the like. In another aspect of the present invention, the gate insulating film 290a may, for example, include an inorganic insulating material such as silicon nitride (SiNx) or silicon oxide (SiOx). In another aspect of the present invention, the first semiconductor layer 292a may, for example, include undoped amorphous silicon. In still another aspect of the present invention, the second semiconductor layer 294a may, for example, include n+ doped amorphous silicon. In yet another aspect of the present invention, the data metal layer 258a may, for example, include a metal such as molybdenum (Mo), titanium (Ti), tantalum (Ta), or the like, or alloys or other combinations thereof.

A first photo-resist pattern 271b is then formed over the data metal layer 258a by photolithographic and etching processes using a second mask pattern. According to principles of the present invention, the second mask pattern is provided as a partial-exposure mask similar to the partial exposure mask discussed above with respect to the first embodiment. Accordingly, the second mask pattern may include a partial-exposure area aligned with a channel region of a subsequently formed TFT, a plurality of shielding areas, and a plurality of exposure areas. Accordingly, a step difference exists between portions of first photo-resist pattern 271b aligned between the partial-exposure and shielding areas of the second mask pattern.

Referring to FIG. 21C, the data metal layer 258a is patterned in a wet etching process using the first photo-resist pattern 271b as a mask to form the aforementioned second conductive pattern group (i.e., the data line 258, the source electrode 260, the drain electrode 262, the storage electrode 266, and the lower data pad electrode 264), wherein the source and drain electrodes 260 and 262 are connected to each other in a region corresponding to the partial-exposure area of the second mask pattern.

Next, the first photo-resist pattern 271b is used as a mask to pattern the second and first semiconductor layers 294a and 292a in a dry etching process and form the ohmic contact and active layers 294 and 292, respectively.

After the active and ohmic contact layers 292 and 294 are formed, the portion of the first photo-resist pattern 271b having the relatively lower height (i.e., the portion of the first photo-resist pattern 271b aligned within the partial-exposure area of the second mask pattern) is removed in an ashing process using oxygen (O2) plasma. Upon performing the ashing process, the relatively thicker portions of the first photo-resist pattern 271b (i.e., portions of the first photo-resist pattern 271b aligned within the shielding areas of the second mask pattern) are thinned but, nevertheless, remain. Using the thinned first photo-resist pattern 271b as a mask, portions of the data metal layer 258a and the ohmic contact layer 294 aligned with the partial-exposure area of the second mask pattern may be etched in a dry etching process. As a result, the active layer 292 within the channel portion of the TFT 280 may be exposed an the source electrode 260 may be disconnected from the drain electrode 262. Subsequently, the remaining first photo-resist pattern 271b may be removed in a stripping process.

FIGS. 22A to 22D illustrate plan and sectional views describing a third mask process in the method of fabricating the TFT array substrate according to the third embodiment of the present invention.

Figure 22A:
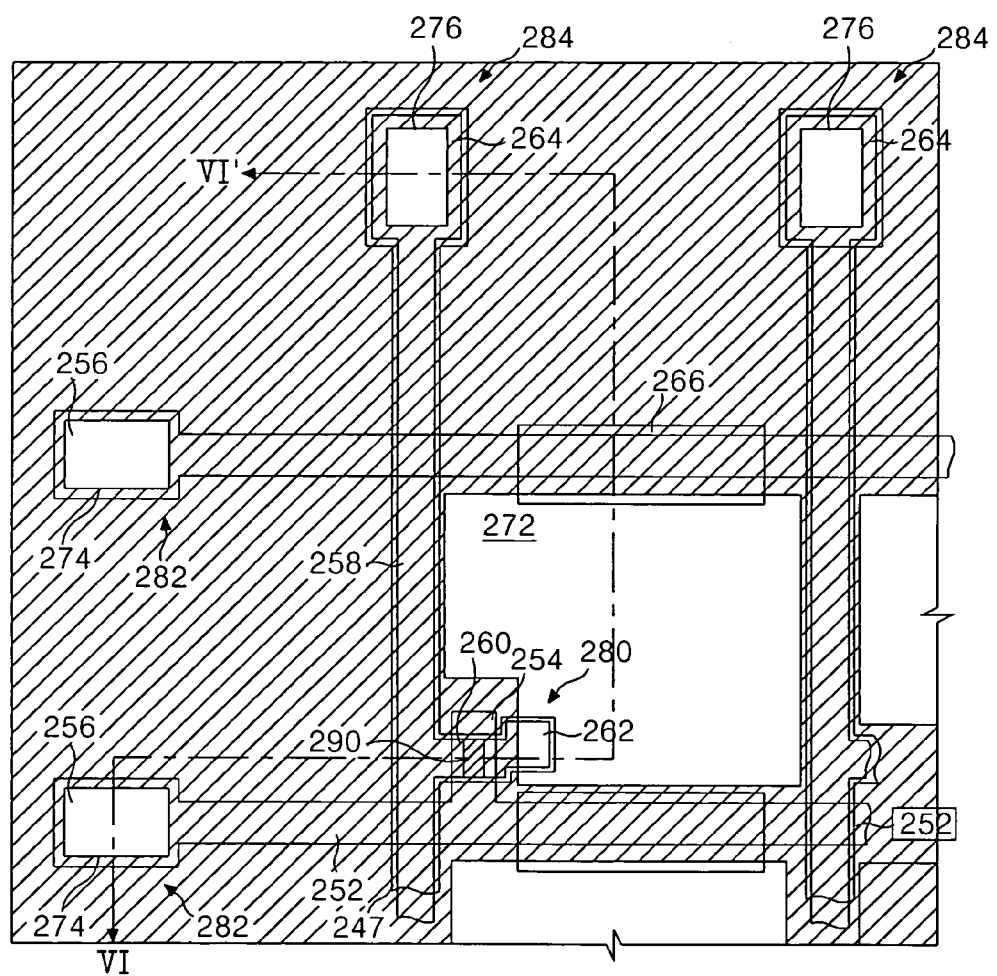

Referring to FIG. 22A, the gate insulating pattern 290, the protective film pattern 298, and the third conductive pattern group are formed on the lower substrate 288 in a third mask process. In one aspect of the present invention, the third conductive pattern group may, for example, include the upper gate pad electrode 274, the pixel electrode 272, and the upper data pad electrode 276. The third mask process of the third embodiment described above with respect to FIG. 22A will now be described in greater detail with respect to FIGS. 22B to 22D.

Referring to FIG. 22B, a protective film 298a may be formed over the entire surface of the lower substrate 288 and directly on the gate insulating film 290a and the second conductive pattern group. In one aspect of the present invention, the protective film 298a may be formed according to a deposition technique such as the sputtering, or the like. In another aspect of the present invention, the protective film 298a may, for example, include an inorganic insulating material such as silicon nitride (SiNx), silicon oxide (SiOx), or the like, or combinations thereof, an organic insulating material such as acrylic organic compound having a small dielectric constant, BCB (benzocyclobutene), or PFCB (perfluorocyclobutane), or the like, or combinations thereof. A second photo-resist pattern 271c is then formed over the protective film 298a by photolithographic and etching processes using a third mask.

Figure 22C:
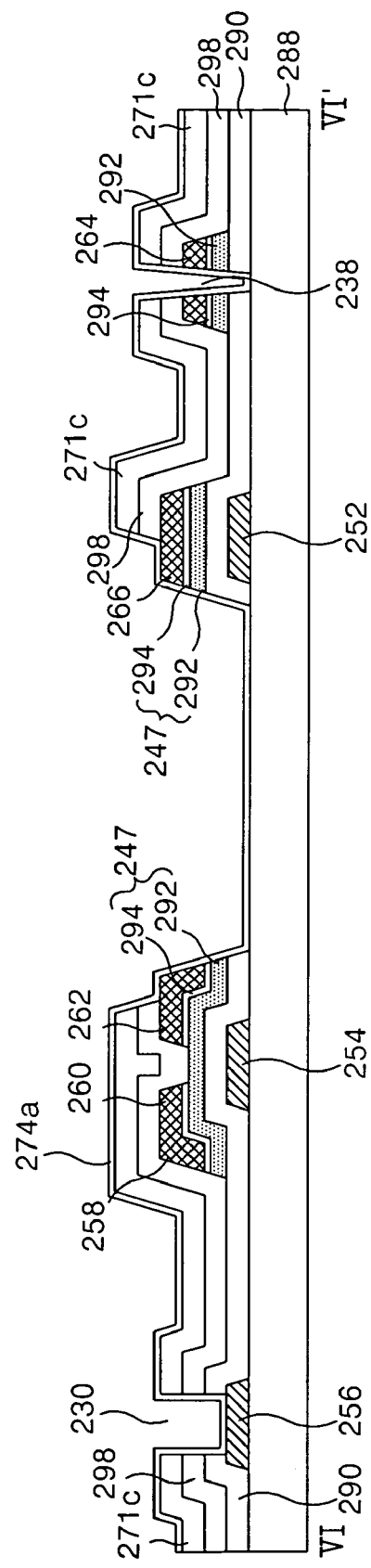

Referring to FIG. 22C, portions of the protective film 298a exposed by the second photo-resist pattern 271c may be dry etched using a predetermined etching gas composition. As a result, the protective film pattern 298 may be formed.

Figure 23:
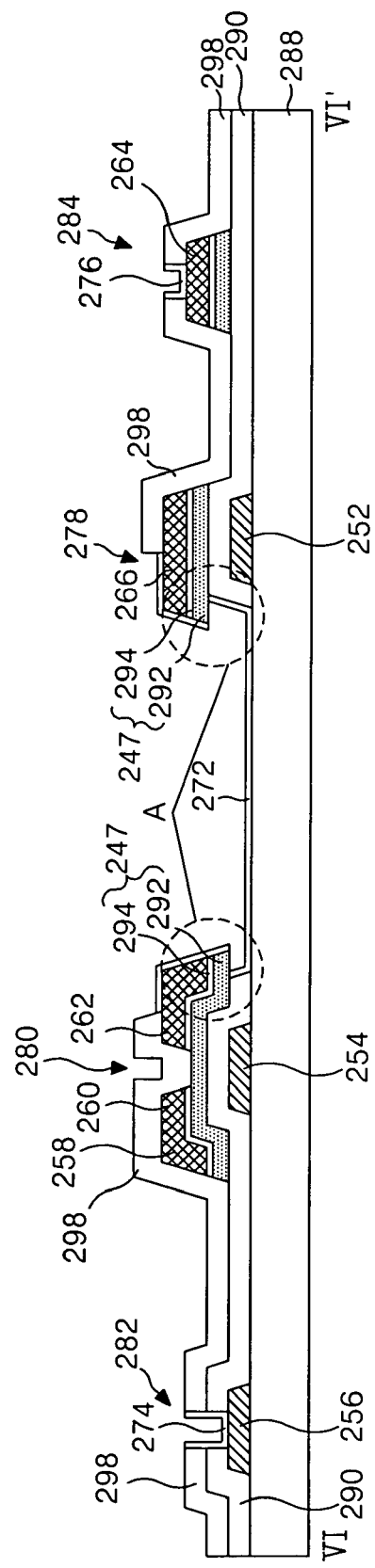
FIG. 23 illustrates a sectional view of a discontinuously formed pixel electrode.

When applied, the predetermined etching gas composition typically etches the gate insulating film 290a faster than it etches the protective film 298a. Thus, if use of the predetermined etching gas composition continued after formation of the protective film pattern 298, the gate insulating film 290a would undesirably become over-etched and, as shown in FIG. 23, would undercut portions of the drain electrode 262, the storage electrode 266, and the semiconductor pattern 247. Due to the undercutting, a subsequently formed pixel electrode 272 is undesirably discontinuous across the storage electrode 266, the lower substrate 288, and the drain electrode 262 (see area A of FIG. 23). To overcome this problem, the etching gas composition may be changed after the protective film pattern 298 is formed to etch portions of the second conductive pattern group, the semiconductor pattern 247, and the gate insulating film 290a exposed by the second photo-resist pattern 271c at a more desirable rate. In one aspect of the present invention, the second conductive pattern group, the semiconductor pattern 247, and the gate insulating film 290a may be etched using a gas composition including, for example, $SF_6$ and $O_2$. As a result of using the gas composition including $SF_6$ and $O_2$, deleterious effects of over-etching the gate insulating film 290a may be substantially eliminated and the gate and data contact holes 230 and 238 may be formed. In one aspect of the present invention, the gate contact hole 230 may be formed through the protective film 298a and the gate insulating film 290a to expose the lower gate pad electrode 256. In another aspect of the present invention, the data contact hole 238 may be formed through the protective film 298a, the lower data pad electrode 264, the semiconductor pattern 247, and the gate insulating film 290a to expose the lower substrate 288.

After forming the protective film and gate insulating patterns 298 and 290, respectively, and the gate and data contact holes 230 and 238, respectively, a subsequently formed pixel electrode 272 may be continuously provided over the storage electrode 266, the lower substrate 288, and the drain electrode 262. For example, a transparent conductive material 274a may be formed over the entire surface of the lower substrate 288 and on the second photo-resist pattern 271c. In one aspect of the present invention, the transparent conductive material 274a may be formed according to a deposition technique such as sputtering, or the like. In another aspect of the present invention, the transparent conductive material 274a may include ITO, TO, IZO, or the like, or combinations thereof.

Figure 22D:
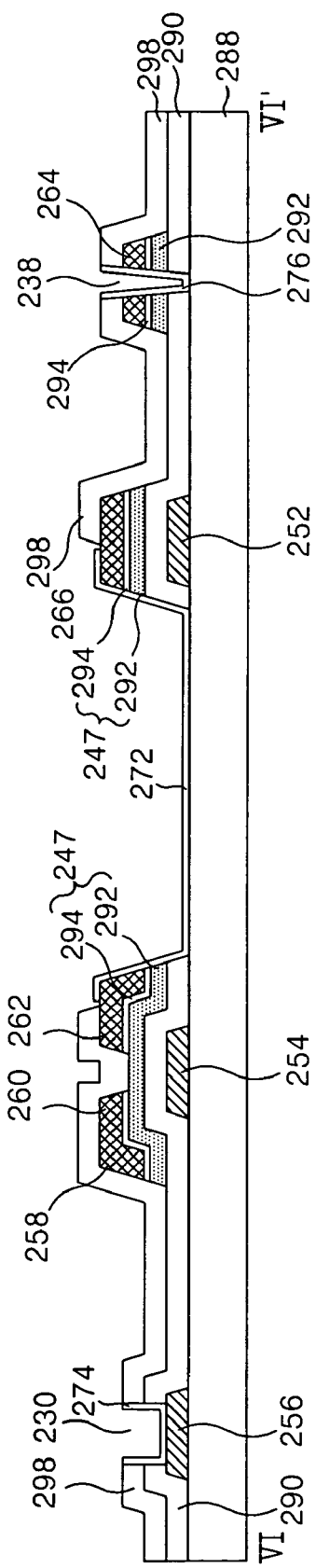

Referring to FIG. 22D, the second photo-resist pattern 271c may be removed in a stripping or lift-off process. Upon removing portions of the photo-resist pattern 271c, portions of the transparent conductive material 274a on the second photo-resist pattern 271c are removed with respect to portions of the transparent conductive material 274a not on the second photo-resist pattern 271c. Thus, upon removing the photo-resist pattern 271c, a third conductive pattern group is formed. In one aspect of the present invention, the third conductive pattern group may, for example, include the upper gate pad electrode 274, the pixel electrode 272, and the upper data pad electrode 276.

According to principles of the present invention, the upper gate pad electrode 274 may be electrically connected to the surface of the lower gate pad electrode 256, the pixel electrode 272 may be electrically connected to the drain electrode 262 and the storage electrode 266, and the upper data pad electrode 276 may be electrically connected to a side surface of the lower data pad electrode 264 and directly contacts the upper surface of the lower substrate 288.

Figure 24:
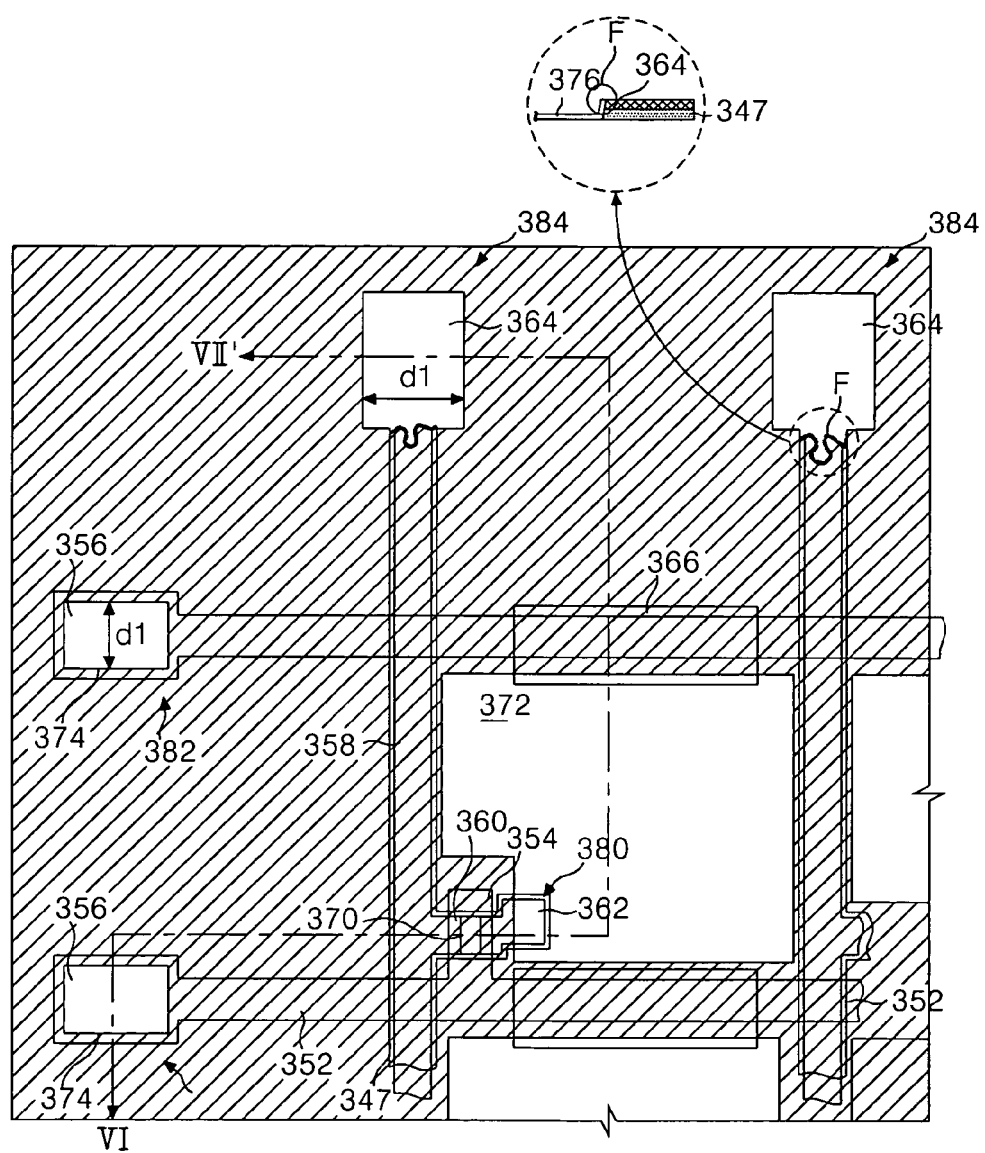
FIG. 24 illustrates a plan view of a TFT array substrate according to a fourth embodiment of the present invention.
Figure 25:
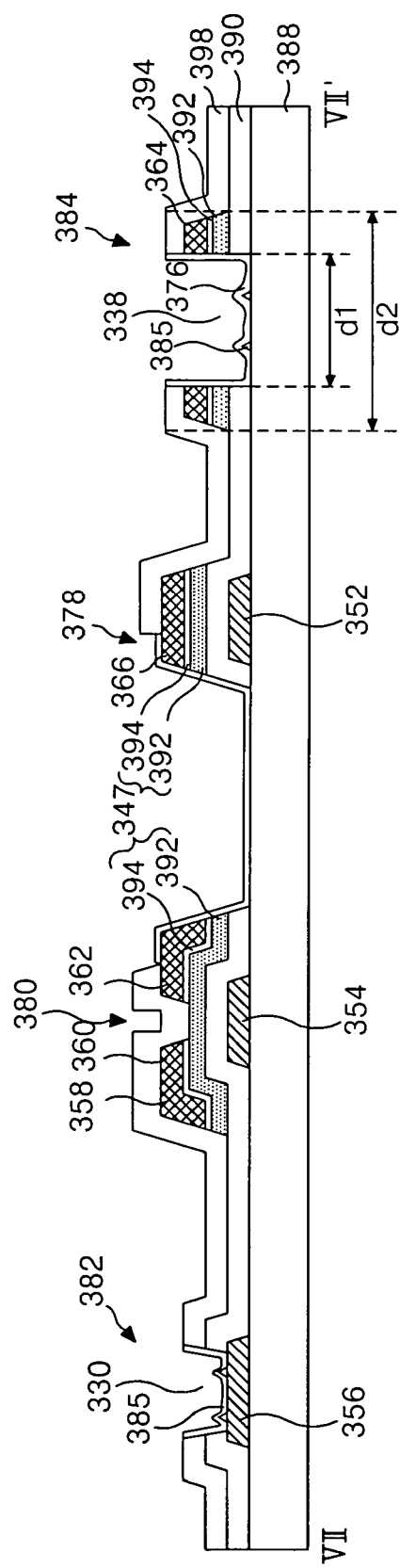
FIG. 25 illustrates a sectional view of the TFT array substrate taken along line VII-VII' shown in FIG. 24.

FIG. 24 illustrates a plan view of a TFT array substrate according to a fourth embodiment of the present invention. FIG. 25 illustrates a sectional view of the TFT array substrate taken along line VII-VII' shown in FIG. 24.

The TFT array substrate shown in FIGS. 24 and 25, and its method of fabrication, is, in many respects, similar to the TFT array substrate shown in FIGS. 18 and 19 but is different with respect to a dummy pattern positioned between the upper data pad electrode and the lower substrate. Thus, for the sake of brevity, a detailed explanation of elements similar to both the fourth and third embodiments will be omitted.

Referring to FIGS. 24 and 25, gate signals may be supplied to each gate line 352 via a corresponding gate pad 382. Accordingly, the gate pad 382 may be connected to a gate driver (not shown) that supplies gate signals. In one aspect of the present invention, the gate pad 382 may, for example, include a lower gate pad electrode 356 extending from the gate line 352 and an upper gate pad electrode 374 connected to the lower gate pad electrode 356. In one aspect of the present invention, a line width d2 of the lower gate pad electrode 356 may be about 40 µm to about 44 µm and a line width d1 of the upper gate pad electrode 374 may be greater than about 26 µm. In another aspect of the present invention, the line width d1 of the upper gate pad electrode 374 may be about 34 µm to about 38 µm.

Data signals may be supplied to each data line 358 via a corresponding data pad 384. Accordingly, the data pad 384 may be connected to a data driver that supplies data signals. In one aspect of the present invention, each data pad 384 may, for example, include a lower data pad electrode 364 extending from the data line 358 and an upper data pad electrode 376 connected to the lower data pad electrode 364. In one aspect of the present invention, the data pad 384 may, for example, include a gate insulating pattern 390, an active layer 392, and an ohmic contact layer 394 provided between the lower data pad electrode 364 and the lower substrate 388. In another aspect of the present invention, a line width d2 of the data pad 384 may be about 40 µm to about 44 µm and a line width d1 of the upper data pad electrode 376 may be greater than more than about 26 µm. In still another aspect of the present invention, the line width d1 of the upper data pad electrode 376 may be about 34 µm to about 38 µm.

In response to a gate signal applied from a gate line 352, a TFT 380 charges and maintains a pixel signal, applied to a corresponding data line 358, in the pixel electrode 372. Accordingly, each TFT 380 includes a gate electrode 354 connected to a corresponding gate line 352, a source electrode 360 connected to a corresponding data line 358, and a drain electrode 362 connected to a corresponding pixel electrode 372.

According to principles of the present invention, the upper gate and data pad electrodes 374 and 376, respectively, have line widths greater than line widths of conventional upper gate and data pad electrodes. The relatively large line width of the upper gate and data pad electrodes allows inspecting pins, having typical line widths of about 26 µm, to easily contact the upper gate and data pad electrodes 374 and 376, thereby making it easier to test the gate and data lines 352 and 358 for defects (e.g., by applying an electrical signal to the upper gate and data pad electrodes 374 and 376).

Further, the upper data pad electrode 376 may directly contact a side surface of the lower data pad electrode 364, to substantially prevent the aforementioned undercutting phenomenon from occurring and ensuring that a continuous pixel electrode 372 is formed between the storage and drain electrodes 366 and 362. As shown in FIG. 24, the upper data pad electrode 376 and the lower data pad electrode 364 form a contact interface F. In one aspect of the present invention, the contact interface F may be slightly indented enlarge a contact area of the lower data pad electrode 364.

As shown in FIG. 25, at least one of dummy pattern 385 may be provided between the lower and upper gate pad electrodes 356 and 374 as well as between the lower substrate 388 and the upper data pad electrode 376. In one aspect of the present invention, the dummy pattern 385 may include a portion of the gate insulating film 390. In another aspect of the present invention, the dummy pattern 385 may be formed by controlling an etching rate of the semiconductor pattern 347 and the gate insulating pattern 390 upon patterning of the protective film 398. In still another aspect of the present invention, the dummy pattern 385 may be located in a corner region of the data pad 384 and have relatively weak adhesive characteristics to maximize an adhesion between the upper data pad electrode 376 and the lower substrate 388. According to principles of the present invention, the dummy pattern 385 may minimize the generation of static electricity during subsequent processing steps (e.g., processing steps used to form the upper data pad electrode 376, and the like).

According to principles of the present invention, the TFT array substrate described above with respect to FIGS. 24 and 25 may be formed in a three-mask process similar to mask processes previously described with respect to FIGS. 20A to 22D. Thus, for the sake of brevity, only a detailed explanation of the third mask process unique to the fourth embodiment will be provided below.

According to principles of the present invention, the gate insulating pattern 390, the protective film pattern 398, and the third conductive pattern group may be formed on the lower substrate 388 in a third mask process. In one aspect of the present invention, a protective film pattern may be formed from an inorganic or organic insulating material deposited over an entirety of a gate insulating film that is, in turn, formed over a previously formed second conductive pattern group. According to principles of the present invention, the protective film pattern and the gate insulating pattern may be formed by patterning protective and gate insulating films, respectively, using a photo-resist pattern. In one aspect of the present invention, the photo-resist pattern may be formed using a third mask pattern. Thus, a gate insulating pattern and a protective film pattern may be provided at areas other than those where a third conductive pattern group is formed. Further, a dummy pattern, formed from small amounts of insulating material not removed upon patterning the gate insulating film, may be provided within gate and data pads.

A method of forming the aforementioned photo-resist and dummy patterns will now be described in greater detail with reference to FIGS. 26A to 26D.

Figure 26A:
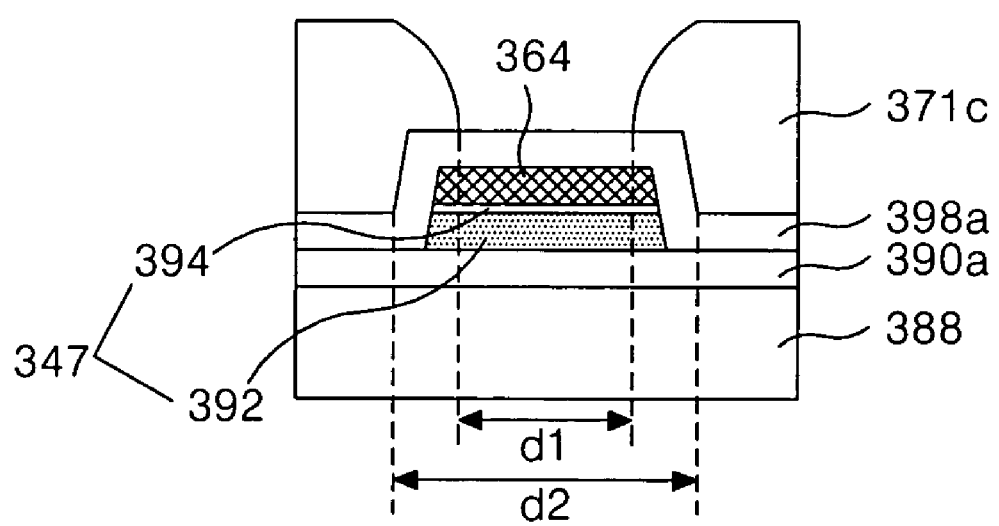
FIGS. 26A to 26D illustrate a process of forming the dummy pattern shown in FIG. 25.

Referring to FIG. 26A, a photo-resist pattern 371c is formed on a protective film 398a. In one aspect of the present invention, the protective film 398a is formed over the entire surface of the lower substrate 388. According to principles of the present invention, the line width d1 of an area of the protective film 398a exposed by the photo-resist pattern 371c may be greater than about 26 μm (e.g., about 34 μm to about 38 μm) and a line width d2 of the gate and data pads 382 and 384 may each be about 40 μm to about 44 μm.

Next, the protective film 398a is patterned in a dry etching process using the photo-resist pattern 371c as a mask. In one aspect of the present invention, the protective film 398a may be patterned using an etching gas including $SF_6$ to $O_2$. In another aspect of the present invention, the etching gas may include more $O_2$ than that $SF_6$ (e.g., $SF_6$:$O_2$ is about 1:3).

Figure 26B:
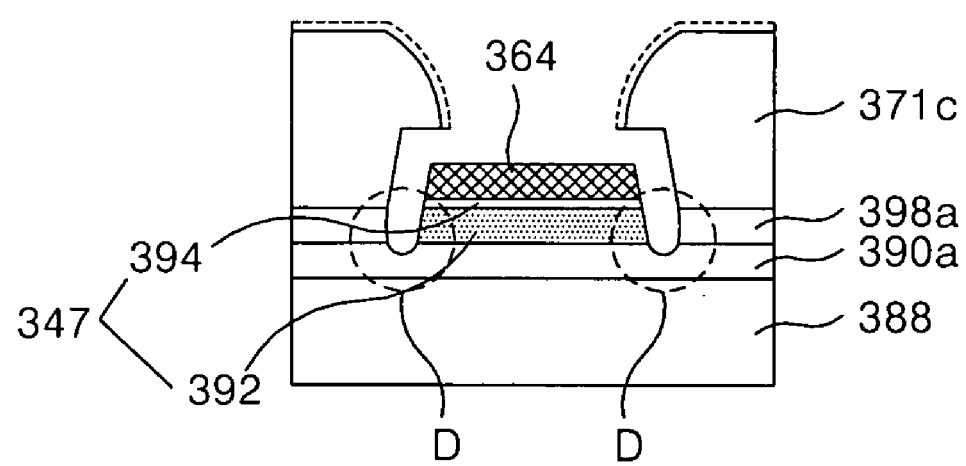

As a result of the etching, and with reference to FIG. 26B, a slight amount of the photo-resist pattern 371c may be removed, a portion D of the gate insulating film 390a may also be removed where the gate insulating film 390a and the protective film 398a are formed of identical or similar materials.

Next, and with reference to FIG. 23, the lower data pad electrode 364 may be patterned in an etching process using the photo-resist pattern 371c to substantially remove effects of over-etching the gate insulating film 390a (i.e., undercutting the drain and storage electrodes 362 and 366 and the semiconductor pattern 347) and ensure that the pixel electrode 372 is continuously provided across the storage electrode 366 and the drain electrode 362. In one aspect of the present invention, an etching gas containing more $SF_6$ than $O_2$ (e.g., $SF_6$:$O_2$ is about 3~10:1) may be used to substantially remove effects of over-etching of the gate insulating film 390a.

Figure 26C:
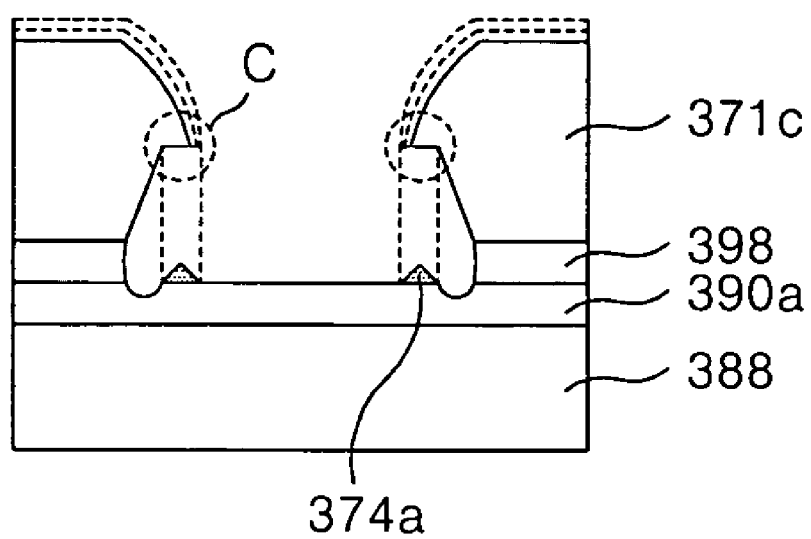

Next, the semiconductor pattern 347 may be etched in a dry etching process using the photo-resist pattern 371c as a mask. In one aspect of the present invention, the semiconductor pattern 347 may be etched using an etching gas containing, for example, $Cl_2$ and/or HCl. By controlling the etch rate of the semiconductor pattern 347, a portion 374a of semiconductor pattern 347 that overlaps a corner portion C of the photo-resist pattern 371c may remain on the gate insulating film 390a as shown in FIG. 26C.

Figure 26D:
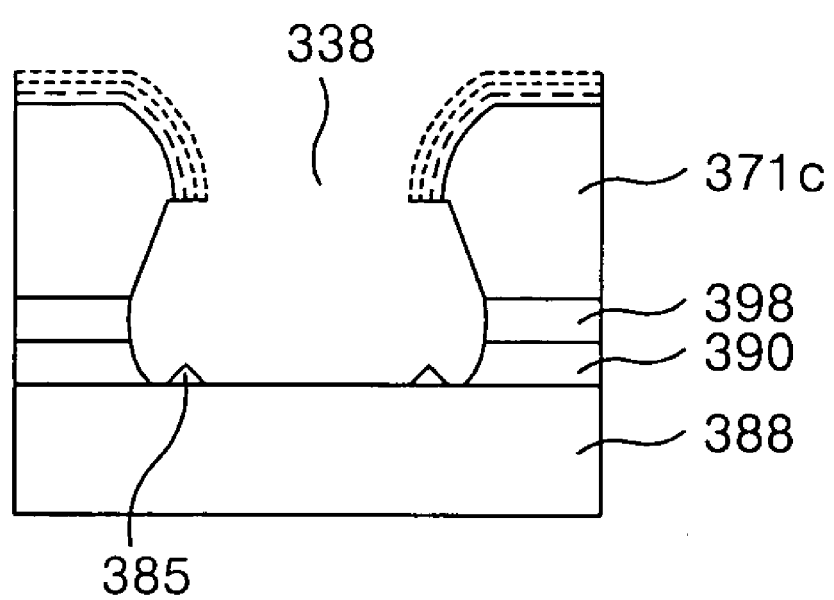

Referring to FIG. 26D, the gate insulating film 390a is then etched in a dry etching process using the photo-resist pattern 371c as a mask to form the gate insulating pattern 390. In one aspect of the present invention, an etching gas containing more $O_2$ than $SF_6$ may be used to form the gate insulating pattern 390. Due to the presence of the portions 374a of the semiconductor pattern 347, a small amount of gate insulating film is caused to remain, thereby forming the dummy pattern 385.

Subsequently, the transparent conductive material is deposited over the entirety of the substrate and over the remaining photo-resist pattern 371c and the photo-resist pattern 371c is removed to form the aforementioned third conductive pattern group (i.e., the pixel electrode 372, the upper gate pad electrode 374, and the upper data pad electrode 376).

According to principles of the present invention, a diameter (or line width) of the gate and data contact holes 330 and 338, respectively, within the gate and data pads 382 and 384 may be larger than a diameter (or line width) of an inspecting pin (not shown) in, for example, an inspection device. In one aspect of the present invention, the inspecting pin may contact the upper gate pad electrode 374 and the upper data pad electrode 376 within the contact holes 330 and 338. Upon contacting the inspecting pin to the upper gate and data pad electrodes 374 and 376, the presence of defects within the gate and data lines 352 and 358 may be determined (e.g., by applying an electrical signal to the gate and data pad electrodes 374 and 376). In one aspect of the present invention, a diameter (or width) of the inspecting pin may be about 26 μm to about 30 μm while diameters (or line widths) of the upper data and gate pad electrodes 376 and 374, provided within respective ones of the data and gate contact holes 338 and 330, may be greater than about 26 μm (e.g., about 34 μm to about 38 μm).

As described above, the fourth embodiment of the present invention may provide a TFT array substrate and a method fabricating the same, having a dummy pattern 385 may be arranged between the upper data pad electrode 376 and the lower substrate 388 to minimize the generation of static electricity during subsequent fabrication processes including, for example, forming the upper data pad electrode 376 while promoting adhesion between the upper data pad electrode 376 and the lower substrate 388.

Further, because the line widths of the upper gate and data pad electrodes 374 and 376 are larger than a line width of an inspecting pin in an inspection device, the inspecting pin may easily contact the upper gate and data pad electrodes 374 and 376, thereby facilitating the determination of defects within the gate and data lines 352 and the data line 358 (e.g., by applying an electrical signal from the inspecting pin to the upper gate and data pad electrodes 374 and 376).

Figure 27:
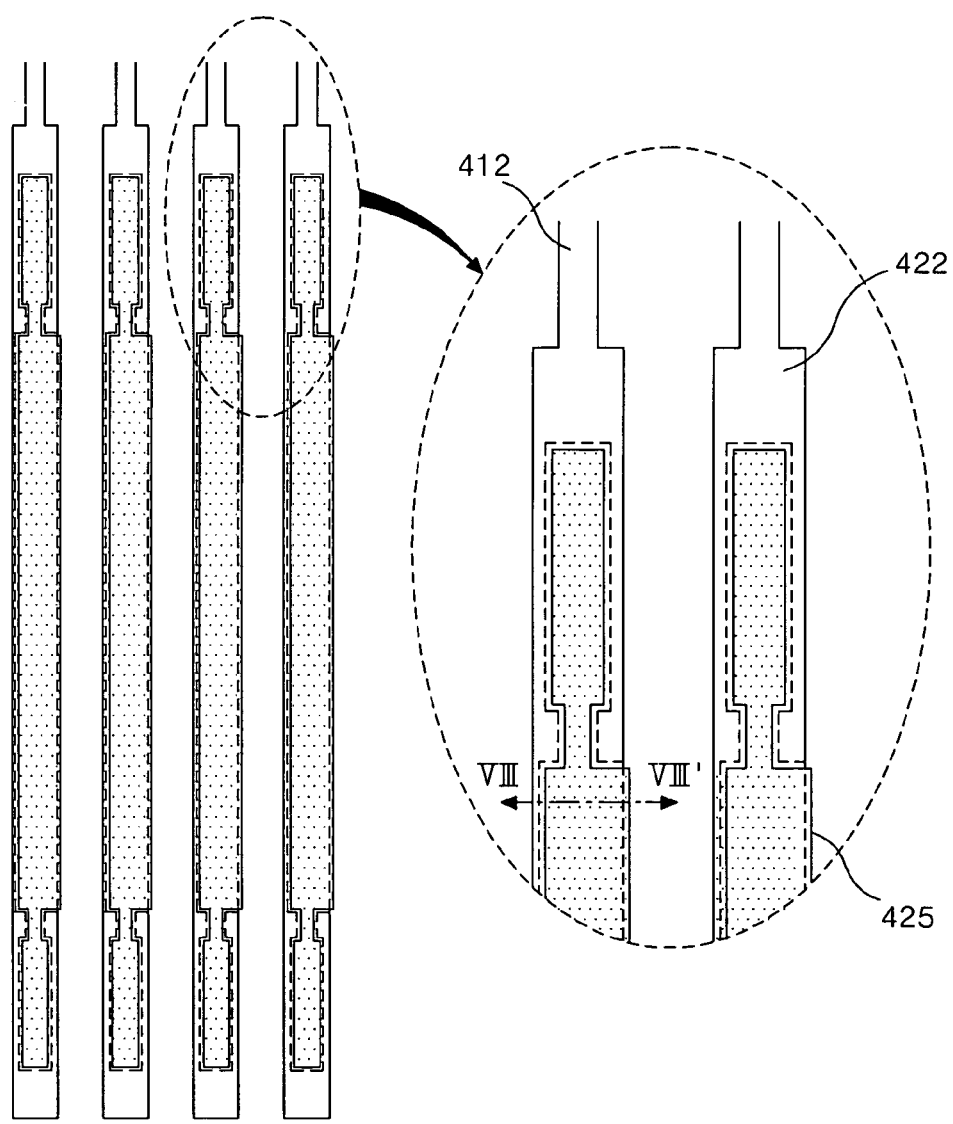
FIG. 27 illustrates a plan view of a data pad in a TFT array substrate according to a fifth embodiment of the present invention.
Figure 28:
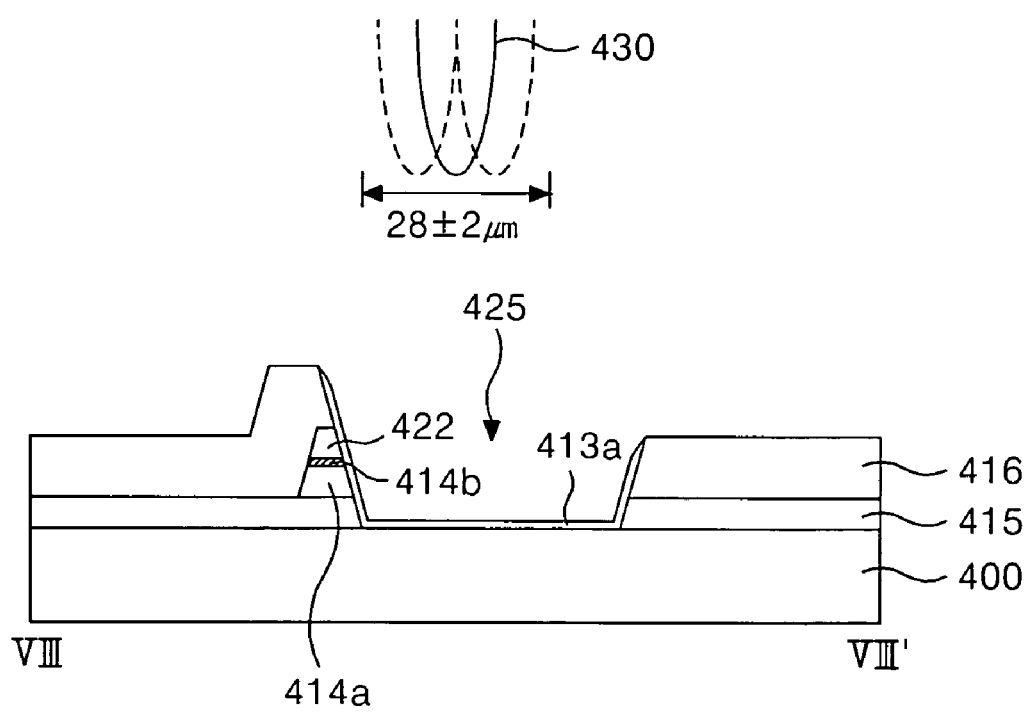
FIG. 28 illustrates a sectional view of the data pad in the TFT array substrate taken along line VIII-VIII' shown in FIG. 27.

FIG. 27 illustrates a plan view of a data pad in a TFT array substrate according to a fifth embodiment of the present invention. FIG. 28 illustrates a sectional view of the data pad in the TFT array substrate taken along line VIII-VIII' shown in FIG. 27.

Referring to FIGS. 27 and 28, a plurality of data contact holes may be spaced apart from each other by a predetermined distance. In one aspect of the present invention, a width of each data contact hole 425 may be larger than a corresponding width of an inspecting pin 430. According to principles of the present invention, the width of inspecting pin 430 is determined in consideration of its physical width in addition to its lateral position tolerance. For example, the inspecting pin 430 may have a physical width of about 10 μm and have a lateral position tolerance about 10 μm. Accordingly, the width of the inspecting pin 430 may be about 28±2 μm. Therefore, the width of the contact hole may be larger than about 30 μm to allow the inspecting pin 430 to contact the upper data pad electrode 413a, provided within the data contact hole 425, during an inspection process regardless of whether the position of the inspecting pin 430 is laterally shifted to the right or left.

According to principles of the present invention, the data contact hole 425 may be formed within the lower data pad electrode 422. In one aspect of the present invention, the width of a first portion of the data contact hole 425 may be greater than a width of a second portion of the data contact hole 425. The first portion of the data contact hole 425 may be offset from the lower data pad electrode 422 such that a side region of the lower data pad electrode 422 may be removed from within the data contact hole 425. As shown in FIG. 28, only one side surface of the lower data pad electrode 422 is exposed within the data contact hole 425. Accordingly, the side surface of the lower data pad electrode 422 directly contacts the upper data pad electrode 413a within the data contact hole 425.

According to principles of the present invention, the TFT array substrate described above with respect to FIGS. 27 and 28 may be formed in a three-mask process similar to mask processes previously described with respect to FIGS. 20A to 22D. Thus, for the sake of brevity, only a detailed explanation of processes unique to the fifth embodiment will be provided below with respect to FIGS. 29A to 29D.

FIGS. 29A to 29D illustrate sectional views describing a method of fabricating the data pad shown in FIGS. 27 and 28.

Figure 29A:
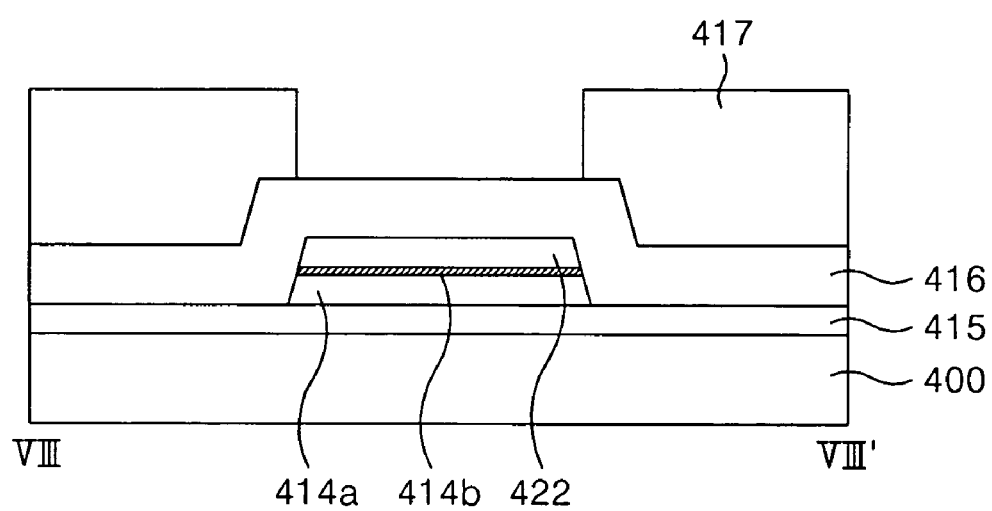
FIGS. 29A to 29D illustrate sectional views describing a method of fabricating the data pad shown in FIGS. 27 and 28.

Referring to FIG. 29A, a gate insulating film 415, an undoped amorphous silicon layer, an n$^+$ amorphous silicon layer, and a data metal layer may be deposited onto the entire surface of the substrate 400 in any manner as described in the embodiments above.

Next, and in any manner as described in the embodiments above, the data metal layer, the undoped amorphous silicon layer, and the n$^+$ amorphous silicon layer may be patterned to simultaneously form a data line, the lower data pad electrode 422, the ohmic contact layer 414b, and the active layer 414a, wherein the ohmic contact layer 414b and active layer 414a may be provided in the same pattern as the lower data pad electrode 422 and below the lower data pad electrode 422.

Next, in any manner as described in the embodiments above, a protective film 416 may be deposited over the entire surface of the lower substrate 400 and on the lower data pad electrode 422. Subsequently, and in any manner as described in the embodiments above, a photo-resist film may be coated over the protective film, exposed, and developed to provide a photo-resist pattern 417. In one aspect of the present invention, the photo-resist pattern 417 may expose a side portion of the lower data pad electrode 422 as will be discussed in greater detail below with respect to FIG. 29B.

Figure 29B:
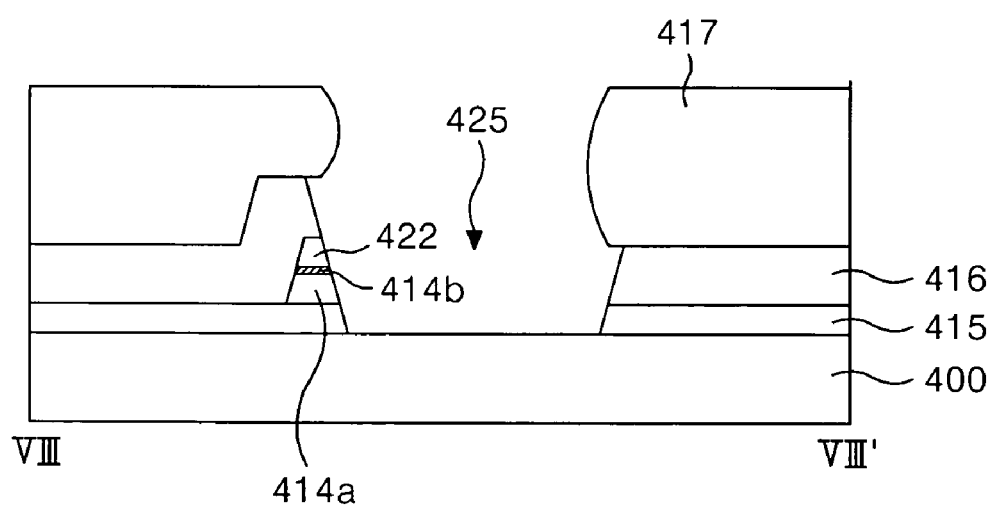

Referring to FIG. 29B, portions of the protective film 416, the lower data pad electrode 422, the ohmic contact layer 414b, the active layer 414a, and the gate insulating film 415 exposed by the photo-resist pattern 417 may be removed to form the data contact hole 425 in any manner as described in the embodiments above. Because the width of the data contact hole 425 corresponds with a pattern width of the photo-resist pattern 417, a side portion of the lower data pad electrode 422 may be exposed within the data contact hole 425, and may therefore be removed from within the data contact hole 425.

Figure 29C:
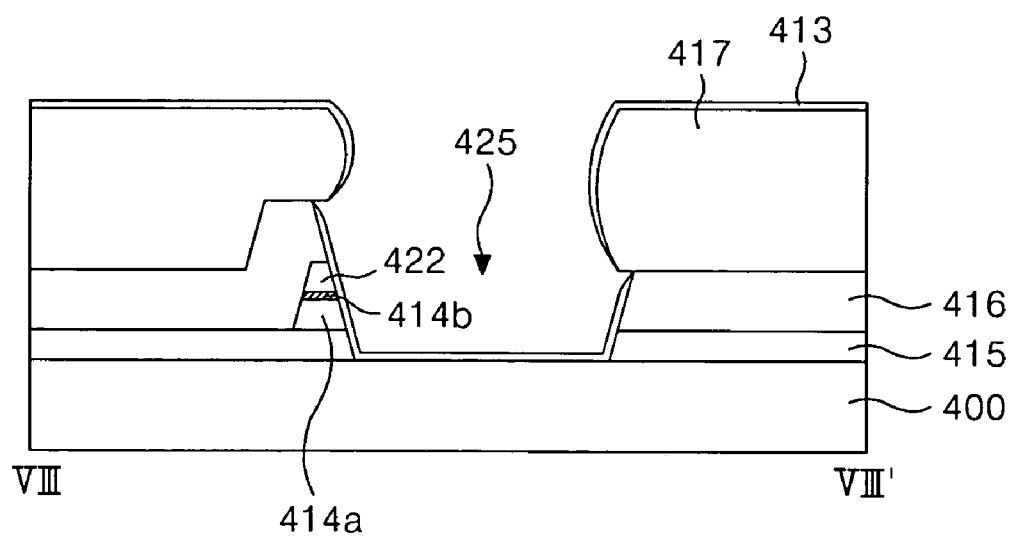

Referring to FIG. 29C, a transparent conductive material 413 may be deposited over the entire surface of the substrate 400, on the photo-resist pattern 417, and within the data contact hole 425 in any manner as described in the embodiments above. Accordingly, the transparent conductive material 413 may directly contact a side surface of the protective film 416 and lower data pad electrode 422.

Figure 29D:
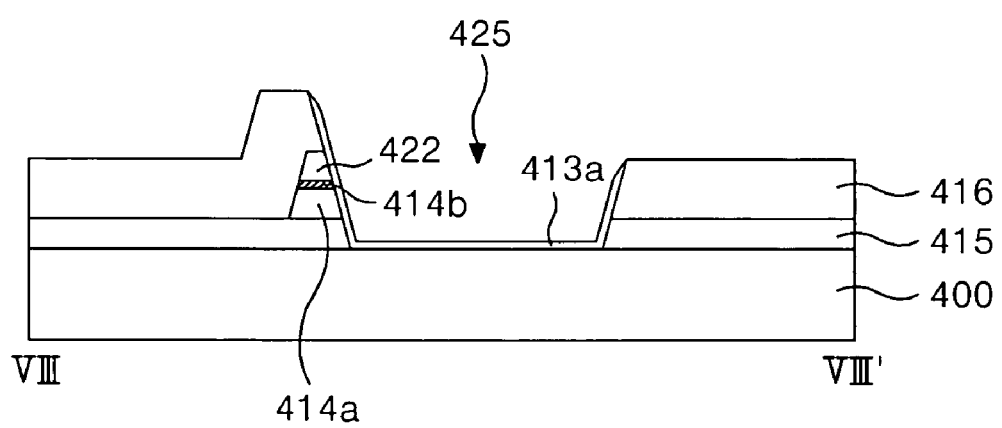

Referring to FIG. 29D, the photo-resist pattern 417 may be removed according to a stripping or lift-off process in any manner as described in the embodiments above. Upon removing the photo-resist pattern 417, portions of the transparent conductive material 413 on the photo-resist pattern 417 are removed with respect to portions of the transparent conductive material 413 not on the photo-resist pattern 417. Thus, upon removing the photo-resist pattern 417, portions of the transparent conductive material 413 within the data contact hole 425 remain to form the upper data pad electrode 413a.

As described above, the principles of the fifth embodiment of the present invention provide a data contact hole 425 offset from the lower data pad electrode 422 and an upper data pad electrode 413a formed within the offset data contact hole 425. Because the data contact hole 425 is offset, it may be wider than a width of an inspecting pin 430 in an inspection device, maximizing the contact area between the inspecting pin 430 and the upper data pad electrode 413a.

Figure 30:
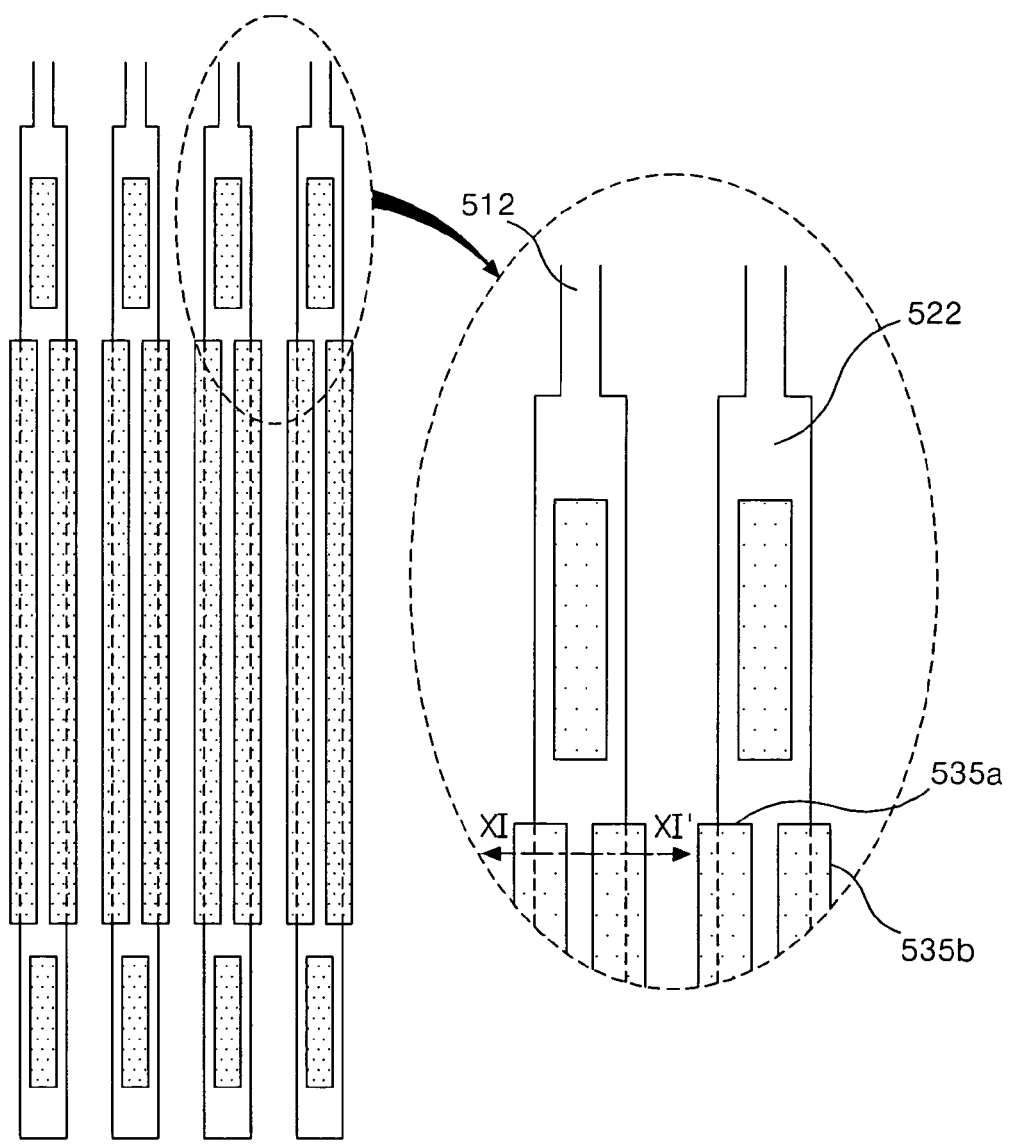
FIG. 30 illustrates a plan view of a data pad in a TFT array substrate according to a sixth embodiment of the present invention.
Figure 31:
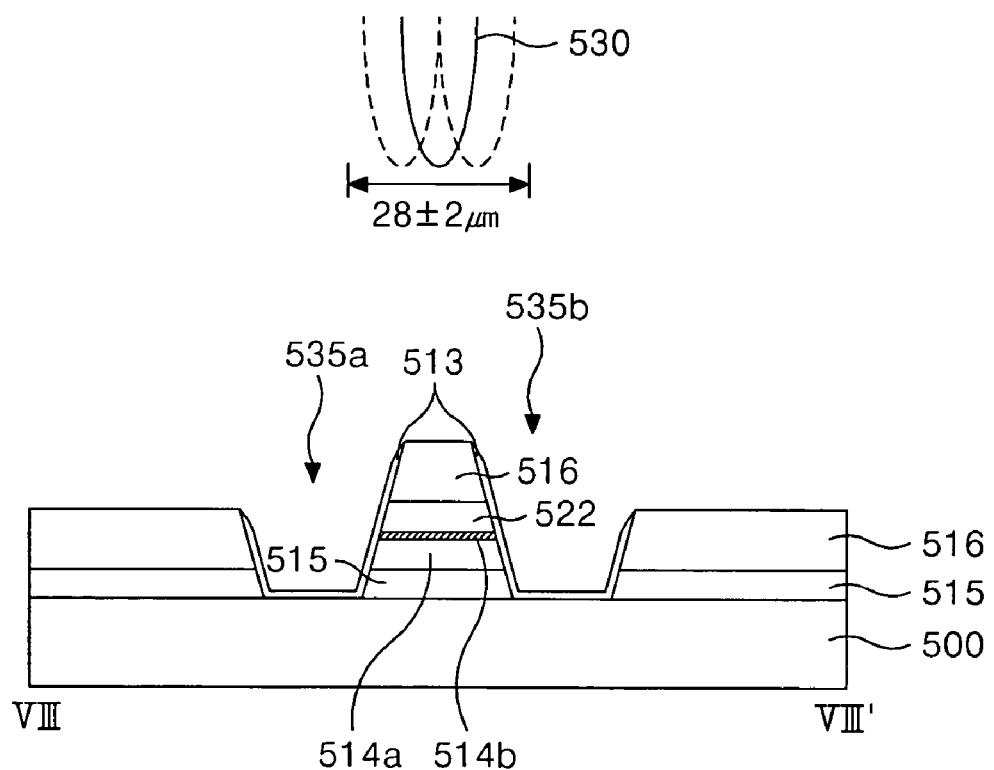
FIG. 31 illustrates a sectional view of the data pad in the TFT array substrate taken along line IX-IX' shown in FIG. 30.

FIG. 30 illustrates a plan view of a data pad in a TFT array substrate according to a sixth embodiment of the present invention. FIG. 31 illustrates a sectional view of the data pad in the TFT array substrate taken along line IX-IX' shown in FIG. 30.

Referring to FIGS. 30 and 31, a plurality of data contact hole pairs comprised of first and second data contact holes 535a and 535b, respectively, may be spaced apart from each other by a predetermined distance. In one aspect of the present invention, each of the first and second data contact holes 535a and 535b may be offset from opposing portions of the lower data pad electrode 522 such that opposing side regions of the lower data pad electrode 522 may be removed from within the first and second data contact holes 535a and 535b. As shown in FIG. 31, two side surfaces of the lower data pad electrode 522 are exposed within each pair of data contact holes. Accordingly, the side surfaces of the lower data pad electrode 522 directly contact the upper data pad electrode 513a within the pair of data contact holes.

Referring to FIG. 31, the first and second data contact holes 535a and 535b may be formed within a protective film 516, the lower data pad electrode 522, an ohmic contact layer 514b, an active layer 514a, and a gate insulating film 515.

According to principles of the present invention, the upper data pad electrode 513a, within the first and second data contact holes 535a and 535b, may have a combined width larger than that of the lower data pad electrode 522. In one aspect of the present invention, the combined width of the lower data pad electrode 522 may be about 36 μm. Accordingly, an inspecting pin 530 of an inspection device may easily contact the data pad over a large area.

According to principles of the present invention, the TFT array substrate described above with respect to FIGS. 30 and 31 may be formed in a three-mask process similar to mask processes previously described with respect to FIGS. 20A to 22D. Thus, for the sake of brevity, only a detailed explanation of the processes unique to the sixth embodiment will be provided below with respect to FIGS. 32A to 32D.

FIGS. 32A to 32D illustrate sectional views describing a method of fabricating the data pad shown in FIGS. 30 and 31.

Figure 32A:
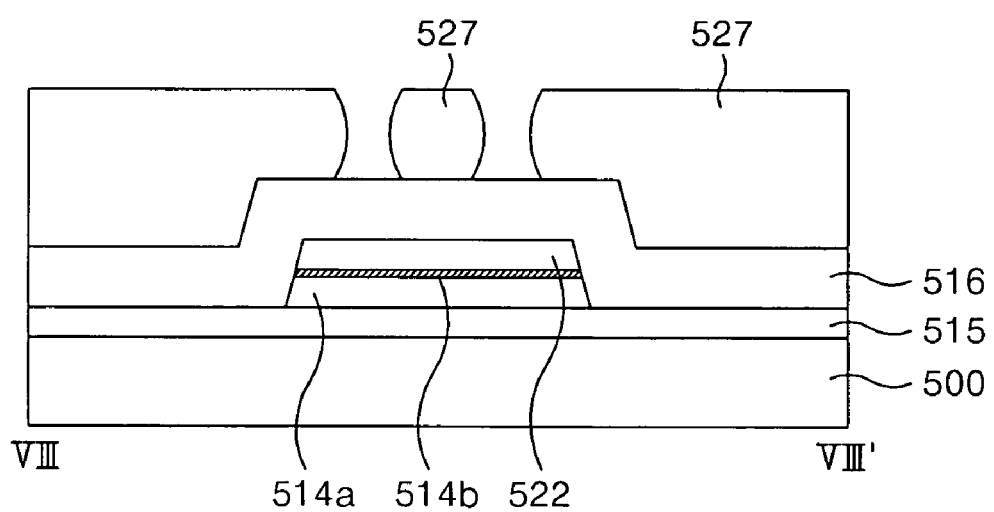
FIGS. 32A to 32D illustrate sectional views describing a method of fabricating the data pad shown in FIG. 31.

Referring to FIG. 32A, a gate insulating film 515, an undoped amorphous silicon layer, an n+ amorphous silicon layer, and a data metal layer may be deposited onto the entire surface of the substrate 500 in any manner as described in the embodiments above.

Next, and in any manner as described in the embodiments above, the data metal layer, the undoped amorphous silicon layer, and the n+ amorphous silicon layer may be patterned to simultaneously form a data line, the lower data pad electrode 522, the ohmic contact layer 514b, and the active layer 514a wherein the ohmic contact layer 514b and active layer 514a may be provided in the same pattern as the lower data pad electrode 522 and below the lower data pad electrode 522.

Next, in any manner as described in the embodiments above, a protective film 516 may be deposited over the entire surface of the lower substrate 500 and on the lower data pad electrode 522. Subsequently, and in any manner as described in the embodiments above, a photo-resist film may be coated over the protective film, exposed, and developed to provide a photo-resist pattern 527. In one aspect of the present invention, the photo-resist pattern 527 may expose side portions of the lower data pad electrode 522 as will be discussed in greater detail below with respect to FIG. 32B.

Figure 32B:
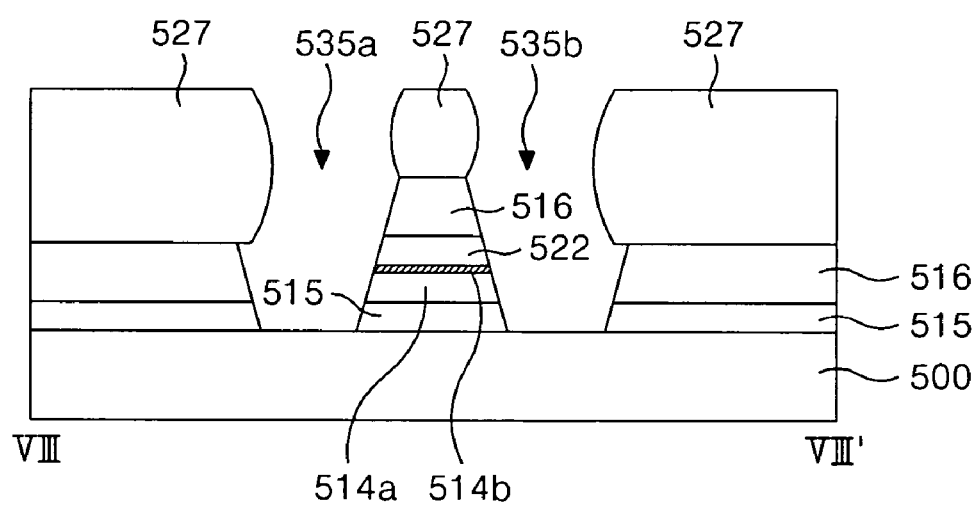

Referring to FIG. 32B, portions of the protective film 516, the lower data pad electrode 522, the ohmic contact layer 514b, the active layer 514a, and the gate insulating film 515 exposed by the photo-resist pattern 527 may be removed to form the first and second data contact holes 535a and 535b in any manner as described in the embodiments above. Because the combined width of the first and second data contact holes 535a and 535b corresponds with a pattern width of the photo-resist pattern 527, side portions of the lower data pad electrode 522 may be exposed within the first and second data contact holes 535a and 535b, and may therefore be removed from within the first and second data contact holes 535a and 535b.

Figure 32C:
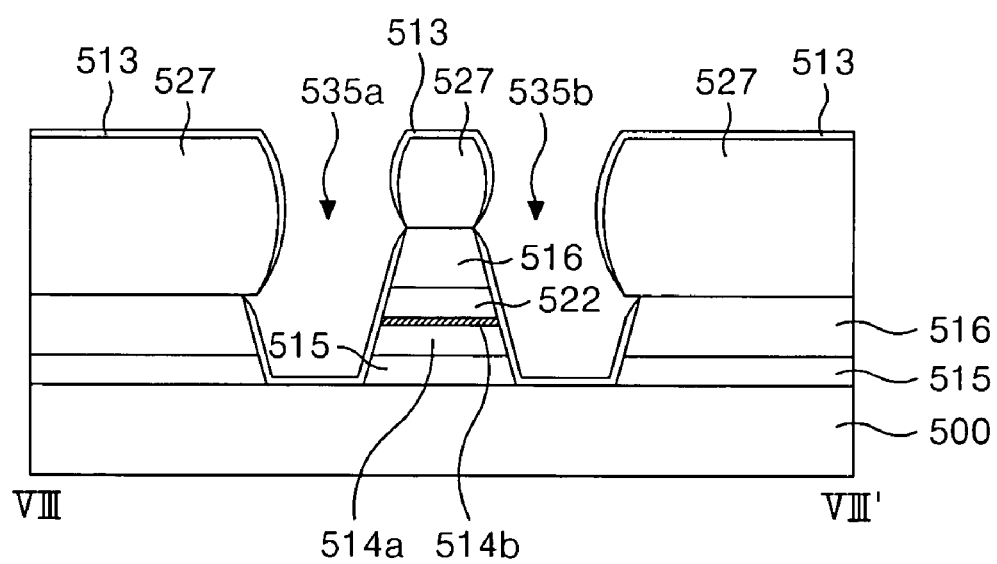

Referring to FIG. 32C, a transparent conductive material 513 may be deposited over the entire surface of the substrate 500, on the photo-resist pattern 527, and within the first and second data contact holes 535a and 535b in any manner as described in the embodiments above. Accordingly, the transparent conductive material 513 may directly contact side surfaces of the protective film 516 and lower data pad electrode 522.

Figure 32D:
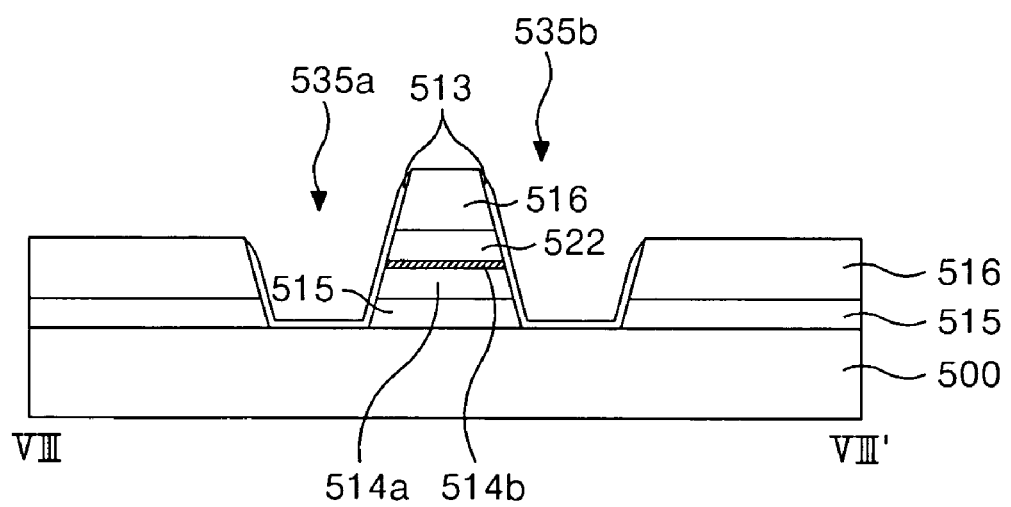

Referring to FIG. 32D, the photo-resist pattern 527 may be removed according to a stripping or lift-off process in any manner as described in the embodiments above. Upon removing the photo-resist pattern 527, portions of the transparent conductive material 513 on the photo-resist pattern 527 are removed with respect to portions of the transparent conductive material 513 not on the photo-resist pattern 527. Thus, upon removing the photo-resist pattern 527, the portions of the transparent conductive material 513 within the first and second data contact holes 535a and 535b remain to form the upper data pad electrode 513a.

As described above, the principles of the sixth embodiment of the present invention provide first and second data contact holes 535a and 535b offset from opposing sides of the lower data pad electrode 522 and an upper data pad electrode 513a formed within the offset first and second data contact holes 535a and 535b. Because the first and second data contact holes 535a and 535b are offset, their combined thickness may be wider than a width of an inspecting pin 530 in an inspection device, maximizing the contact area between the inspecting pin 530 and the upper data pad electrode 513a.

According to principles of the fifth and sixth embodiments of the present invention, a line width of upper data pad electrodes may correspond to a width of the data contact holes formed during a three-mask process. According to the fifth and sixth embodiments, contact holes may be offset from lower data pad electrodes and may have line widths greater than a line width of the lower data pad electrode such that at least one side portion of the lower data pad electrodes are removed from within the contact holes. Accordingly, the principles of the present invention provide a large contact area between an upper data pad electrode and an inspecting pin of an inspection device.

While, the fifth and sixth embodiments have been described above only with respect to the data pad, it will be appreciated that the principles of the present invention may be readily extended and modified to facilitate contact between an upper gate pad electrode of a gate pad and an inspecting pin in an inspection device.

As described above, the principles of the present invention enable a TFT array substrate may be fabricated in a three-mask process according to lift-off and pad opening techniques. Accordingly, the TFT array substrate may be fabricated by the three-mask process, thereby reducing the number of fabrication processes and the cost while improving a production yield.

Further, the principles of the present invention enable line widths of the transparent conductive material included within the gate and data pads are larger than a line width of the inspecting pin in an inspection device. The present invention facilitates contact with an inspecting pin during an automated inspection process that determines whether gate and data lines are acceptable or defective.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A thin film transistor array substrate, comprising:
a gate line provided on a substrate;
a data line crossing the gate line to define a pixel area;
a thin film transistor at the crossing of the gate and data lines;
a pixel electrode at the pixel area, which is contacted directly on the substrate and connected to a drain electrode of the thin film transistor;
a gate pad connected to the gate line; and
a data pad connected to the data line,
wherein the gate pad and the data pad contacts the substrate and includes an exposed transparent conductive material,
wherein a portion of the drain electrode is on a portion of the pixel electrode, and the pixel electrode includes the transparent conductive material at the same layer,
wherein the gate pad includes the transparent conductive material, the thin film transistor array substrate further including a gate metal material on the transparent conductive material of the gate pad, wherein at least a portion of the transparent conductive material of the gate pad is exposed by a contact hole, and wherein the transparent conductive materials of the gate pad and data pad are contacted on the substrate, wherein a gate insulating patterns are formed only on the gate pad, the gate line and a gate electrode respectively.

2. The thin film transistor array substrate as claimed in claim 1, wherein a line width of the exposed transparent conductive material of at least one of the gate pad and the data pad is larger than a width of an inspecting pin.

3. The thin film transistor array substrate as claimed in claim 2, wherein the line width of the exposed transparent conductive material of at least one of the gate pad and the data pad is greater than about 26 µm.

4. The thin film transistor array substrate as claimed in claim 3, wherein the line width of the exposed transparent conductive material of at least one of the gate pad and the data pad is about 34 µm to about 38 µm.

5. The thin film transistor array substrate as claimed in claim 1, wherein the gate line and the gate electrode include the transparent conductive material, the thin film transistor array substrate further including a gate metal material that overlaps a portion of the transparent conductive material of the gate line and the gate electrode.

6. The thin film transistor array substrate as claimed in claim 5, wherein:

the transparent conductive material includes at least one of TO, ITO, IZO and ITZO; and the gate metal material includes at least one of an aluminum group metal, Mo, Cu, Cr, Ta and Ti.

* * * * *